United States Patent
Ladden et al.

(10) Patent No.: US 10,929,804 B2
(45) Date of Patent: Feb. 23, 2021

(54) DELIVERY MANAGEMENT SYSTEMS AND METHODS FOR ZERO-INVENTORY DISTRIBUTION

(71) Applicant: Deliveright Logistics, Inc., Secaucus, NJ (US)

(72) Inventors: Douglas M. Ladden, New York, NY (US); Richard Merians, New York, NY (US); Ori Anavim, Brooklyn, NY (US)

(73) Assignee: Deliveright Logistics, Inc., Secaucus, NJ (US)

( * ) Notice: Subject to any disclaimer, the term of this patent is extended or adjusted under 35 U.S.C. 154(b) by 867 days.

(21) Appl. No.: 14/946,989

(22) Filed: Nov. 20, 2015

(65) Prior Publication Data
US 2016/0171437 A1    Jun. 16, 2016

Related U.S. Application Data

(60) Provisional application No. 62/082,961, filed on Nov. 21, 2014.

(51) Int. Cl.
*G06Q 10/08*    (2012.01)
*G06F 3/0484*    (2013.01)
(Continued)

(52) U.S. Cl.
CPC ......... *G06Q 10/0832* (2013.01); *G06F 3/048* (2013.01); *G06F 3/0481* (2013.01);
(Continued)

(58) Field of Classification Search
CPC .... G06Q 10/0832; G06Q 10/33; G06Q 10/37; G06Q 10/20; G06Q 10/083;
(Continued)

(56) References Cited

U.S. PATENT DOCUMENTS 5,727,163 A    3/1998    Bezos
6,904,565 B1    6/2005    Lentz
(Continued)

FOREIGN PATENT DOCUMENTS

WO    WO 2007/038149 A2    4/2007

OTHER PUBLICATIONS

DSI Mobile Applications, "Proof of Delvery", available at: dsiglobal.com/wp-content/uploads/2014/07/ProofOfDelivery.pdf last accessed Jun. 25, 2020 (Year: 2013).*
(Continued)

*Primary Examiner* — Kevin H Flynn
*Assistant Examiner* — Emmett K. Walsh
(74) *Attorney, Agent, or Firm* — Wolf, Greenfield & Sacks, P.C.

(57) ABSTRACT

Systems for delivery management are provided. According to one embodiment, the system includes a manifest component configured to aggregate a plurality of items into a manifest, an identifier component configured to identify respective items within the aggregated plurality of items using the manifest, a tracking component configured to calculate a delivery route and track the plurality of items during a plurality of delivery events, and an inspection component configured to require inspection of the respective items at each of the plurality of delivery events. The delivery systems can ensure quality and manage connections between distributors and manufacturers by incorporating required checks through each step of a delivery (e.g., pick up, freight aggregation, line shipping, local shipping, etc.). Inspections at delivery transitions can be required and include each time a good (e.g., an item) is moved on or off a delivery truck, and transitions between delivery areas within specific location.

27 Claims, 35 Drawing Sheets

(51) Int. Cl.
*G06F 3/048* (2013.01)
*G06Q 10/06* (2012.01)
*G06F 3/0481* (2013.01)
*G06F 3/0482* (2013.01)
*G06T 7/00* (2017.01)
*G06Q 10/00* (2012.01)
*H04N 5/232* (2006.01)

(52) U.S. Cl.
CPC .......... *G06F 3/0482* (2013.01); *G06F 3/0484* (2013.01); *G06Q 10/06316* (2013.01); *G06Q 10/083* (2013.01); *G06Q 10/0833* (2013.01); *G06T 7/0004* (2013.01); *G06Q 10/0837* (2013.01); *G06Q 10/20* (2013.01); *H04N 5/23219* (2013.01)

(58) Field of Classification Search
CPC ........... G06Q 10/0833; G06Q 10/0835; G06Q 10/0837; G06F 3/0481; G06T 7/004; H04N 5/23219
USPC ......................................................... 705/340
See application file for complete search history.

(56) References Cited

U.S. PATENT DOCUMENTS

| | | | |
|---|---|---|---|
| 7,191,142 B1 | 3/2007 | Sandell et al. | |
| 7,689,465 B1 * | 3/2010 | Shakes | G06Q 10/08 705/27.1 |
| 8,473,326 B1 | 6/2013 | Griffith et al. | |
| 10,437,435 B2 | 10/2019 | Ladden et al. | |
| 10,452,236 B2 | 10/2019 | Ladden et al. | |
| 2002/0103724 A1 * | 8/2002 | Huxter | G06Q 10/087 705/28 |
| 2004/0117196 A1 | 6/2004 | Brockman et al. | |
| 2004/0117329 A1 | 6/2004 | Crain | |
| 2004/0230439 A1 | 11/2004 | Aptekar | |
| 2004/0243430 A1 | 12/2004 | Horstemeyer | |
| 2006/0106652 A1 | 5/2006 | Wamsley | |
| 2006/0138223 A1 | 6/2006 | Schar | |
| 2006/0238334 A1 | 10/2006 | Mangan et al. | |
| 2008/0021714 A1 | 1/2008 | Kraez et al. | |
| 2010/0082151 A1 | 4/2010 | Young et al. | |
| 2010/0145754 A1 | 6/2010 | Rahman | |
| 2011/0173127 A1 | 7/2011 | Ho et al. | |
| 2011/0228991 A1 | 9/2011 | Hicks et al. | |
| 2011/0238457 A1 | 9/2011 | Mason et al. | |
| 2011/0274275 A1 | 11/2011 | Seitz | |
| 2011/0312374 A1 * | 12/2011 | Chen | H04N 5/23222 455/556.1 |
| 2012/0030133 A1 | 2/2012 | Rademaker | |
| 2012/0175412 A1 * | 7/2012 | Grabiner | G06T 7/73 235/375 |
| 2012/0246077 A1 | 9/2012 | Skaaksrud et al. | |
| 2013/0006739 A1 | 1/2013 | Horvitz et al. | |
| 2013/0096973 A1 | 4/2013 | Lavoie et al. | |
| 2013/0101172 A1 | 4/2013 | Parikh et al. | |
| 2013/0185104 A1 | 7/2013 | Klavins | |
| 2013/0195588 A1 | 8/2013 | Shibata et al. | |
| 2013/0297527 A1 * | 11/2013 | Luo | G06Q 10/083 705/338 |
| 2013/0335541 A1 * | 12/2013 | Hernandez | G06Q 10/083 348/61 |
| 2014/0059666 A1 * | 2/2014 | Zheng | H04L 63/08 726/9 |
| 2014/0258818 A1 | 9/2014 | Schwartz | |
| 2014/0297552 A1 | 10/2014 | Hosoda et al. | |
| 2014/0317005 A1 * | 10/2014 | Balwani | G06Q 10/0832 705/317 |
| 2015/0088779 A1 | 3/2015 | Falcone et al. | |
| 2015/0161563 A1 | 6/2015 | Mehrabi | |
| 2015/0186842 A1 * | 7/2015 | Daniarov | G06Q 10/0838 705/341 |
| 2016/0048799 A1 * | 2/2016 | Meyer | G06Q 10/0833 705/333 |
| 2016/0104113 A1 | 4/2016 | Gorlin | |
| 2016/0140497 A1 | 5/2016 | Bhaskaran et al. | |
| 2016/0171434 A1 | 6/2016 | Ladden et al. | |
| 2016/0171436 A1 | 6/2016 | Ladden et al. | |
| 2016/0171438 A1 | 6/2016 | Ladden et al. | |
| 2016/0171439 A1 | 6/2016 | Ladden et al. | |
| 2016/0180274 A1 * | 6/2016 | Zwakhals | G06Q 10/06315 705/7.25 |

OTHER PUBLICATIONS

Extended European Search Report dated Apr. 6, 2018 in connection with European Application No. 15862051.8.
Invitation to Pay Additional Fees for International Application No. PCT/US2015/061748 dated Jan. 22, 2016.
International Search Report and Written Opinion for International Application No. PCT/US2015/061748 dated Apr. 8, 2016.
European Examination Report dated Jul. 2, 2019 in connection with European Application No. 15862051.8.
Sandhil et al., Enterprise Resource Planning (ERP)—A Tool for Uninterrupted Supply in Pharmaceutical Supply Chain Management. International Journal of Pharmacy and Pharmaceutical Sciences. 2013; 5(3).

* cited by examiner

1600

1602
Customer Feedback

1606
X Q: Did the team introduce themselves upon arrival at your home?
A: U

1606
✓ Q: Did the Delivery team evaluate where the items were to be placed in your home, to ensure the best delivery of your purchase?
A: Yes

1606
✓ Q: Did the delivery team set up your furniture according to you wishes?
A: Yes

1606
✓ Q: Did the delivery team clean up the area and thank you for your purchase?
A: Yes

1606
✓ Q: Based upon your over-all experience with Deliveright, how would rate your delivery experience between 1 (low) and 5 (high)?
A: 5

| Order ID | Status | Customer Name | Line Items | Retailer | Scheduled | Location |
|---|---|---|---|---|---|---|
| 1377887749 | Fulfilled | ⌕Kings Market 68 | 3 | Shelba | | N/A |
| 1377884293 | Fulfilled | ⌕JP Workroom | 1 | Shelba | | N/A |
| 1377880069 | Fulfilled | ⌕Bondi Dept Store | 12 | Shelba | | N/A |
| 1377858501 | Fulfilled | ⌕Delta Enterprise Corp. | 3 | Shelba | | N/A |
| 1377852805 | Fulfilled | ⌕Chelsea Storage | 2 | Shelba | | N/A |
| 1377817989 | Pending Customer Pickup (Return) | ⌕Shoshana Melmed | 1 | Sunbelt | | N/A |
| 1359452997 | Fulfilled | ⌕Tracy Leach | 10 | CGP Associates | | N/A |
| 1296134533 | Fulfilled | ⌕MaryAnn Flynn | 4 | Suburban Furniture | | N/A |
| 1295810693 | Fulfilled | ⌕William Karczewski | 8 | Suburban Furniture | | N/A |
| 1281292485 | Fulfilled | ⌕John Guercio | 2 | Virginia House Furniture | | NJ7 |
| 1280150533 | Fulfilled | ⌕Gabriella & Fabian Riveria | 6 | Berg Furniture | 2015-09-16 !@:00 | NJ13 |
| 1359254469 | Approved/Pre-funded | ⌕Kelly Agresti | 1 | Suburban Furniture | | N/A |
| 1347310149 | Fulfilled | ⌕Donna Rucker | 2 | Sunbelt | | NJ10 |
| 1343578053 | Approved/Pre-funded | ⌕Arlene and Ronald Protter | 1 | Suburban Furniture | | N/A |
| 1296265925 | Approved/Pre-funded | ⌕Hansa Patel | 1 | Suburban Furniture | | N/A |

| General Info | Line Items[2] | Tracking | Manifests | Feedback | Properties [] | 1912 |

Associated Manifests

| Manifest ID | Type | Origin | Destination | Scheduled |
|---|---|---|---|---|
| ☐ 7C1F8E | Home Delivery | Bayonne, NJ | Highpoint, NC | September 29, 2015 12:00AM |

1902 — Manifest ID
1904 — Type
1906 — Origin
1908 — Destination
1910 — Scheduled

FIG. 22

| General Info | Content | Verifications | Notes/Activity Log | | | Close —— 2312 |
|---|---|---|---|---|---|---|
| Date —— 2302 | | Type —— 2304 | User —— 2306 | Comments —— 2308 | Location —— 2310 | |
| September 23rd 2015, 2:33:02 pm | | Home delivery driver acceptance | Jorge Diaz | Mobile app crash (Possibly because of 'Pickup') | Map 🔍 ⚓ | |
| September 23rd 2015, 2:32:52 pm | | Preload Home delivery | Jorge Diaz | Mobile app crash (Possibly because of 'Pickup') | Map 🔍 ⚓ | |

☑ Add Verification

| Manifests | | |
|---|---|---|
| 9/28/15 | | ☐ |
| All Types | | ⇕ |
| All Statuses | | ⇕ |
| Driver | | ⇕ |
| ⌖ Location | | |
| ⚿ Seal code | | |
| ◄ Route | | |
| 🚚 Truck | | |
| 🔍 Line item ID | | |

⊙ +New ⬆Import ⬇Export    ⊙⊙ ⟨⟩

| week | month | day | | Sep 27 - Oct 3, 2015 | | | | today ⟨⟩ |
|---|---|---|---|---|---|---|---|---|
| | Sun 9/27 | Mon 9/28 | Tue 9/29 | Wed 9/30 | Thu 10/1 | Fri 10/2 | Sat 10/3 |
| all-day | | | | | | | |
| 6am | | | | | | | |
| 7am | 8:00-5:00 Shelba/22 stops | | 8:00-5:00 New Jers NYC 2/4 stops | 8:00-5:00 Sunbelt/ 4 stops | | | |
| 8am | | | | 8:00-5:00 DE/11 stops | 8:00-5:00 Service/1 stops | | |
| 9am | | | | | 8:00-5:00 NYC/2 stops | | |
| 10am | | | | | | 8:00-5:00 MO/3 stops | 8:00-5:00 NJ/4 stops |
| 11am | | | | | | | |
| 12am | | | | | | | |
| 1pm | | | | | | | |

Today's Manifests

| | Manifest ID | Type | Scheduled | Truck ID | Route ID | Origin | Destination | Stops |
|---|---|---|---|---|---|---|---|---|
| ☐ | 🔒 68F4C1 | Linehaul | 09/28/2015 | Shelba | Shelba | Bayonne, NJ | N/A | 22 |

1296330053

General Info | Line Items [2] | Tracking | Manifests | Feedback | Properties [5]

Order Information

Order Number: 1296330053
Status: Funded
Created: 2015-09-14 16:07:26
Region: Bayonne, NJ Ref Number: Enter reference order
Payment Status: ⊘ success Order Total: $175.00
Delivery Cost: 175

Retailer Information

Company Name: Suburban Furniture
Contact: Kenneth  Luthy
Phone: 9738271300  Phone 2
Email(s): ksluthy@suburbanfurni
Address: 10 RT. 10 West
Succasunna 07876
⊕ Map
07876

Customer Notes

Add New Notes [Add]

Customer Funded: Ok to deliver when in Bassett Model #'s
(1) 3849-72 sofa Flexsteel Model #'s (2) 5966-10-Chair

Customer Information

First Name: Jhonser
Last Name: Guerrero
Email: JHONSER1994@HOTMAIL.COM
Phone: 8622447091
Mobile: Phone 2
Address: 342 Quaker Church Rd
Apt 185
Randolph  New Jersey  07889
☐ Elevator
Floor:
☐ COI
☐ COD Amount

Delivery Schedule

Scheduled: 
Arrival: N/A  Departure: N/A  Requested: N/A  Delivered: N/A

Delivery Notes
Add new notes [Add]

General Info | Line Items [3] | Tracking | Manifests | Feedback | Properties []

Order Information

Order Number: 1377887749
Status: Fulfilled
Created: 2015-09-28 08:19:00

Ref Number: 918125
Region: Bayonne, NJ

Order Total: $135.00
Delivery Cost: 135
Payment Status: ⊘ pending [Mark as Paid]

Retailer Information

Company Name: Shelba
Contact First Name: Shelba
Phone: 3264762000
Phone 2:
Email(s): doug@deliveright.co
Address: P.O. Box 487
⊘ Map
Hickory 28503, 28503

Customer Notes

Add New Notes

Unable to

Customer Information

First Name: Kings
Last Name: Market 68
Email: doug@deliveright.com
Phone: 2036371701
Mobile: Phone 2
Address: 26 Arcadia Road.
Address 2:
Old Greenwich | Connecticut ▸ | 06870 | ☐ COI | ☐ COD Amount
☐ Elevator
Floor:

Delivery Schedule

Scheduled:
Arrival: N/A
Departure: N/A
Requested: N/A
Delivered: N/A

Delivery Notes
Add new notes
Add

2702

☑ Accept Order
✗ Reject Order
✗ Delivery Failed
⊕ Order Picked-Up
Send Order to Mfgr(s)
Send Order Confirmation
Send Delivery Confirmation
Batch Labels (Pdf)
Batch Labels (markup)
Mark for Pickup (Mfger)
Cancel Order
Download Delivery Confirmation
Public Tracker

1296330053

| General Info | Line Items[2] | Tracking | Manifests | Feedback | Properties [5] |
|---|---|---|---|---|---|

*2812*

Tracking History — *2800*

| Item ID | Date — *2804* | User — *2806* | Description — *2808* | Location — *2810* |
|---|---|---|---|---|
| 1296330053-2 | 2015-09-13:51:40 | visitor, visitor | Item marked as funded | Map |
| 1296330053-1 | 2015-09-13:51:40 | visitor, visitor | Item marked as funded | Map |

*2802*

All Items

*FIG. 28*

| | | | | | | | |
|---|---|---|---|---|---|---|---|
| 1296330053 | | | | | | | |
| General Info | Line Items[2] *2904* | Tracking *2924* | Manifests | Feedback | Properties [5] *2922* | | |
| *2902* | Status | SKU *2906* | Type *2908* | Name *2910* | Qty *2912* | Pkgs *2914* | Location *2916* | Mfger *2918* |
| Item ID | | | | | | | | |
| 1296330053-1 | Funded ▼ | additional-delive | #Delivery ▼ | White Glove Delivery Service-Additional Items | 1 | 1 | N/A | Suburban Furniture |
| 1296330053-2 | Funded ▼ | base-delivery | #Delivery ▼ | White Glove Delivery Service-Standard (up to 2 pieces) | 1 | 1 | N/A | Suburban Furniture |
| [+] Add Line Item *2920* | | | | | | | | |

*FIG. 29*

```
SERVER SIDE
...
track delivery()
  location()
    case(1) test.boundary <GPS Coord>
      // receive or capture GPS signal
      if < 5 mile trigger mobile.wakeup()
      if > 5 mile wait
      // other boundary trigger may be used
    case (2) test.destination_time()
      // receive or capture val.<expected_delivery_time>
      // calc based on route, traffic, etc.
      if <10 minutes trigger mobile.wakeup()
          pass cust_delivery = true
      if >10 minutes wait
```

```
APP SIDE
...
detect mobile.wakeup = true
validate.item scan()
  test user_scan_code (INPUT)
    test valid_code = true // match expected
    test valid_item = true // match item detail
    // input image on bar code for test
  if status = pass then
capture signature() // get cust signature
  if status = fail trigger lockout() ;
  if status = pass then
validate.POD()
  test item scan ; cussig = true
  // delivery in progress capture inspection
  // information
  trigger image_capture()
  /*deliverer prompted to image item in
   place - full field of view images */
    image_angle = valid then capture image
    need angle true repeat else continue
    // test focus option
    // test angle against pre-captured
    // images option
```

FIG. 30A

SERVER SIDE

```
// SERVER SIDE VALIDATIION
valid image capture( )
    test images all angles = true
        compare sever image to capture image
            test align ; pass continue
                else fail communicate
                    <lockout>
                        // lockout includes failed data ID
...
Receive <Proof_of_Delivery>
enable next delivery
// unlock if lockout
// provide access to next delivery
comm <Proof_of_Delivery>
    Retailer
    Manufacturer
    Customer
```

APP SIDE

```
// APP SIDE VALIDATION
valid image capture( )
    test all_angle = true
        // 360 view else image obstruction
        // e.g. wall to skip an angle
    test surrounding_area = true
        // images cover delivery area else
        // trigger area image capture // SERVER SIDE VALIDATION
comm image_data server
monitor <lockout>;
trigger cust.sig( ) /* cust acks
delivery & location good condition */
Submit( )
    comm<Proof_of_Delivery>;
        <Proof_of_Delivery>
            order.info = val
            user.info = val
            images
            user.sig
```

FIG. 30B

```
...
image_capture( )
  image data = null
  load expected_image   // pregenerated images can be used
                        // alternative field of view information
                        // dist , capture area, focus info used to
                        // guide image capture
  capture_image( )
      analyze field_of_view_camera    // foc
          focus ≠ true                // test focus
          dist = true                 // test diatance to object
          angle = valid               // via image analysis (Determine range)
      auto_trigger_capture_image      // ID valid angles left, right, back, front,
                                      // top, bottom valid if not yet captured
                                      // auto capture image once ready
      show next_ , capture.display    // optional message user
      test complete_view = false
          capture_image( )            // continue until 360
      request.skip( )                 // can't image view enable
          capture_image( )            // valid skip_image obstruction
      else continue         //complete_view = true
  // optional
      validate.image( )               // test capture
          if true continue
          else lockout // or re-execute
...
```

FIG. 31

```
detect<delivery_event>            // move of item , customer delivery
                                  // transition off truck etc
  inspect( )
     Scan_code( )
        receive bar_code          // or image
        capture item_info
  receive status = damage_report  // user clicks report damage
     population damage_description_menu
        receive <selection> else
        parse <text_damage>
  trigger image_capture( )

...

request affirm_info    // signature

...

receive submit_signal comm <report>
   user.info
   images
   damage_description
   user.sig
   item.info remediation( )         // optional
test in transit
        if [true] capture delivery.info
            analyze <delivery.info> & re-ship.time // achievable?
            coordinate updated shipment if status = achievable
            else request customer_approval
            if approval = false end
```

FIG. 32

```
reject_item( )
   scan item.info( )   //capture bar code or image
   reject.order <selected>
       display <reject_options>
          accept reject_option.selection
          else text_reject_input
   cust.sig( )
   image_capture( ) // image item & area
       <item_images>
       <area_images>
   cust.sig( )      // confirm delivery area good condition comm reject.obj to server validate information_submission
   valid description   else lockout
   valid cust.sig      else lockout
   valid item_images   else lockout
   valid area_images   else lockout
   valid cust.sig <2>  else lockout
```

FIG. 33

```
order_sched( )
    monitor(<fulfill_status>)    // order info fulfilled?
        if true do               // yes request customer schedule
        auto_comm                // delivery
            delivery_request_message
            send to <cust.info.comm1>    // primary communication
                                         // vehicle
            embed scheduling link receive <schedule_cust>      // scheduling site presents
                                 // options to customer &
                                 // accepts selection
plan route( )
    match <delivery.expected> to <schedule_cust>
    [valid] if true confirm route
        else trigger auto.comm( )    // request new time
```

FIG. 34

DELIVERY MANAGEMENT SYSTEMS AND METHODS FOR ZERO-INVENTORY DISTRIBUTION

RELATED APPLICATIONS

This application claims priority under 35 U.S.C. § 119(e) to U.S. Provisional Application Ser. No. 62/082,961 entitled "DELIVERY MANAGEMENT SYSTEMS AND METHODS FOR ZERO-INVENTORY DISTRIBUTION," filed Nov. 21, 2014, which application is incorporated herein by reference in its entirety.

BACKGROUND

Online sales and distribution of goods and services has grown exponentially with the adoption of the Internet and the proliferation of mobile computing devices. Conventional retail sales have attempted to keep up with the increasing demand of the online marketplace but have traditionally fallen short in terms of reliability and time. In some conventional retail systems, managers and/or operators attempt to provide for distribution efficiency by warehousing any good being sold, either in a real world store or through an online service. Under conventional retail models, it has been thought that having ordered goods on-hand enables faster and more efficient delivery. Unfortunately, warehousing of goods and maintaining order inventory introduces costs into the manufacturing and delivery of goods. In addition, inventory that does not get sold is a burden on the distributor both in terms of the cost to produce the item and in terms of the cost to store and manage any item not sold. Some conventional direct distribution systems have sought to alleviate these burdens by shipping directly from manufacturers.

SUMMARY

It is realized that various conventional approaches for managing the tracking and delivery of items being transported can be improved. For example, new distribution approaches are needed that ensure reliability (e.g., quality control of goods) while leveraging direct distribution models. Further, new distribution approaches are needed that simplify incorporation of new distributors (e.g., new stores both physical and/or online) into direct distribution models. Additionally, delivery systems are needed that facilitate order execution in direct distribution models by manufacturers based on orders received even at new distributors. In some approaches, delivery systems can handle all front end payments (e.g., order side payments) passing cash or cash equivalents to the manufacturers, reducing all end to end delivery time frames. In further embodiments, the delivery systems can ensure quality and manage connections between distributors and manufacturers by incorporating required checks through each step of a delivery (e.g., pick up, freight aggregation, line shipping, local shipping, etc.).

In some embodiments, delivery systems introduce computer-based gateways (e.g., automated information lock out or automated information denial) into delivery routing and/or delivery execution processes. For example, the computer-based gateways used at delivery transitions and/or delivery events provide a technological implementation that prevents delivery personnel from skipping required inspections, information inputs, feedback collection, etc. The timing and requirements associated with each gateway can be tailored on the delivery system to enable further optimization over conventional approaches (e.g., reducing the number of computer operations required, reducing the executable steps required, reducing user interface displays required, reducing execution time, etc.). Further, because interstitial computer-assisted checking is provided at multiple points during the delivery process, the amount of time for redelivery due to damage incurred is reduced, as information is communicated in near-real time at various points during the shipping process.

According to some aspects and embodiments, delivery systems can include item verification systems that can be implemented to enhance conventional delivery management systems and further can be required at every delivery transition or delivery event. Delivery transitions or delivery events can include each time a good (e.g., an item) is moved on or off a delivery truck, and transitions between delivery areas within specific locations (e.g., transition from in-line delivery station to local delivery station). Verifying good integrity at each transition improves upon the efficiency of the delivery system as a whole. Feedback regarding item compromise or damage is identified as early as possible, for example, reducing costs of delivering damaged items and enabling the delivery system to take remedial actions in response to any damage reporting, among other options. In some embodiments, automated remediation improves the efficiency of the delivery system reducing computer-based operations required to resolve damage reporting and resolution over convention approaches.

According to one aspect, delivery system mange zero inventory distribution. According to some embodiments, the system can be configured to manage fabrication of products at various manufacturers and manage a delivery cycle so that the product arrives at consumer locations. In further embodiments, by handle production and the delivery cycle the system enables no minimum ordering from the various manufacturers. Under conventional delivery setting, manufacturers can require minimum orders of fabricated products or additional charges on product orders not meeting a minimum requirement to ensure sufficient margins Under management of the delivery system, manufacturers are able to subscribe for fabrication and can maintain profitability with no minimum orders. In various embodiments, the delivery system enable a true zero inventory distribution. Further efficiencies can be achieved via the delivery management system through fully paperless management of the delivery cycle. In some examples, the delivery system can manage paperless communication of delivery information between carriers and/or at delivery events, for example, to mobile communication devices, and eliminate entirely paper inventories, paper delivery instructions, etc.

According to another aspect, management of the delivery cycle by the delivery management system operates to reduce insurance claims by enabling any one or more of: identifying issues early (e.g., at pick-up from manufacturer), tailoring inspection requirements (e.g., to the manufacturer, delivery personnel, etc.), tailoring claims to identified damage (e.g., scratched product report targets solution to reported damage, damaging reporting is specific and validate by images, etc.), and automatic resolutions to delivery/manufacture based issues. It is also realize that efficient and even automatic resolution of problems during delivery reduces the likely hood of the order goods being returned in their entirety.

In another aspect, damage reporting and inspection requirements can be linked to automatic resolutions. In one example, damage reports can trigger conference calls between customer support personnel, the customer and other parties needed to resolve a damage report issues (e.g., manufacturer to produce replacement, service technicians to restore a scratched object at delivery, insurance providers to submit a claim, etc.). In some embodiment, a damage report triggers the system to e-mail all stakeholders in a product delivery specifying the reported damage, an automatic resolution, and acceptance by each stakeholder of the automatic resolution (e.g., customer acceptance, manufacturer acceptance, carrier acceptance, insurance claim acceptance, etc.).

According to one aspect, a system for delivery management is provided. The system comprises at least one processor operatively connected to a memory, the at least one processor configured to manage a plurality of system components, wherein the system further comprises a manifest component configured to aggregate a plurality of items into a manifest, an identifier component configured to identify respective items within the aggregated plurality of items using the manifest, a tracking component configured to calculate a delivery route and track the plurality of items during a plurality of delivery events, and an inspection component configured to require inspection of the respective items at each of the plurality of delivery events.

In one embodiment, the system further comprises a display component configured to generate a display for a subscriber system through which customer orders are accepted. In one embodiment, the display component is further configured to encode information in a display of items for sale. In one embodiment, the display component is further configured to encode a wholesale price in the display for the items for sale. In one embodiment, the system is further configured to encode the wholesale price based on introducing additional characters into an obfuscated alpha numeric value. In one embodiment, the system is further configured to encode the wholesale price based on labeling the encoded information with a product description label. In one embodiment, the manifest component is configured to enable transfer of the manifest between two systems using one of a QR code and an NFC signal. In one embodiment, the manifest component is configured to optimize selection from a plurality of manufacturers responsive to determining one or more shortest delivery routes.

In one embodiment, the inspection component is further configured to prevent access to delivery information until input of inspection information of the respective items at each of the plurality of delivery events. In one embodiment, the manifest component is further configured to calculate an optimal arrangement and number of vehicles necessary to deliver the plurality of items. In one embodiment, the identifier component is further configured to verify the condition of the plurality of items by requiring photos of the each of the plurality of items prior to the plurality of items being shipped from a manufacturer. In one embodiment, the identifier component is further configured to identify the respective items using at least one of a stock keeping unit (SKU) number, a quick response (QR) code, a near field communication (NFC) code, global positioning system (GPS) coordinates, and radio-frequency identification (RFID). In one embodiment, the tracking component is further configured to track and validate any movement of an item on, off, or within a vehicle. In one embodiment, the tracking component is configured to continually monitor item location, and responsive to detecting proximity to a delivery location trigger at least one mobile application associated with delivery personnel, wherein the mobile application includes functions and associated user interfaces for capturing required delivery information. In one embodiment, the identifier component is configured to receive inspection information from the inspection component and validate proper inspection by matching item characteristics to the required photos.

In one embodiment, the tracking component is further configured to track and validate movement of at least one item as proper using RFID or GPS signals associated with at least one item. In one embodiment, the inspection component requests an inspection responsive to a non-validated movement of the item. In one embodiment, the inspection component request triggers a mobile application associated with delivery personnel to display user interface adapted to receive inspection information. In one embodiment, the inspection component further comprises a mobile application configured to prevent access to delivery information for the at least one item until required inspection information is submitted and validated. In one embodiment, the plurality of delivery events include a group comprising a pickup from a manufacturer, a transport for distribution, a local distribution, customer delivery, and a transition in a freight distribution center. In one embodiment, the system further comprises a payment component configured to process payments by customers. In one embodiment, the payment component is further configured to distribute payments to at least one manufacturer as cash or cash equivalent. In one embodiment, the inspection component is further configured to require status updates to validate an inspection has occurred.

In one embodiment, the inspection component is further configured to receive photos or videos of each of the plurality of items, analyze received photos or videos of each of the plurality of items, and detect damage to each of the plurality of items. In one embodiment, the inspection component is further configured to display a request for updated status information for respective items at a delivery event, receive the updated status information from delivery personnel, and responsive to receiving the updated status information, enable a next delivery segment. In one embodiment, the inspection component is configured to disable a portion of delivery information until updated status information is received. In one embodiment, the inspection component is further configured to present a damage reporting interface (e.g., to a user on a mobile system).

According to one aspect, a computer implemented method for delivery management, the method comprises acts of aggregating, by a computer system, a plurality of items into a manifest, wherein aggregating the plurality of items includes managing ordering of items for fabrication and incorporation into the manifest, identifying, by the computer system, respective items within the aggregated plurality of items using the manifest, calculating, by the computer system, a delivery route for the plurality of items, tracking, by the computer system, the plurality of items during a plurality of delivery events after fabrication, and requiring, by the computer system, inspection of the respective items at each of the plurality of delivery events.

In one embodiment, the method further comprises an act of generating a display for a subscriber system through which customer orders are accepted. In one embodiment, the method further comprises an act of encoding information in a display of items for sale. In one embodiment, the act of encoding information includes an act of encoding a wholesale price based in the display. In one embodiment, the act of encoding information includes an act of encoding the wholesale price based on one or more of introducing additional characters into an obfuscated alpha numeric value or labeling the encoded information with a product description label. In one embodiment, the method further comprises an act of transferring the manifest between two systems responsive to scanning one of a QR code and an NFC signal.

In one embodiment, the method further comprises an act of preventing access to delivery information until input of inspection information of the respective items at a respective one of each of the plurality of delivery events. In one embodiment, the method further comprises an act of calculating an optimal arrangement for fabrication and distribution of the plurality of items, and a number of vehicles necessary to deliver the plurality of items. In one embodiment, the method further comprises an act of verifying a condition of the plurality of items by requiring images of each of the plurality of items being shipped from a manufacturer. In one embodiment, the act of identifying respective items includes an act of identifying the respective items using at least one of a stock keeping unit (SKU) number, a quick response (QR) code, a near field communication (NFC) code, global positioning system (GPS) coordinates, and radio-frequency identification (RFID).

In one embodiment, the method further comprises an act of tracking and validating any movement of an item on, off, or within a vehicle. In one embodiment, the acts of tracking and validating includes acts of tracking and validating the movement of the item as proper by analyzing movement of the plurality of items responsive to receiving an RFID or GPS transmission. In one embodiment, the method further comprises an act of requiring an inspection responsive to a non-validated movement of the item. In one embodiment, the method further comprises an act of requiring an inspection responsive to a delivery event, wherein the act of requiring the inspection includes an act of triggering an inspection interface, and disabling access to delivery information until validating inspection information. In one embodiment, the plurality of delivery events include a group comprising a pickup from a manufacturer, a transport for distribution, a local distribution, customer delivery, and a transition in a freight distribution center. In one embodiment, the method further comprises an act of processing payment by customers. In one embodiment, the method further comprises an act of distributing payments to at least one manufacturer as cash or cash equivalent. In one embodiment, the method further comprises an act of requiring status updates to validate an inspection has occurred.

According to one aspect, the method further comprises acts of receiving photos or videos of each of the plurality of items, analyzing submitted photos or videos of each of the plurality of items, and responsive to analyzing the submitted photos or videos, detecting damage to each of the plurality of items. In one embodiment, the method, further comprises acts of displaying a request for updated status information for respective items at a delivery event, receiving the updated status information from delivery personnel, and responsive to receiving the updated status information, enabling a next delivery segment. In one embodiment, the method further comprises an act of disabling a portion of delivery information until updated status information is received. In one embodiment, the method further comprises an act of presenting a damage reporting interface responsive to identifying an indication of damage.

According to one aspect, a system for delivery management comprises at least one processor operatively connected to a memory, the at least one processor configured to manage a plurality of system components, wherein the system further comprises a manifest component configured to aggregate a plurality of items into a manifest, wherein the manifest component manages ordering of items for fabrication and incorporation into the manifest, an identifier component configured to identify respective items within the aggregated plurality of items using the manifest, a tracking component configured to calculate at least one delivery route and track the plurality of items during a plurality of delivery events during transit after fabrication; and a means for requiring inspection of the respective items at each of the plurality of delivery events. In one embodiment, the manifest component is configured to optimize selection from a plurality of manufacturers responsive to determining one or more shortest delivery routes. In one embodiment, the manifest component is configured to enable transfer of the manifest between two systems using one of a QR code and an NFC signal. In one embodiment, the system further comprises access means for preventing access to delivery information until input of inspection information of the respective items at each of the plurality of delivery events. In one embodiment, the manifest component is further configured to calculate an optimal arrangement and number of vehicles necessary to deliver the plurality of items.

In one embodiment, the system further comprises means for verifying the condition of the plurality of items, wherein verifying includes requiring photos of the each of the plurality of items prior to the plurality of items being shipped from a manufacturer. In one embodiment, the system further comprises means for receiving inspection information from the inspection means and means for validating proper inspection by matching item characteristics to the required photos. In one embodiment, the system further includes means for tracking validating any movement of an item on, off, or within a vehicle. In one embodiment, the means for tracking continually monitors item location, and responsive to detecting proximity to a delivery location triggers at least one mobile application associated with delivery personnel, wherein the mobile application includes functions and associated user interfaces for capturing required delivery information. In one embodiment, the tracking means tracks and validates movement of at least one item as proper using RFID or GPS signals associated with the at least one item. In one embodiment, the system further includes means for requesting an inspection responsive to a non-validated movement of the item. In one embodiment, the system further includes means for triggering a mobile application associated with delivery personnel to display user interfaces adapted to receive inspection information. In one embodiment, the system further includes means for preventing access to delivery information for the at least one item until required inspection information is submitted and validated on a mobile device. In one embodiment, the plurality of delivery events include a group comprising a pickup from a manufacturer, a transport for distribution, a local distribution, customer delivery, and a transition in a freight distribution center.

According to one aspect, a system for reporting damage during transit is provided. The system comprises at least one processor operatively connected to a memory, the at least one processor configured to manage a plurality of system components, wherein the system further comprises a tracking component configured to identify delivery events, an alerting component configured to communicate an alert to inspect a plurality of items to delivery personnel, an inspection component configured to require an inspection of the plurality of items and receive an indication of a status of each of the plurality of items, and a damage reporting component configured to display a damage reporting interface responsive to receiving an indication of damage from the inspection component via a communication network. In one embodiment, the damage reporting component includes a timer component configured to display an amount of time to receive damage information, responsive to detecting a delivery event.

In one embodiment, the inspection component is further configured to require status updates to validate an inspection has occurred. In one embodiment, the inspection component is further configured to analyze submitted photos or videos of each of the plurality of items, detect damage to any of the plurality of items, and accept user identification of damage to any of the plurality of items. In one embodiment, the inspection component is further configured to display a request for updated status information for respective items at a delivery event, receive the updated status information from delivery personnel, and responsive to receiving or validating the updated status information, enable access to information associated with a next delivery segment. In one embodiment, the inspection component is configured to disable access to at least a portion of delivery information until updated status information is received. In one embodiment, the damage reporting component is further configured to present a damage reporting interface on a mobile device executing a mobile application.

In one embodiment, the damage reporting component is further configured to automate a call to a customer service desk if the amount of time has passed and trigger limited access to subsequent delivery information or limited delivery functionality responsive to the amount of time passing. In one embodiment, the damage reporting component is further configured to require input of damage information including text and at least one member of a group comprising photos and videos detailing the damage to at least one item. In one embodiment, the damage reporting component is further configured to automatically communicate the damage information to at least one of a manufacturer, a subscriber, and a customer. In one embodiment, the damage reporting component is further configured to update routing information relating to the plurality of items responsive to the received damage information, including at least one of automatically coordinating delivery of original items and replacement items for the damaged items or rescheduling subsequent deliveries for undamaged items. In one embodiment, the damage reporting component is configured to disable access to delivery information until the damage information is received. In one embodiment, the damage reporting component is configured to enable access to the delivery information after the damage information is received.

In one embodiment, the damage reporting component is configured to automatically generate an action responsive to receiving an indication of damage. In one embodiment, the action is selected based on damage algorithms and includes communicating, automatically, an instruction to manufacture a replacement for one or more damaged items, wherein the damage component is further configured to determine the replacement can be delivered within a predetermined time or automatically request customer approval of a later delivery time. In one embodiment, the damage reporting component is configured to automatically trigger an interactive customer resolution session, wherein the interactive customer resolution session includes an open communication channel with the customer, presentation of options for resolving identified damage for user selection, and execution of the user-selected option. In one embodiment, the damage algorithms include evaluation of insurance information to determine the action, wherein for insured items execution of the algorithm selects at least manufacture and delivery of a new replacement item or manufacture and delivery of a replacement component that is an element of a damaged item.

According to one aspect, a computer-implemented method for reporting damage during transit, the method comprises acts of identifying, by a computer system, a delivery event, communicating, by the computer system to delivery personnel via a mobile device, an alert to inspect a plurality of items, requiring, by the computer system, an inspection of the plurality of items, receiving, by the computer system from a mobile device, an indication of a status of each of the plurality of items, and displaying, by the computer system, a damage reporting interface responsive to receiving an indication of damage. In one embodiment, the method further comprises automatically analyzing submitted photos or videos of each of the plurality of items, and either automatically detecting damage to any of the plurality of items or accepting user identification of damage to any of the plurality of items. In one embodiment, the method further comprises displaying a request for updated status information for respective items at a delivery event, receiving the updated status information from delivery personnel, and responsive to receiving or validating the updated status information, enabling access to information associated with a next delivery segment. In one embodiment, the method further comprises disabling access to at least a portion of delivery information until updated status information is received. In one embodiment, the method further comprises presenting a damage reporting interface on a mobile device executing a mobile application. In one embodiment, the method further comprises an act of displaying an amount of time to receive damage information. In one embodiment, the method further comprises an act of automating a call to a customer service desk if the amount of time has passed and triggering limited access to subsequent delivery information or limited delivery functionality responsive to the amount of time passing. In one aspect, the method further comprises an act of receiving damage information including text and at least one member of a group comprising photos and videos detailing the damage to at least one item. In one embodiment, the method further comprises an act of automatically communicating the damage information to at least one of a group comprising a manufacturer, a subscriber, and a customer. In one embodiment, the method further comprises an act of updating routing information relating to the plurality of items responsive to receiving the damage information, the act of updating including at least one of automatically coordinating delivery of original items and replacement items for the damaged items or rescheduling subsequent deliveries for undamaged items. In one embodiment, the method further comprises disabling access to delivery information until the damage information is received. In one embodiment, the method further comprises an act of enabling access to the delivery information after the damage information is received.

In one embodiment, the method further comprises an act of automatically generating an action responsive to receiving the indication of damage. In one embodiment, the method further comprises triggering, automatically, an interactive customer resolution session, wherein the interactive customer resolution session includes an open communication channel with the customer, presentation of system generated options for resolving identified damage for user selection, and execution of the user selected option automatically by the system. In one embodiment, the method further comprises selecting an action based on executing damage algorithms, and wherein executing the damage algorithms includes communicating, automatically, an instruction to manufacture a replacement for one or more damaged items, responsive to determining the replacement can be delivered within a predetermined time or receiving request customer approval of a later delivery time. In one embodiment, execution of the damage algorithms includes an act of evaluating insurance information to determine an action, wherein for insured items execution of the algorithm selects at least manufacture and delivery of a new replacement item or manufacture and delivery of a replacement component that is an element of a damaged item.

According to one aspect, a system for reporting damage during transit is described, the system comprising at least one processor operatively connected to a memory, the at least one processor configured to manage a plurality of system components, wherein the system further comprises a tracking component configured to identify delivery events, an alerting component configured to communicate an alert to inspect a plurality of items to delivery personnel, a means for requiring inspection of the plurality of items and receiving an indication of a status of each of the plurality of items and a damage reporting component configured to display a damage reporting interface responsive to receiving an indication of damage from the inspection component via a communication component. In one embodiment, the system further comprises means for requiring status updates to validate an inspection has occurred. In one embodiment, the means for requiring inspection of the plurality of items analyzes submitted photos or videos of each of the plurality of items, detects damage to any of the plurality of items, and accepts user identification of damage to any of the plurality of items. In one embodiment, the means for requiring inspection of the plurality of items displays a request for updated status information for respective items at a delivery event, receives the updated status information from delivery personnel, and responsive to receiving or validating the updated status information, enables access to information associated with a next delivery segment.

In one embodiment, the system further comprises means for disabling access to at least a portion of delivery information until updated status information is received. In one embodiment, the system further includes means for presenting a damage reporting interface on a mobile device executing a mobile application. In one embodiment, the system further includes displaying an amount of time to receive damage information, responsive to detecting a delivery event. In one embodiment, the system further comprises automating a call to a customer service desk if the amount of time has passed, and triggering limited access to subsequent delivery information or limited delivery functionality responsive to the amount of time passing. In one embodiment, the system further includes means for requiring input of damage information including at least one member of a group comprising photos, videos, and text detailing the damage to at least one item. In one embodiment, the system further includes means for automatically communicating the damage information to at least one of a group comprising a manufacturer, a subscriber, and a customer. In one embodiment, the system further includes means for updating routing information relating to the plurality of items responsive to the received damage information, including at least one of automatically coordinating delivery of original items and replacement items for the damaged items or rescheduling subsequent deliveries for undamaged items. In one embodiment, the system further includes means for automatically generating an action responsive to receiving an indication of damage. In one embodiment, the action is selected based on damage algorithms and includes means for communicating, automatically, an instruction to manufacture a replacement for one or more damaged items, wherein the means for automatically generating an action determines the replacement can be delivered within a predetermined time or automatically requests customer approval of a later delivery time. In one embodiment, the system further includes means for automatically triggering an interactive customer resolution session, wherein the interactive customer resolution session includes an open communication channel with the customer, presentation of options for resolving identified damage for user selection, and execution of the user selected option. In one embodiment, the system further includes means for evaluating insurance information to determine the action, wherein for insured items execution of the algorithm selects at least manufacture and delivery of a new replacement item or manufacture and delivery of a replacement component that is an element of a damaged item.

According to one aspect, a system for delivery management is described, the system comprising at least one processor operatively connected to a memory, the at least one processor configured to manage a plurality of system components, wherein the system further comprises a tracking component configured to identify delivery events, wherein the tracking component is further configured to identify a customer delivery, an identification component configured to receive identifying information associated with one or more items for the customer delivery, an inspection component configured to require inspection of the one or more items responsive to identifying the customer delivery, wherein the inspection component is further configured to require an initial customer acceptance of the one or more items, and an imaging component configured to prompt delivery personnel to image each of the one or more items in place within a customer delivery location. In one embodiment, the system further includes means for requiring images of each visualizable angle of each respective one of the one or more items. In one embodiment, the system further includes means for identifying possible angles for imaging the respective one of the one or more items. In one embodiment, the system further includes means for requiring one or more images of an area surrounding an unboxed and in place respective one of the one or more items. In one embodiment, the system further includes means for generating imaging interface displays, wherein the imaging interface displays are associated with a simulated perspective view of each angle to be captured of the respective one of the one or more items. In one embodiment, the means for generating imaging interface displays analyzes a field of view of a camera and provides a visual indication responsive to determining the field of view matches a required one of the visualizable angles. In one embodiment, the system further comprises means for accepting and validating video capture of the respective one of the one or more items.

In one embodiment, the means for validating the video capture includes means for determining the respective one of the one or more items is unpackaged, and the video capture includes a surrounding area abutting the respective one of the one or more items. In one embodiment, the system further includes means for validating a plurality of images of the respective one of the one or more items, and responsive to validation requiring customer certification of an undamaged delivery area. In one embodiment, the system further includes means for requiring images of the delivery area, and managing capture of multiple angles of the delivery area. In one embodiment, the system further includes means for requiring images of the delivery area, and managing capture of multiple angles of the delivery area or validating images of the respective one of the one or more items include images of the delivery area. In one embodiment, the system further comprises means for validating the one or more items for the customer delivery responsive to receiving the identifying information. In one embodiment, the system further comprises means for disabling access to delivery functions or subsequent delivery information based on requiring information inputs from an end user.

According to one aspect, a computer-implemented method for delivery management is described, the method comprising acts of identifying, by a computer system, an item, indicating, by the computer system, a rejection status for the identified item, receiving, by the computer system, a rejection description from a first user, requiring, by the computer system, acknowledgment of the rejection description from a second user, receiving, by the computer system, a first set of images of the item from the first user, verifying, by the computer system, the content of the first set of images, requiring, by the computer system, acknowledgment of the first set images from the second user, receiving, by the computer system, a second set of images of an area surrounding the item from the first user responsive to receiving acknowledgment of the first set of images, verifying, by the computer system, the content of the second set of images, and requiring, by the computer system, acknowledgement of the second set of images from the second user.

According to one aspect, a computer-implemented method for delivery management is described, the method comprising acts of identifying, by a computer system, delivery events, wherein the act of identifying delivery events includes identifying a customer delivery, receiving, by the computer system, identifying information associated with one or more items for the customer delivery, requiring, by the computer system, inspection of the one or more items responsive to identifying the customer delivery, requiring, by the computer system, an initial customer acceptance of the one or more items, and prompting, by the computer system, delivery personnel to image each of the one or more items in place within a customer delivery location. In one embodiment, the method further comprises an act of requiring images of each visualizable angle of each respective one of the one or more items. In one embodiment, the method further comprises an act of identifying possible angles for imaging the respective one of the one or more items. In one embodiment, the method further comprises an act of requiring one or more images of an area surrounding an unboxed and in-place respective one of the one or more items. In one embodiment, the method further comprises an act of generating imaging interface displays, wherein the imaging interface displays are associated with a simulated perspective view of each angle to be captured of the respective one of the one or more items. In one embodiment, the method further comprises acts of analyzing a field of view of a camera, and providing a visual indication responsive to determining the field of view matches a required one of the visualizable angles.

In one embodiment, the method further comprises an act of accepting and validating video capture of the respective one of the one or more items. In one embodiment, the act of validating video capture includes determining the respective one of the one or more items is unpackaged, and the video capture includes a surrounding area abutting the respective one of the one or more items. In one embodiment, the method further comprises acts of validating a plurality of images of the respective one of the one or more items, and requiring, responsive to validation, customer certification of an undamaged delivery area. In one embodiment, the method further comprises acts of requiring images of the delivery area, and managing capture of multiple angles of the delivery area. In one embodiment, the method further comprises acts of requiring images of the delivery area, and managing capture of multiple angles of the delivery area or validating images of the respective one of the one or more items includes images of the delivery area. In one embodiment, the method further comprises an act of validating the one or more items for the customer delivery responsive to receiving the identifying information. In one embodiment, the method further comprises an act of disabling access to delivery functions or subsequent delivery information based on requiring information inputs from an end user.

According to one aspect, a system for delivery management is provided, the system comprising at least one processor operatively connected to a memory, the at least one processor configured to manage a plurality of system components, wherein the system further comprises, a tracking component configured to identify delivery events, wherein the tracking component is further configured to identify a customer delivery, an identification component configured to receive identifying information associated with one or more items for the customer delivery, a means for requiring inspection of the one or more items responsive to identifying the customer delivery, wherein the means for requiring inspection further includes requiring an initial customer acceptance of the one or more items, and an imaging component configured to prompt delivery personnel to image each of the one or more items in place within a customer delivery location. In one embodiment, the image capture component is further configured to require images of each visualizable angle of each respective one of the one or more items. In one embodiment, the image capture component is further configured to identify possible angles for imaging the respective one of the one or more items. In one embodiment, the image capture component is further configured require one or more images of an area surrounding an unboxed and in place respective one of the one or more items. In one embodiment, the image capture component is further configured to generate imaging interface display, wherein the imaging interface displays are associated with a simulated perspective view of each angle to be captured of the respective one of the one or more items.

In one embodiment, the image capture component is further configured to analyze a field of view of a camera and provide a visual indication responsive to determining the field of view matches a required one of the visualizable angles. In one embodiment, the imaging component is further configured to accept and validate video capture of the respective one of the one or more items. In one embodiment, validation of the video capture includes determining the respective one of the one or more items is unpackaged, and the video capture includes a surrounding area abutting the respective one of the one or more items. In one embodiment, the means for requiring inspection of the one or more items further includes validating a plurality of images of the respective one of the one or more items, and responsive to validation requiring customer certification of an undamaged delivery area. In one embodiment, the means for requiring inspection of the one or more items further includes requiring images of the delivery area, and managing capture of multiple angles of the delivery area. In one embodiment, the means for requiring inspection of the one or more items further includes requiring images of the delivery area, and managing capture of multiple angles of the delivery area or validating images of the respective one of the one or more items include images of the delivery area. In one embodiment, the identification component is further configured to validate the one or more items for the customer delivery responsive to receiving the identifying information. In one embodiment, the means for requiring inspection of the one or more items further includes disabling access to delivery functions or subsequent delivery information based on requiring information inputs from an end user. In one embodiment, the method further comprises an act of submitting, by the computer system, item information to a server.

According to one aspect, a system for delivery management is provided, the system comprising at least one processor operatively connected to a memory, the at least one processor configured to manage a plurality of system components, wherein the system further comprises a tracking component configured to identify delivery events, wherein the tracking component is further configured to identify a customer delivery, an identification component configured to receive identifying information associated with one or more items for the customer delivery, an inspection component configured to require inspection of the one or more items, wherein the inspection component is further configured to trigger an imaging component responsive to a customer rejection of any one of the one or more items, and an imaging component configured to prompt delivery personnel to image each of the one or more items in place within a customer delivery location, including images of any rejected item. In one embodiment, the system further comprises means for requiring inspection of the one or more items responsive to identifying the customer delivery, and requiring an initial customer acceptance or rejection of the one or more items. In one embodiment, the system further comprises means for requiring images of each visualizable angle of each respective one of the one or more items identified as rejected. In one embodiment, the system further comprises means for identifying possible angles for imaging the respective one of the one or more items. In one embodiment, the system further comprises means for requiring one or more images of an area surrounding an unboxed and in place respective one of the one or more items identified as rejected.

In one embodiment, the system further comprises means for generating imaging interface displays, wherein the imaging interface displays are associated with a simulated perspective view of each angle to be captured of the respective one of the one or more items identified as rejected. In one embodiment, the means for generating imaging interface displays analyzes a field of view of a camera and provides a visual indication responsive to determining the field of view matches a required one of the visualizable angles. In one embodiment, the system further includes means for accepting and validating video capture of the respective one of the one or more items identified as rejected. In one embodiment, the means for validating the video capture includes determining the respective one of the one or more items identified as rejected is unpackaged, and the video capture includes a surrounding area abutting the respective one of the one or more items identified as rejected. In one embodiment, the system further comprises means for validating a plurality of images of the respective one of the one or more items identified as rejected, and responsive to validation, requiring customer certification of an undamaged delivery area. In one embodiment, the system further comprises means for requiring images of the delivery area, and managing capture of multiple angles of the delivery area. In one embodiment, the system further comprises means for requiring images of the delivery area, and managing capture of multiple angles of the delivery area or validating images of the respective one of the one or more items include images of the delivery area. In one embodiment, the system further comprises means for validating the one or more items for the customer delivery responsive to receiving the identifying information. In one embodiment, the system further comprises means for disabling access to delivery functions or subsequent delivery information based on requiring information inputs from an end user.

According to one aspect, a computer-implemented method for delivery management is provided, the method comprising acts of identifying, by a computer system, an item, indicating, by the computer system, an acceptance status for the identified item, receiving, by the computer system, an acceptance description from a first user, requiring, by the computer system, acknowledgement of the acceptance description from a second user, receiving, by the computer system, a first set of images of the item from the first user, verifying, by the computer system, the content of the first set of images, requiring, by the computer system, acknowledgement of the first set of images from the second user, receiving, by the computer system, a second set of images of an area surrounding the item from the first user responsive to receiving acknowledgment of the first set of images, verifying, by the computer system, the content of the second set of images, and requiring, by the computer system, acknowledgement of the second set of images from the second user.

According to one aspect, a computer-implemented method for delivery management is provided, the method comprising acts of identifying, by a computer system, delivery events, wherein the act of identifying delivery events includes identifying a customer delivery, receiving, by a computer system, identifying information associated with one or more items for the customer delivery, requiring, by the computer system, inspection of the one or more items, wherein the act of requiring includes triggering an imaging component responsive to a customer rejection of any one of the one or more items, and prompting, by the computer system, delivery personnel to image each of the one or more items in place within a customer delivery location, wherein the act of prompting includes requiring capture of images of any rejected item. In one embodiment, the method further comprises acts of requiring inspection of the one or more items responsive to identifying the customer delivery, and requiring an initial customer acceptance or rejection of the one or more items. In one embodiment, the method further comprises an act of requiring images of each visualizable angle of each respective one of the one or more items identified as rejected. In one embodiment, the method further comprises an act of identifying possible angles for imaging the respective one of the one or more items. In one embodiment, the method further comprises an act of requiring one or more images of an area surrounding an unboxed and in-place respective one of the one or more items identified as rejected. In one embodiment, the method further comprises an act of generating imaging interface displays, wherein the imaging interface displays are associated with a simulated perspective view of each angle to be captured of the respective one of the one or more items identified as rejected. In one embodiment, the method further comprises analyzing a field of view of a camera, and providing a visual indication respective to determining the field of view matches a required one of the visualizable angles. In one embodiment, the method further comprises acts of accepting and validating video capture of the respective one of the one or more items identified as rejected. In one embodiment, the method further comprises an act of determining the respective one of the one or more items identified as rejected is unpackaged, and the video capture includes a surrounding area abutting the respective one of the one or more items identified as rejected.

In one embodiment, the method further comprises acts of validating a plurality of images of the respective one of the one or more items identified as rejected, and requiring, responsive to validation, customer certification of an undamaged delivery area. In one embodiment, the method further comprises acts of requiring images of the delivery area, and managing capture of multiple angles of the delivery area. In one embodiment, the method further comprises acts of requiring images of the delivery area, and managing capture of multiple angles of the delivery area of validating of the respective one of the one or more items includes images of the delivery area. In one embodiment, the method further comprises an act of validating the one or more items for the customer delivery responsive to receiving the identifying information. In one embodiment, the method further comprises an act of disabling access to delivery functions or subsequent delivery information based on requiring information inputs from an end user.

According to one aspect, a system for delivery management is provided, the system comprising at least one processor operatively connected to a memory, the at least one processor configured to manage a plurality of system components, wherein the system further comprises a tracking component configured to identify delivery events, wherein the tracking component is further configured to identify a customer delivery, an identification component configured to receive identifying information associated with one or more items for the customer delivery, means for requiring inspection of the one or more items, and triggering image capture of the one or more items responsive to a customer rejection, and an imaging component configured to prompt delivery personnel to image each of the one or more items in place within a customer delivery location, including images of any rejected item. In one embodiment, the system further includes means for inspecting the one or more items responsive to identifying the customer delivery, and requiring an initial customer acceptance or rejection of the one or more items. In one embodiment, the system further comprises means for requiring images of each visualizable angle of each respective one of the one or more items identified as rejected. In one embodiment, the system further comprises means for identifying possible angles for imaging the respective one of the one or more items. In one embodiment, the system further comprises means for requiring one or more images of an area surrounding an unboxed and in place respective one of the one or more items identified as rejected. In one embodiment, the system further comprises means for generating imaging interface displays, wherein the imaging interface displays are associated with a simulated perspective view of each angle to be captured of the respective one of the one or more items identified as rejected. In one embodiment, the system further comprises means for analyzing a field of view of a camera and providing a visual indication responsive to determining the field of view matches a required one of the visualizable angles. In one embodiment, the system further includes means for accepting and validating video capture of the respective one of the one or more items identified as rejected. In one embodiment, the means for validating the video capture includes determining the respective one of the one or more items identified as rejected is unpackaged, and the video capture includes a surrounding area abutting the respective one of the one or more items identified as rejected.

In one embodiment, the system further comprises means for validating a plurality of images of the respective one of the one or more items identified as rejected, and responsive to validation, requiring customer certification of an undamaged delivery area. In one embodiment, the system further comprises means requiring images of the delivery area, and managing capture of multiple angles of the delivery area. In one embodiment, the system further includes means for requiring images of the delivery area, and managing capture of multiple angles of the delivery area or validating images of the respective one of the one or more items include images of the delivery area. In one embodiment, the system further includes means for validating the one or more items for the customer delivery responsive to receiving the identifying information. In one embodiment, the system further includes means for disabling access to delivery functions or subsequent delivery information based on requiring information inputs from an end user.

According to one aspect, a user interface for delivery management execution is provided, the user interface comprising a user interface component, executed by at least one processor, operable to display at least one user interface, wherein the at least one user interface is configured to display and accept information associated with a plurality of delivery management information views. In one embodiment, the plurality of delivery management information views include a first view operable to display and accept manifest information, including information indicating one or more items for shipping, a second view operable to display, accept, filter and sort general delivery information associated with the one or more items for shipping, a third view operable to display, accept, filter and sort manifest scheduling information, including delivery routing information displays, and a fourth view operable to display, accept, filter and sort order verification information, including in the fourth view visual displays for capturing inspection information displayed responsive to identified delivery events. In one embodiment, the user interface component is further configured to operate in a lockout mode configured to limit access to any of the views and functions made available, wherein the lockout mode is triggered by the user interface component responsive to receiving a lockout status upon a determination that required information has not been submitted, and wherein the lockout view limits user access to the views shown, and further limits display of fully functions views to those required to input information to resolve the lockout status.

In one embodiment, the determination that required information has not been submitted includes identification by the user interface component that required inspection information has not been submitted. In one embodiment, the determination that required information has not been submitted includes identification by the user interface component that information submitted in response to required inspection information does not meet validation analysis. In one embodiment, the determination that required information has not been submitted includes receipt of a status identifier from a remote system indicating that required inspection information has not been submitted. In one embodiment, the determination that required information has not been submitted includes receipt of a status identifier from a remote system indicating that information submitted in response to required inspection information does not meet validation testing. In one embodiment, the fourth view is configured to require entry of the inspection information displayed responsive to identification of a delivery events, wherein the delivery event includes a customer delivery. In one embodiment, the fourth view includes access to one or more imaging visualizations for capturing images of the one or more items.

In one embodiment, the imaging visualizations include views for capturing each visualizable angle of the one or more items. In one embodiment, the user interface component is configured to analyze a current field of view of a camera to determine a visualizable angle of the one or more items is possible to capture. In one embodiment, the user interface component is configured to analyze a current field of view of a camera to determine that the current field of view matches a visualizable angle of the one or more items. In one embodiment, the user interface component is configured to automatically capture an image of the one or more items responsive to determining that the current field of view matches the visualizable angle and is in focus. In one embodiment, the user interface component is further configured to generate a fifth view operable to display tracking information for the one or more items being fabricated or delivered.

In one embodiment, the fifth view includes at least an integrated display of a delivery route having at least a first delivery location, and at least a second delivery location. In one embodiment, the display of the delivery route includes a normal view of the delivery route and a lockout view of the delivery route, wherein the lockout view is configured to obscure information associated with the delivery route. In one embodiment, the lockout view include a notification display indicating a current lockout status, wherein the notification display includes or is an executable visualization for transitioning the user interface to an information entry view to submit required information. In one embodiment, the each view of non-required information includes a normal view and a lockout view configured to obscure the information shown in a respective normal view, wherein the lock out view includes a notification display indicating a current lockout status, wherein the notification display includes or is an executable visualization for transitioning the user interface to an information entry view to submit required information. In one embodiment, the user interface is further configured to display an alert responsive to any transition from required input displays and functionality to another view, wherein the alert indicates a current lockout status and provides an information display indicating information necessary to resolve the lockout status.

In one embodiment, the user interface component is further configured to display a sixth view including visual elements to display, accept, filter and sort line item information associated with the one or more items, and wherein the user interface component is configured to transition a current display on a computer device between any of the delivery management information views responsive to user input. In one embodiment, the user interface component is configured to require inspection information at the delivery events, wherein the required information includes images of an area surrounding the one or more items at a delivery location. In one embodiment, the user interface component is configured to trigger the lockout mode of operation upon determining that required information has not been submitted or is not valid. In one embodiment, a damage reporting view is provided that includes display for accepting description of damage to the one or more items, and requires images of the one or more items that have been damaged. In one embodiment, a remediation view is provided that generates and displays automated options for resolving the identified damage for customer acceptance. In one embodiment, a customer validation view is displayed responsive to receiving inspection information for the one or more items, wherein the customer validation view requires a custom affirmation of the captured inspection information. In one embodiment, the user interface component is further configure to limit access to customer delivery functions, including inspection functions, until information associated with a delivery status indicates that a delivery is proximate based on location information or imminent based on estimated delivery time.

Other aspects, embodiments and advantages of these exemplary aspects and embodiments are discussed in detail below. Moreover, it is to be understood that both the foregoing information and the following detailed description are merely illustrative examples of various aspects and embodiments, and are intended to provide an overview or framework for understanding the nature and character of the claimed aspects and embodiments. Any embodiment disclosed herein can be combined with any other embodiment. References to "an embodiment," "an example," "some embodiments," "some examples," "an alternate embodiment," "various embodiments," "one embodiment," "at least one embodiment," "this and other embodiments" or the like are not necessarily mutually exclusive and are intended to indicate that a particular feature, structure, or characteristic described in connection with the embodiment can be included in at least one embodiment. The appearances of such terms herein are not necessarily all referring to the same embodiment or example.

BRIEF DESCRIPTION OF DRAWINGS

Various aspects of at least one embodiment are discussed below with reference to the accompanying figures, which are not intended to be drawn to scale. The figures are included to provide an illustration and a further understanding of the various aspects and embodiments, and are incorporated in and constitute a part of this specification, but are not intended as a definition of the limits of any particular embodiment. The drawings, together with the remainder of the specification, serve to explain principles and operations of the described and claimed aspects and embodiments. In the figures, each identical or nearly identical component that is illustrated in various figures is represented by a like numeral. For purposes of clarity, not every component can be labeled in every figure. In the figures:

FIG. 16 is a user interface illustrating a completed customer survey according to one embodiment;

FIG. 18 is a user interface illustrating an order overview page, according to one embodiment;

FIG. 19 is a user interface illustrating a manifest overview page, according to one embodiment;

FIG. 22 is a user interface illustrating a content page, according to one embodiment FIG. 23 is a user interface illustrating a verifications page, according to one embodiment;

FIG. 24 is a user interface illustrating a main manifest page, according to one embodiment;

FIG. 25 is a user interface illustrating a general information page, according to one embodiment;

FIG. 26 is a user interface illustrating a general information page with priority flags, according to one embodiment;

FIG. 27 is a user interface illustrating a general information page with an order menu, according to one embodiment;

FIG. 28 is a user interface illustrating an item tracking page, according to one embodiment;

FIG. 29 is a user interface illustrating a line items page, according to one embodiment;

FIGS. 30A-B are example code for execution by a delivery management system and/or components;

FIG. 31 is example code for execution by a delivery management system and/or components;

FIG. 32 is example code for execution by a delivery management system and/or components;

FIG. 33 is example code for execution by a delivery management system and/or components; and FIG. 34 is example code for execution by a delivery management system and/or components.

DETAILED DESCRIPTION

Figure 1:
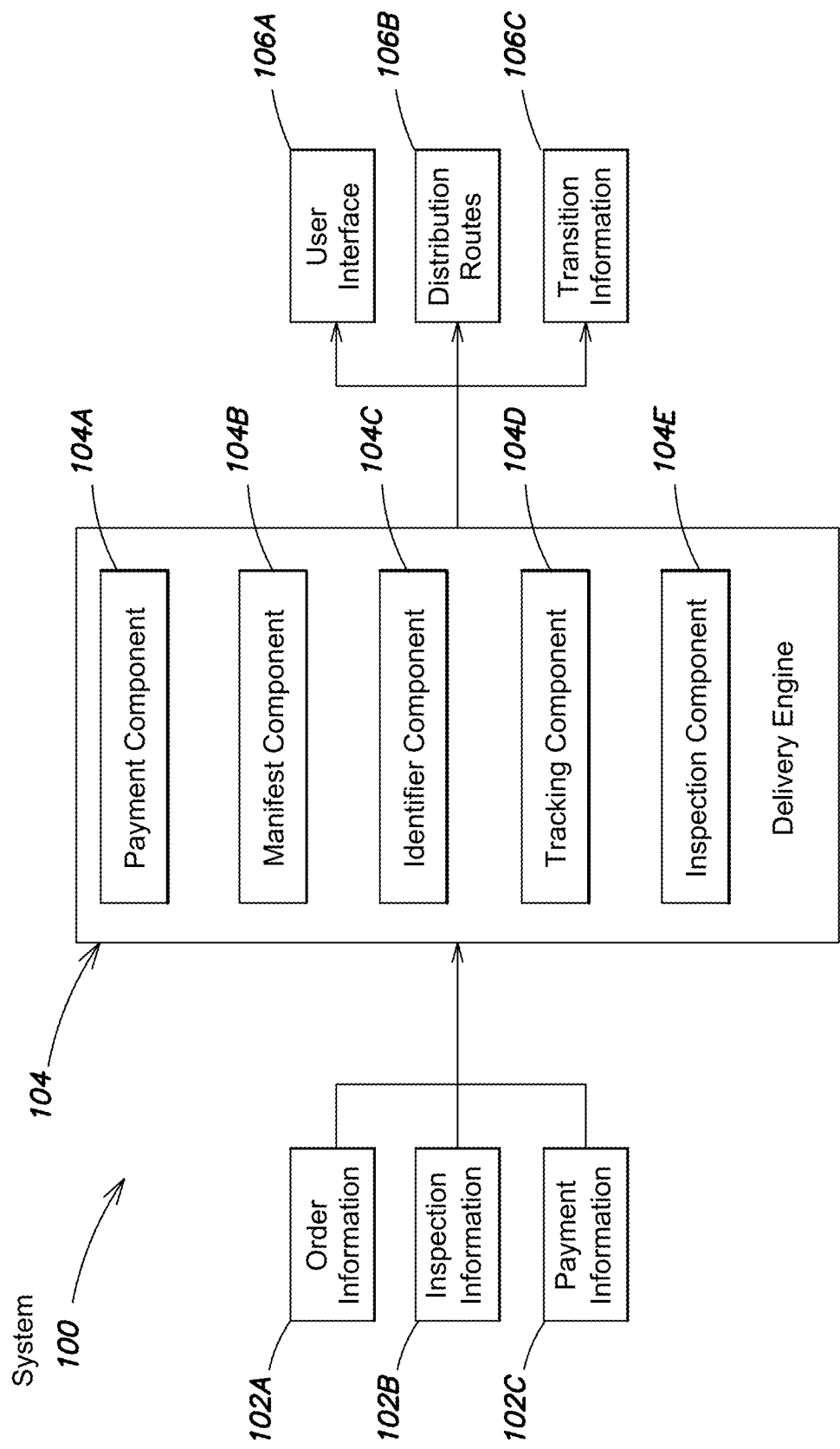
FIG. 1 is a block diagram of an example delivery management system for zero inventory distributions, according to one embodiment.

Stated broadly, aspects and embodiments of the present invention are directed to inventory delivery management operations. In one aspect, a system can control zero inventory management and distribution of items. In a zero inventory environment, retailers (e.g., system subscribers and/or manufacturers) are free to offer goods (e.g., items to be purchased) without a warehouse or local inventory. The system can be configured to manage building of and pickup of goods at a manufacturer location in response to customer orders. The system can also facilitate payments to the manufacturer to eliminate any processing delays prior to pick up. The system can manage delivery events during end to end ordering, pickup, and customer delivery, including the validation of delivery events during transit. Delivery events may include, for example, a customer order, a payment, a pickup from a manufacturer, a transport for distribution, a transition in a distribution center, a local distribution, tracking, damage reporting, and damage resolution. In some embodiments, the system can include inspection components with damage reporting services. For example, delivery events (including e.g., transitions between delivery segments) can trigger required damage evaluation in an inspection component. According to some aspects, ensuring a validation of good integrity and identification at each leg of a shipping journey improves upon damage rates and/or rejection rates for received goods, shortens remediation time and costs, among other options.

Examples of the methods and systems discussed herein are not limited in application to the details of construction and the arrangement of components set forth in the following description or illustrated in the accompanying drawings. The methods and systems are capable of implementation in other embodiments and of being practiced or of being carried out in various ways. Examples of specific implementations are provided herein for illustrative purposes only and are not intended to be limiting. In particular, acts, components, elements and features discussed in connection with any one or more examples are not intended to be excluded from a similar role in any other examples.

Also, the phraseology and terminology used herein is for the purpose of description and should not be regarded as limiting. Any references to examples, embodiments, components, elements or acts of the systems and methods herein referred to in the singular can also embrace embodiments including a plurality, and any references in plural to any embodiment, component, element or act herein can also embrace embodiments including only a singularity. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" can be construed as inclusive so that any terms described using "or" can indicate any of a single, more than one, and all of the described terms.

Example Delivery Management System

According to some embodiments, a delivery management system can be implemented in a zero inventory distribution environment. The delivery management system can be configured to manage end-to-end delivery of customer orders taken at retailer sites (e.g., physical or online), wholesale locations (e.g., BJ's Warehouse Club), or any other type of purchasing and/or display site (e.g., a trade show, traveling display, etc.). The delivery management system can control and monitor delivery of customer orders from pick up at a manufacturer location to in-place delivery at the customer site. The system can implement and even require damage reporting and distribution validation during each delivery event within the end-to-end transit cycle. In some embodiments, mobile applications provide access to the delivery management system by delivery personnel. In some examples, the system can be configured to require various inputs from the delivery personnel in order to complete a portion of a delivery route, and in further examples, to transition within a location between new delivery route segments (e.g., pick-up at manufacturer, accept manufacturer pick-up at freight distribution center, transition between incoming acceptance and outgoing transit (e.g., line delivery) areas in the freight distribution center, transition to local delivery, customer delivery at location, install in place delivery, etc.). In some embodiments, the systems used for ordering, tracking and delivering products are provided by a third party to a retailer and other seller types, offloading the necessity to purchase and maintain such systems.

FIG. 1 illustrates one embodiment of a delivery management system 100. The system 100 can be configured to receive order information 102A from customers and schedule pick-up and delivery of the ordered good from a manufacturer. A plurality of orders can be managed by the system 100. For example, the system can manage aggregation of the ordered goods at a freight distribution center, validate integrity of the ordered goods (via e.g., required input of inspection information 102B), validate identity of the ordered goods (e.g., via 102B), generate distribution routes for delivering goods (e.g., 106B), optimize and/or create shipping manifests automatically within each distribution route. In further embodiments, the system 100 can be configured to manage tracking and integrity of goods en route and at delivery. For example, the system 100 can require inspection information 102B be input at each delivery transition (e.g., transition information 106C) or delivery event. Delivery transitions or delivery events can include any time where a good being delivered moves on or off a delivery vehicle. In other examples, delivery transitions and/or delivery events can include movement within delivery centers, including, for example, movement from an incoming shipping dock to a an outgoing distribution area.

According to one embodiment, the system 100 is configured to provide a subscription service to retailers so that retailers can readily subscribe to use system 100 and guaranty delivery of any displayed good on system 100 without maintaining their own inventory. Additionally, the guaranteed delivery times can be shorter than delivery times in inventory based models. In some environments, subscription to system 100 includes access to customizable user interfaces (e.g., 106A) that can be tailored to the specific retailer subscribing to the system 100. The system 100 can provide administrative access to subscribers to enable customization of some of the display characteristics including branding information (e.g., trademarks, logos, color schemes, etc.), among other options. In some examples, each subscriber can display goods with their own custom prices. In one example, a wholesale price can be encoded in the user interface displays provided to the subscriber and the subscriber can use the encoded information to create their own pricing for un-encoded display, for example, building in any fixed costs and profit the subscriber desires for display on system generated UIs (e.g., 106A).

Elements of the system 100 can be implemented on a specially configured computing system such as the computer system 900 and/or 914 described with reference to FIG. 9. In one example, the system 100 can include a delivery engine 104 configured to execute the functions, processes, and/or operations discussed herein. In one example, the delivery engine 104 can be executed on the computer system (e.g., 900 and/or 914) to provide the functions and operations discussed herein.

In other embodiments, the distribution system 100 and/or engine 104 can include additional components executed on the computer system to perform specific operations. For example, the system and/or engine can instantiate or call specific components configured to execute various operations on the system. In some implementations, the system 100 and/or engine 104 can be configured to communicate with other systems and/or computing devices (e.g., mobile devices and/or mobile applications), to capture order information (e.g., 102A), to capture inspection information (e.g., 102B), to capture payment information from customers (e.g., 102C), to trigger alarms or require information inputs from delivery personnel, or to execute additional control commands to effect input of inspection information (e.g., 102B). In some embodiments, the system 100 and/or engine 104 is configured to require inspection information 102B at each delivery transition and/or delivery event.

According to additional embodiments, the system 100 and/or engine 104 is configured to provide seamless management of order capture at subscriber locations and ultimate delivery of ordered goods without retailer inventory requirements. Management of order and delivery can include facilitation of payments to the manufacturers to reduce overhead and eliminate clearing time from production and delivery cycles. For example, in response to receiving order information 102A, the system 100 and/or engine 104 can require payment information 102C relating to the received order information 102A.

According to one embodiment, the system 100 and/or engine 104 can include a payment component 104A. The received order information 102A and payment information 102C can be received by the payment component 104A. By ensuring payment is received before submitting an order to manufacturers the system can be configured to insulate manufacturers from lending risks. In some conventional delivery systems retailers and manufacturers take on lending risk, in essence, advancing money to a customer pending a successful delivery. In some embodiments, the system is configured to depart from these conventional approaches, requiring payment that is sufficient to cover at least the wholesale price and an average shipping cost. In some aspects, based on requiring collection of the costs upfront, the system and payment component 104A are configured to provide cash or cash equivalent transfers to manufacturers, eliminating clearing time and payment processing from the delivery cycle and end-to-end delivery time.

In further embodiments, the system 100 and/or engine 104 is configured to aggregate customer orders and optimize delivery routing. In one embodiment, the system and/or engine 104 can include a manifest component 104B configured to manage shipping aggregation and to optimize delivery to customers. The system 100 and/or manifest component can be configured to display an order user interface ("UI") (e.g., 106A). The generated order UI can include the aggregation of all customer orders placed for delivery on system 100 across a plurality of subscribing retailers. In some embodiments, the UIs generated by the system 100 and/or manifest component can include a visualization of a manifest of all of the items within any orders placed on system 100. In other embodiments, a variety of manifests are used to manage different portions of a distribution route.

According to some embodiments, the generated manifests are displayed to distribution personnel at each segment of a delivery route from pick-up at a manufacturer to delivery and placement at a customer location. The manifest display can be tailored by the manifest component 104B based on location at which the manifest is being viewed, based on the user viewing the manifest, based on a segment of the delivery route, among other options.

The manifest and/or manifest component can also be used by other components of the system 100 to perform delivery validation and/or order integrity functions. For example, the system 100 and/or engine 104 can include an identifier component 104C. The identifier component 104C can use the manifest information/manifest UI to display validation functions to delivery personnel in additional to the manifest display. In some embodiments, each item on the manifest must be scanned by the delivery personnel in order to validate the item for delivery. The system can be configured to validate any item for delivery prior to allowing any item from transitioning to a subsequent segment of a delivery route.

Various UI generated by the system 100, engine 104, and/or manifest component 104B, can include information and functions that are used to capture inspection information (e.g., 102B which can be input by delivery personnel) to validate goods for delivery. In one embodiment, the system and/or engine 104 includes an identifier component 104C configured to identify order goods and validate the correct product is present. The identifier component can be further configured to verify any detail of a customer order (e.g., type, name, color, size, weight, dimension, etc.) to ensure that the customer order matches the good being delivered. In further embodiments, operations by the identifier component can be automated via radio frequency identifier tags (RFID) that encode product information. The system, engine, and/or the identifier component 104C can verify the encoded product information against the information in the manifest to ensure appropriate delivery.

In some embodiment, each shipped good can include RFID tags. The RFID tags can be used to identify delivery transitions (e.g., movement on or off a delivery truck and changes in locations at shipping locations (e.g., movement from arrival dock to shipping dock, etc.) and trigger verification responsive to the location information provided by the RFID tags. According to some embodiments, the system 100 and/or engine 104 can include a tracking component 104D which can be configured to track ship goods along an entire delivery route. The tracking component can also be configured to process location information from RFID tags and trigger validation operations on the system (e.g., damage checking, good integrity, good identification, etc.). Each of the components in the system 100 can be configured to operated independently or operate in cooperation. Further, various ones of the components discussed can execute the functions of the other components in various embodiments of the delivery management system. In some implementations, the components make delivery information available to other which is then updated or used in further operations. For example, the tracking component 104D can verify location of an item in a delivery, track the item, and update distribution routes 106B. In response to detecting a delivery event and/or a delivery transition the tracking component 104D can trigger inspection of the goods (e.g., validation of the integrity and identity of the shipped goods) by the system.

According to one embodiment, the system 100 and/or engine 104 can include an inspection component 104E configured to manage execution of validation and integrity operations on the ordered goods. For example, the inspection component 104E can be configured to trigger alerts on mobile devices and/or applications on mobile device possessed by delivery personnel. Responsive to receiving alert, the delivery personnel are required to input inspection information (e.g., 102B) into their respective device or application. According to one embodiment, only upon successful verification that no damage is observed and the matching goods are being delivered are the goods allowed to move to a next segment of the delivery cycle. In some embodiments, the inspection component 104E is configured to require scanning of each good (e.g., manual scanning of bar-code information, wireless scanning of RFID information) to obtain inspection information. In further embodiments, the inspection component 104E can also be configured to require images of the goods/packaging of the goods to validate that inspection has occurred properly. In some embodiments, the inspection component can include an imaging component configured to direct image capture of each one of the respective goods. The inspection component can generate imaging interfaces for capture of 360 degrees (e.g., where possible) of each respective good. The imaging component is configured to determine possible angles for imaging respective goods (e.g., left side, right side, front, back, top, and bottom).

In some implementations, the inspection component 104E can be configured to process image information on goods and/or packing to automatically identify damage to goods in transit. The inspection component 104E can automatically trigger remediation actions in response to detecting damage to goods. In some embodiments, the inspection component 104E can identify potential damage to a good based on image analysis and require further inspection of the goods by delivery personnel. In some examples, the system can be configured to require un-packing of the goods in transit to verify damage to the packing has not affect the goods themselves.

According to some embodiments, the inspection component 104E can, for example, use the delivery endpoint in the order information 102A and the inspection information 102B to create or update notices of validated delivery information and indicate valid delivery transitions have occurred (e.g., specified by transition information 106C). The inspection component 104E can, for example, be configured to receive input about whether or not an item has been damaged. The input can be based on a user input or inspection information 102B entered in mobile devices by delivery personnel. The inspection component 104E can also receive item insurance information from the payment component 104A to check off or flag a delivery transition. Insurance information can be used by the inspection component to trigger damage remediation where damaged goods have been reported. For example, the inspection component 104E can trigger an insurance claim, and order new goods or replacement pieces for any item in transit.

According to one embodiment, the delivery system can include damage resolution algorithms that associate a damage report type (e.g., broken item, broken component, damaged item, damaged component, ornamental issue, serviceable issue, missing item, missing component, etc.) with a system based/automatic action. The damage algorithms and logic based resolutions can be further specified to operate based on a location at which the report is being entered (e.g., at manufacturer pick-up, in-route, at customer location, etc.) and actions can be selected by the algorithm that are tailored to each location and damage report type. For example, a report entered at a customer home can be associated with a trigger call action on the system. In response, the system may be configured to require a customer service entity to call each stakeholder in the delivery to resolve the issue. For a missing component, the customer and manufacturer can be called and an immediate order placed for the missing item/component entered with the customer's and manufacturer's approval. According to one embodiment, programmatic logic is configured to respond to an indication of a missing component to automatically trigger fabrication, pick up, and expedited delivery of the missing component. In further embodiments, the programmatic logic automatically triggers a resolution session to request approval from the customer for the remediation action. In yet other embodiments, the resolution session opens a communication session with the customer and with the manufacturer to request approval. In one example, the resolution session includes a web session or an automated phone call (e.g., with automated vocal prompts) to seek approval of a system-identified resolution.

In one example, a replacement order may be executed automatically, and call algorithms triggered once the automatic order is placed. In other embodiments, ornamental damage or serviceable issues can triggers service request to repair the ornamental issue/serviceable problem. In some examples, the system can call or e-mail a customer to provide information to the customer of the issue and schedule a service call to occur at delivery. The system can automatically schedule the service call, and co-ordinate the service call and delivery execution. In further examples, the system can request customer approval for the resolution in conjunction with scheduling the service call.

As discussed, in some embodiments, the system 104 can receive order information 102A including, for example, an order identification number, an order time, a retailer email address, a current status of the order, customer information such as an address, a company, a latitude and longitude, a phone number, a name, a country code and a province code, and information about the items ordered such as item numbers, item names, item prices, item size (length, width, etc.), item box size, and item manufacturers. The order information 102A can be processed by a manifest component 104B. In some embodiments, the manifest component 104B may use the order information 102A to create a manifest of all of the items in a specific order or shipment. The manifest components can organize delivery based on delivery region, optimal delivery routes, and can modify manifests and delivery routes based on optimizing packing space in a truck so that items at the end of the truck (e.g., closest to the exit) are delivered first. In other embodiments, the manifest component is configured to optimize selection of manufacturers for fabricating ordered items. Optimization can include selection of one or more manufacturers based on location of the manufacturers (e.g., proximity of manufacturers required to fulfill an order, proximity of manufacturers to one or more delivery location(s), output capacity, fabrication timing, etc.). In one example, available manufactures and respective fabrication times, location, etc. can be searched in a database of manufacturers. In one example, a breadth first search algorithm can be executed to select one or more manufacturers capable of fulfilling respective orders.

In some embodiments, the manifest component can be configured to connect to a database or storage associated with all of the items that can be ordered, including the items in an order. In other embodiments, the manifest component 104B can display a list of items and receive information on how many of each item is to be ordered. The manifest component can also be configured to detect how many of each item a manufacturer can produce for overnight shipment, for example, to accommodate zero inventory distribution. In some embodiments, the system 100, engine, and/or manifest component 104B can be configured to manage in real time inventory information associated with the manufacturer, and timing for production of any number of goods. Based on the inventory and/or production time required the system can modify guaranteed delivery times, for example, displayed in an order user interface. In other examples, the system is configured to optimize selection of manufacturers based on meeting customer-specified delivery requirements, taking into account, for example, fabrication time. In one embodiment, execution of manufacturer selection can be simplified by first considering manufacturers proximate to delivery locations and determining capability to fulfill an order. In other embodiments manufacturers most proximate to a delivery selection can be used until fabrication capacity is reached, and remaining order demand satisfied by other manufacturers meeting the remaining demand and timeframe.

According to some aspects, payment information can also be managed by the delivery system to optimize and/or eliminate clearing time from a delivery cycle. In some embodiments, the payment component 104A can be further configured to receive payment information 102C and calculate how much money should go to the carrier company and how much should go to the manufacturer. Further, the payment information 102C can include specifics on the payment obtained from a customer associated with the order. The payment information 102C can be processed by the payment component 104A in the form of, for example, credit cards, debit cards, Paypal, checks, cash, and any other form of physical or electronic money. The payment information 102C can include which items were paid for as well as an aggregate of the price associated with a shipment and any information regarding the shipping cost and any insurance cost.

In some embodiments, the payment component 104A can be configured to receive payment from a customer, split the received payment amongst the groups involved in the manufacturing and shipping of the one or more items, and require receipt of payment of at least a percentage related to each group (e.g., the manufacturer and the carrier). The payment component 104A can also be configured to confirm the payment source so, for example, if the payment source is a check, the payment component 104A can cash it and confirm that the money is received before processing the manifest. In some embodiments, the system 100 and/or engine 104 manages displays of an order cost consisting of the price to manufacture items in an order plus an estimated shipping cost and a profit margin requested by the retailer. In various embodiments, the system requires that the customer pay the combined manufacturing cost, estimated shipping cost, and retailer profit margin up front and, if necessary, a more specific cost after the order is delivered. In some embodiments, the system 100 and/or the payment component 104A automatically forwards cash or cash equivalent payment to the manufacturer. In other embodiments system can receive an order and pay the manufacturer to manufacture the items. This method requires the service and/or the subscriber (e.g., retailer) to assume the risks of the payment.

In some implementations, after receiving an order and processed payment information for an order, the manifest component 104B can be configured to create a manifest of all of the items within the order. The manifest component 104B can aggregate all of the items in the order into an organized list that can be used by the identifier component 104C, tracking component 104D, and/or the inspection component 104E to trigger inspections of the items, to validate delivery information and/or integrity of the items, and to alert the carrier/delivery personnel and optionally the customer of validated deliveries and any damages relating to delivery items. In some embodiments, the manifest component 104B can create a QR code for each item on the manifest to be displayed on the carrier's or delivery personnel's mobile device (e.g., smart phone). In one example, the QR code for the manifest can be passed along from one carrier to another by being scanned. In some implementations the manifest can be passed between carriers via, for example, near field communication (NFC), Bluetooth, or Wi-Fi. In some embodiments, the manifest component 104B can be configured aggregate respective verification of each item of the manifest contents while all of the items are pre-loaded on a track.

According to one embodiment, the manifest component can be configured to receive a pre-scan of every item before a shipment is sent out. In some embodiments, the tracking component 104D is configured to accept scanned information associated with all of the items before allowing the items to be loaded onto a vehicle. The manifest component 104B or tracking component 104D may send the scanned information to the identifier component 104C to verify that every item being shipped matches every item on the manifest. Including matching specific detailed of the items on the manifest (e.g., color, size, model, etc.) to ensure that no problems occur at delivery. In some embodiments, the manifest component 104B can be further configured to determine how many items can be loaded onto a trailer or a home delivery truck.

The manifest component can use an algorithm incorporating, for example, the length and width of each box, the length and width of each item, time to deliver, assembly time, and method of commute to determine how many items can fit into a shipment. The algorithm can determine a maximum number of items per shipment to lower the number of trucks required for a shipment. The manifest component and/or system 100 can further incorporate information about the item such as, for example, how prone an item is to being scratched or damaged, what material an item is made out of, and what kind of shipping method was ordered. In some embodiments, customers can pay extra to ship items with extra care. Further, information on the manufacturers themselves can be used on the system to modify en route inspection operations.

In some embodiments, the system 100 and/or engine 104 can track all damage reporting associated with each manufacturer. At predefined levels of damage rates, different inspections requirements can be imposed by the system. In one embodiment, the system can require visual inspection of packing to ensure no damage has occurred. Typically, packaging inspection only is associated with manufacturers having low damage and/or defect reporting rates. If the damage and/or defect rate associated with reaches a second threshold, the system can be configured to instruct delivery personnel to open each package at pick up and visually inspect the packages goods. In some examples, the system can require images of the opened packages and contents to enable the goods to be move to a delivery segment (e.g., from pick-up to transit to freight warehouse). The system can analyze the images to determine that the packages have been opened and inspected as instructed. In further embodiments, the system can analyze the images to determine if any parts are missing, to identify any defects in manufacture, and/or identify any damage to the ordered good.

In further embodiments, additional inspection tiers can be configured on the system. In one example, a third damage/defect rate threshold can be configured to trigger additional inspections requirements, where each item for delivery must be unboxed and images of each component of the delivered item must be taken. As discussed above, the system and/or inspection component 104E can analyze the image data to verify the inspection and/or to automatically identify issues. In another example, if a forth damage/defect is reach the system 100 alerts administrators to cease operations with a manufacturer.

According to one embodiment, once the manifest component creates the manifest, the tracking component 104D can take the manifest and use delivery information within the manifest to create verify transportation of goods according to distribution routes 106B. To create the distribution routes 106B, the manifest component 104D can utilize an optimized routing algorithm via cloud computing to determine optimal routes to both pick up items from manufacturers and deliver the items to the customers within a short time period. The routing algorithm used to choose the distribution routes can include information about how many items are at each location to be picked up, and what the most efficient route is to save time while also deploying just enough trucks to save on costs, using another algorithm to determine how many trucks are needed for the manifest of items based on the sizes of the items. The distribution routes 106B can also include delivery information on the most optimal paths to customer locations.

According to one embodiment, after the manifest component creates the manifest, the identifier component 104C can take the manifest as an input and generate UIs 106A associated with each item or to display listings of items. According to some embodiments, subscriber may access the system 100 via order interfaces generated by the system 100. In some examples, each item made available on the system is associated with an order display presented by the UIs. The order UIs 106A may include encoded displays of wholesale prices for each item. The encoded displays enable the subscribers to recognize the wholesale price of any displayed item and tailor their own custom pricing display accordingly. Typically, the encoding can be done using combinations of numbers and letters and identification of the information as a product code. Thus, only the subscribers can decipher the encoded wholesale price information.

Figure 6:
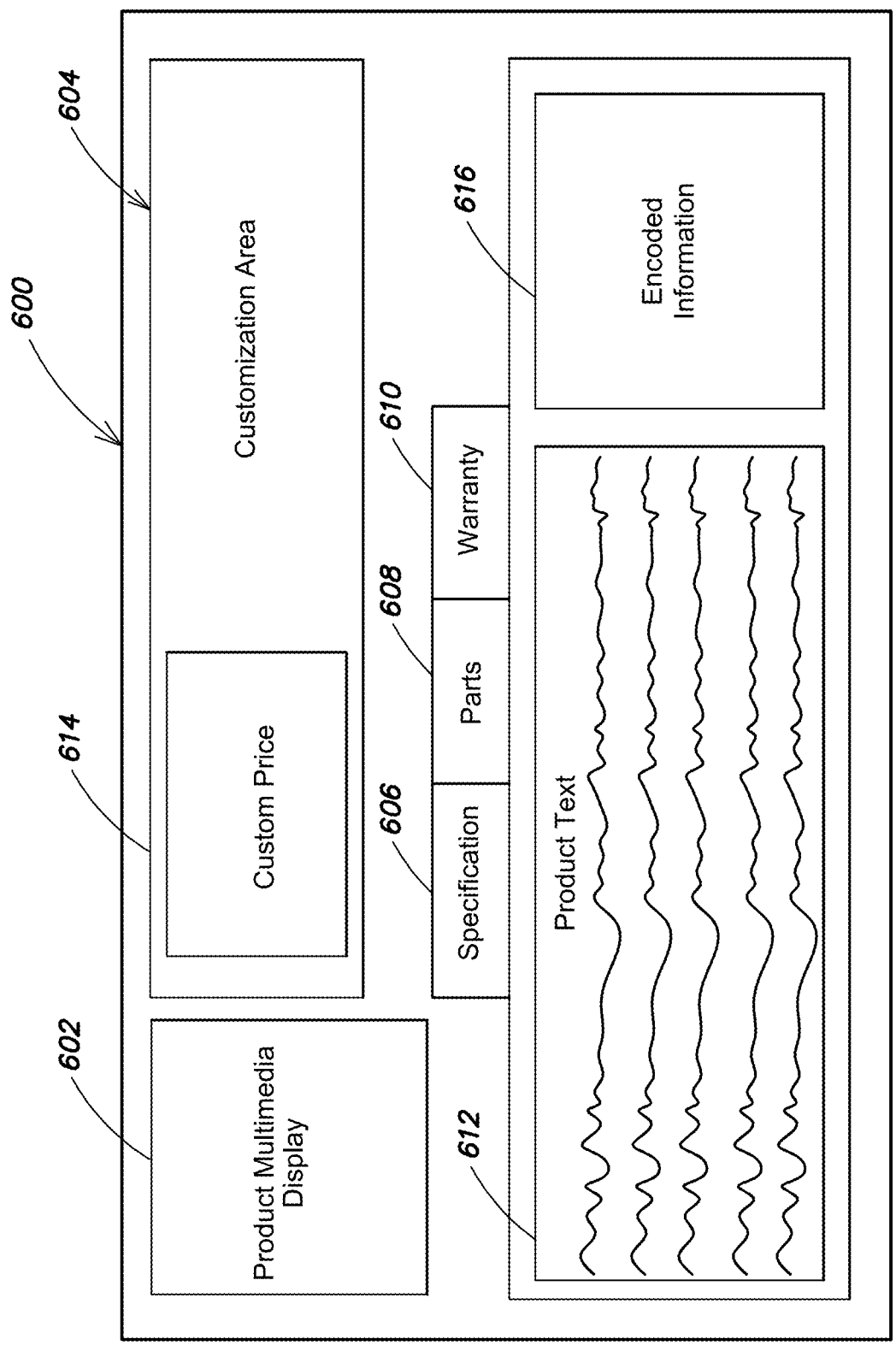
FIG. 6 is an example user interface for item display by a delivery management system, according to one embodiment.

According to one embodiment, these order UIs may be displayed on a personal computer or on a mobile device. The order UI can include information about each item, including all of the information associated with the item. As discussed, the encoded UI can display an encrypted or obfuscated wholesale price of an item to an authorized user along with images of the item, the item name, the item SKU number, a QR code relating to shipment information of the item, shipping cost, condition of the item, and other information relating to the item. An example of one embodiment of the order UI is shown in FIG. 6 (discussed in greater detail below). The encoded display of the item can be configured such that only subscribers to the system (e.g., subscribers or partners of the service) can understand the wholesale price display. In some embodiments, the encoded wholesale price is obfuscated by automatically adding extra alpha numeric digits to the wholesale price. For example, a wholesale price of $199.99 can be obfuscated as "A00C199D99C802" or as any string of alpha numeric digits that the subscriber can be given instructions to translate into the wholesale price. In some embodiments, the string of alpha numeric digits can be labeled with a product description label such as, for example, "item number" or "model number."

According to some embodiments, once a distribution route and order UIs are created for the one or more items, the identifier component 104C can be used the information associated with each good to confirm that items received from manufacturers match the items received in any customer order information 102A. For example, the system 100 can analyze inspection information 102B and manifest information from the manifest component 104B to verify goods being shipped. In some embodiments, image information taken during inspections can be used by the system to verify that the package information provided by the manufactured matches the goods being shipped. For example, images taken off unboxed items can be analyzed to verify color, size, shape, etc., of ordered goods. The system can be configured with image information associated with each component of an order good. Thus, the system can validate any information, including, shipping manifests provided by manufacturers as part of delivery validation.

In some embodiments, the inspection information 102B can include, for example, images of an item during each transfer in a delivery, scanned data from an RFID located on an item or a box of items, updated GPS coordinates of an item throughout the course of a delivery, and condition information during each step of the delivery as to whether and if any damage has occurred, where the damage occurred, and in some examples the system can identify what action takes place as a result of the damage occurring responsive to the inspection information. The inspection information can be received in a form displayed on a user device (e.g., delivery personnel mobile device) entered by a user or, in some embodiments, captured automatically via sensors (e.g., image sensors, RFID sensors, motion detectors, etc.). In some embodiments, pressure sensors, moisture sensors, and force sensors can be used around an item to automatically detect if damage has occurred. The sensors can also be used independently and/or in conjunction with a manual inspection of each item.

In some embodiments, the tracking component 104D can be configured to track items and trigger an inspection of an item in response to suspicious activity. The tracking component 104D can, for example, use the RFID of an item to detect that the item moved off of a freight truck. In response to the detection, the tracking component 104D can send an alert to a carrier and request updated information about the item. The tracking component 104D can also trigger alarms and/or additional reporting. In some examples, the tracking component 104D can send the movement information to the inspection component 104E. The inspection component 104E can request visual inspection of the goods and/or response from delivery personnel indicating the updated status of the item. In some examples, the inspection component can request an explanation (e.g., move item off truck to deliver another item) and, in response to receiving a message, update the item status.

In some embodiments, the system gives a carrier a specified amount of time, for example three minutes, to input a status update of the item. If the system does not receive an update of the item status, the system may request a call from a customer service desk to the carrier. The identifier component 104C can also be used to identify an unknown item via photo recognition by comparing a received image of an item to the images received in the beginning of the shipment. If, for example, an item were separated from the item's identification information, the identifier component can be able to link a photo of the item with the item's listing in the manifest to display any information relating to the item, including the item's SKU number, the item's destination, and other information. In some embodiments, the identifier component 104C can receive a QR code scan and use the QR code to link to a page that displays information about the contents of the item. The identifier component can display all of the images of the item throughout the shipment thus far along with other item information including, for example, the item name and price.

In some embodiments, while a delivery is being moved, tracking component 104D can be configured to track each item via a number of options including, for example, GPS tracking, RFID tracking, image tracking, and others. The tracking component can also be configured to track the shipment as a whole to confirm that the location of each item matches the location of the shipment. The shipment can be tracked via an RFID or using GPS coordinates of a current carrier's phone. In some embodiments, if an item is moved away from a carrier, indicating, for example, an item was left behind or stolen, the carrier can be alerted via the mobile application. In some embodiments, the alert is sent to both the carrier as well as an administrator or service desk. In some embodiments, the system may require receipt of an updated status of the item with, for example, text, photos, or videos to confirm that the item is still in the shipment. If the item status is not updated for a period of time, the tracking component 104D can send a message to a service desk or administrator indicating a request to call the carrier to figure out what the problem is. In some embodiments, tracking component 104D can use the RFID so that when an item is taken out of a truck, the item is automatically scanned and a GPS coordinate is identified to confirm that the item is being taken out at the correct location.

In some embodiments, when an item is in a warehouse, the item can be designated and registered into an area by scanning a barcode associated with the area of the warehouse as well as the barcode of the item. In some examples, after an item is registered into an area, the tracking component can store the exact geolocation of the item for further validation. In other embodiments, the item can be registered into an area and found within the area by using an RFID or GPS technology. In some examples, the system can invoke location detections functions to assist in cases in which items are stored and sometimes misplaced before shipment.

In some embodiments, the mobile device applications that interact and/or are included in system 100 can have at least two separate versions: one in user mode for customers to use to track their item and one in administrator mode for carriers to use to upload updated information about an item and view contents of a scanned item. The administrator mode version can receive alerts when an item is unexpectedly moved, but the customer version can only receive alerts when an administrator mode version receives input indicating an updated status of at least one item. In some embodiments, each different user on the mobile application can have an associated account with user information such as, for example, a username and password. In these embodiments, the application can include a messaging system in which the application can receive messages from a customer to be sent to a carrier to, for example, request a status of an item or request a change in an order.

In some embodiments, after an item is confirmed as being safely transitioned between segments of the delivery cycle, the inspection component 104E can send updated transition information 106C. The updated transition information can be sent to the mobile device/application, the web application platform, and the EDI platform so the customer can constantly be able to view information about the item, including images and/or videos relating to the condition of the item.

According to one embodiment, the inspection component 104E can request that transition information 106C for at least one item is updated responsive tracking component 104D automatically detecting a movement of the at least one item. In some embodiments, the inspection component 104E may require photos, videos, and text regarding each item. In some embodiments, the text can include the new carrier information about who the delivery was transferred to. The carrier information can include a phone number, email, or mobile application username of a carrier that a customer can contact. In those embodiments where the system requires updated item information, if the requirements are not met, the inspection component 104E can call a carrier's supervisor or a customer service desk to report suspicious activity. Further, after a validated transition, the output transition information 106C can display an ETA for each item based on the calculated item delivery routes.

In some embodiments, the inspection component can receive a control indicating that the at least one item in the shipment is in good condition as well as corresponding scans, photos, or videos of the at least one item. In some embodiments, if an item were damaged, the inspection component 104E can be configured to alert any one or more of the customer, the retailer, the carrier, the manufacturer, the customer service desk, and the carrier's supervisor about the damage. In some embodiments, the item can be redirected to be shipped at a lower price and the manufacturer can immediately remanufacture the item. In other examples, any un-damages portion of the delivery can continue in-transit, and a request can be automatically executed by the system to re-deliver undamaged replacement parts. In other embodiments the inspection component can send a message to a customer requesting information indicating whether the customer would like to keep the item with the damages, receive the item with a replacement item for the damaged part, receive a newly made item, send the item back to be fixed, receive the item at a lower price point, or cancel the item in the order.

In some embodiments, the tracking component 104D and inspection component 104E can use an image analyzer to display images from inspection information 102B side by side with previous inspection information images and note differences in the items. In other embodiments, the images come with notes from the carrier indicating a successful delivery transition or an unsuccessful delivery transition. In one embodiment, the inspection component can use image analysis to detect damage on an item. The image analysis can display a damage score indicative of how substantial the damage is. The damage score displayed by the reporting component can use a threshold value to perform a variety of different actions including noting that an item needs to be fixed or indicating that the damage is minimal and requesting information on what a response should be. In further examples, the damage scores can be used to trigger alerts to the delivery personnel to conduct further inspection operations. In some embodiments, the damaging reporting component can use video analysis, receiving a video of the item from a 360° view to calculate damage information by comparing the video to a video taken when the item was in perfect condition before being shipped out. The compared video can also be a generic video of a similar item with the corresponding SKU number. This can be advantageous to confirm that the ordered item matches the item manufactured in size, shape, material, and color. In some embodiments, where an item manufactured does not match the item ordered, the inspection component 104E can report the error, request a new item to be manufactured, and send the item back to the manufacturer to be recycled.

In further embodiments, after an item is detected as being damaged, the inspection component 104E may be configured to receive the images and information relating to each item during the delivery. The images can indicate any type of damage to an item that occurred before being delivered and signed off by a customer. The information about each item indicates what stage of delivery the item is in, including location, and what damages occurred during shipment. The inspection component 104E can be further configured to receive a control indicating an action to be taken responsive to, for example, an item that has been damaged. The inspection component 104E can flag an item as damaged with updated item information such as an updated image or video of the item. The inspection component 104E can then receive a control indicating an action a customer would like the carrier to take in response to the damage. The damage flag can include, along with the options for actions to be taken, estimated times of arrival (ETA) based on each action. For example, if an action is received to send a completely new item, the ETA can be a few days longer than if the action received was to send the item and have the damaged part replaced after delivery.

In some embodiments, when at least one item reaches a customer, the tracking and/or inspection component can be configured to require images of the item at the location as well as the surrounding area to, for example, confirm that neither the item nor the area were damaged by delivery. For example, images can be taken of the delivery area to identify any scratched or damaged surface upon movement of the item, and ultimately to refute any erroneous claim of damage by a customer. The inspection component 104E can also finalize the delivery by sending the images (e.g., as transition information 106C) to validate the final delivery transition has been made (e.g. in-place delivery). The manifest component 104B may then receive a digital signature of a customer indicating that the delivery of the one or more items was successful. The digital signature can indicate, for example, that the order is received in good condition, and no damage has been done to the interior of the customer's home, no damage has been done to the exterior of the customer's home. In some embodiments, a delivery receipt is then automatically sent to the retailer, the manufacturer, and the customer.

In some embodiments, the payment component 104A can, upon successful delivery, pay the manufacturer for creating the items. After the delivery is successfully completed, the manifest component 104B can send a follow-up survey and receive feedback relating to the customer's delivery experience. In one example, the system 100 and/or the manifest component, on receipt of the feedback, can store the feedback in a database with the manifest.

In other embodiments, if a customer rejects or partially rejects an order due to damage or a mistaken delivery, the system may receive instructions to request a new item, request a replacement for a damaged part of an item, cancel an order, or bargain for a discount, among other options. In these embodiments, pictures are received to validate the item mistake or damage and the inspection component 104E may instantly report the received instructions.

In some aspects, the system may be implemented on a specially configured computer. In some embodiments, the system is a distributed computer system that can be implemented on a mobile device in addition to a specialized computer system. Some embodiments of the present invention implement a mobile application using, for example, Android or iOS, to facilitate the tracking process of an item or a group of items. The mobile application allows for a paperless method of electronically tracking and managing the movement of items. In these embodiments, the system may receive input from a user through the mobile device and provide delivery information relating to at least one item. The system may receive, via the mobile device application, update status information and images of each item from a carrier. The system can upload the image and status information to a server to display the updated status of the item. In some embodiments, the application can include image detection software to confirm an inspection of an item. In other embodiments, multiple images from different angles of each item can be required by the application. In some embodiments, the application information can be displayed via a webpage on a desktop or laptop computer. In some embodiments, the application can support standard communication between various platforms such as mobile device platforms, web platforms, and electronic data interchange (EDI) platforms. An EDI is an electronic communication system that provides standards for exchanging data via any electronic means. Further, the application can automatically back up all images, orders, transactions, and electronic records into an encrypted database.

According to one aspect, the system can implement a mobile application to assist in delivery management operations for tracking the condition and successful delivery of an item or a group of items. The system can help facilitate the protected movement of items. According to one embodiment, the system can create a manifest of all of the items being delivered and associate each item with identification information including, for example, a stock keeping unit (SKU) number, a quick response (QR) code, a near field communication (NFC) code, global positioning system (GPS) coordinates, and radio-frequency identification (RFID). In some examples, the system must receive an updated image of each item as well as a scan of the item to confirm that the item is safely being transported between various locations. In various embodiments, the system must receive an image and scan of each item when the item is being moved from a manufacturer location to a freight truck, from the freight truck to a distribution center dock, from the distribution center dock to an in-line delivery dock, from the in-line delivery dock to a truck, and from the truck to the delivery location. In one embodiment, the system manages compliance with information input using information gateways or by triggering information lockouts until the requisite information inputs are received (e.g., required image of each item). In further embodiments, information inputs are validated in real time or analyzed for compliance, and only in response to determining the information input is valid is access to required information granted (e.g., next delivery location, etc.). In some embodiments, each tracked movement of an item is received by a mobile device application in real-time. One benefit of having the item movement updated in real time is that a customer can constantly be updated on the location of an item or group of items.

The system can use an API such as, for example, a RESTful API using JSON for easy, light-weight communication that can be integrated with third-party applications. The system can also use authentication such as, for example, OAuth 2.0. Orders can be received by the system via a plurality of formats, including, for example, CSV uploads, Excel file uploads, manual entries of orders via a webpage or a mobile application, order files transferred via file transfer protocols (FTP) into the application server, or an application programming interface (API) using direct integration between a manufacturer and the application server for rapid delivery and receipt of orders. According to one aspect, a benefit of the quick transfer of an order received by the system to at least one manufacturer is that, for example, the at least one manufacturer can have additional time to create the order and prepare the order for delivery. In addition to receiving an order, generating a manifest, and dispatching orders to at least one manufacturer for "next-day pickup," the system can also generate shipping labels and automatically optimize a pickup route between the at least one manufacturer and the shipping dock. Further, the application can use cloud computing such as, for example, Amazon Elastic Cloud 2 (EC2) with data storage and file storages services such as, for example, MongoDB and Amazon Simple Storage Service (S3) to automatically generate manifests and utilize optimized routing algorithms for next-day home delivery of items in a manifest.

Figure 2:
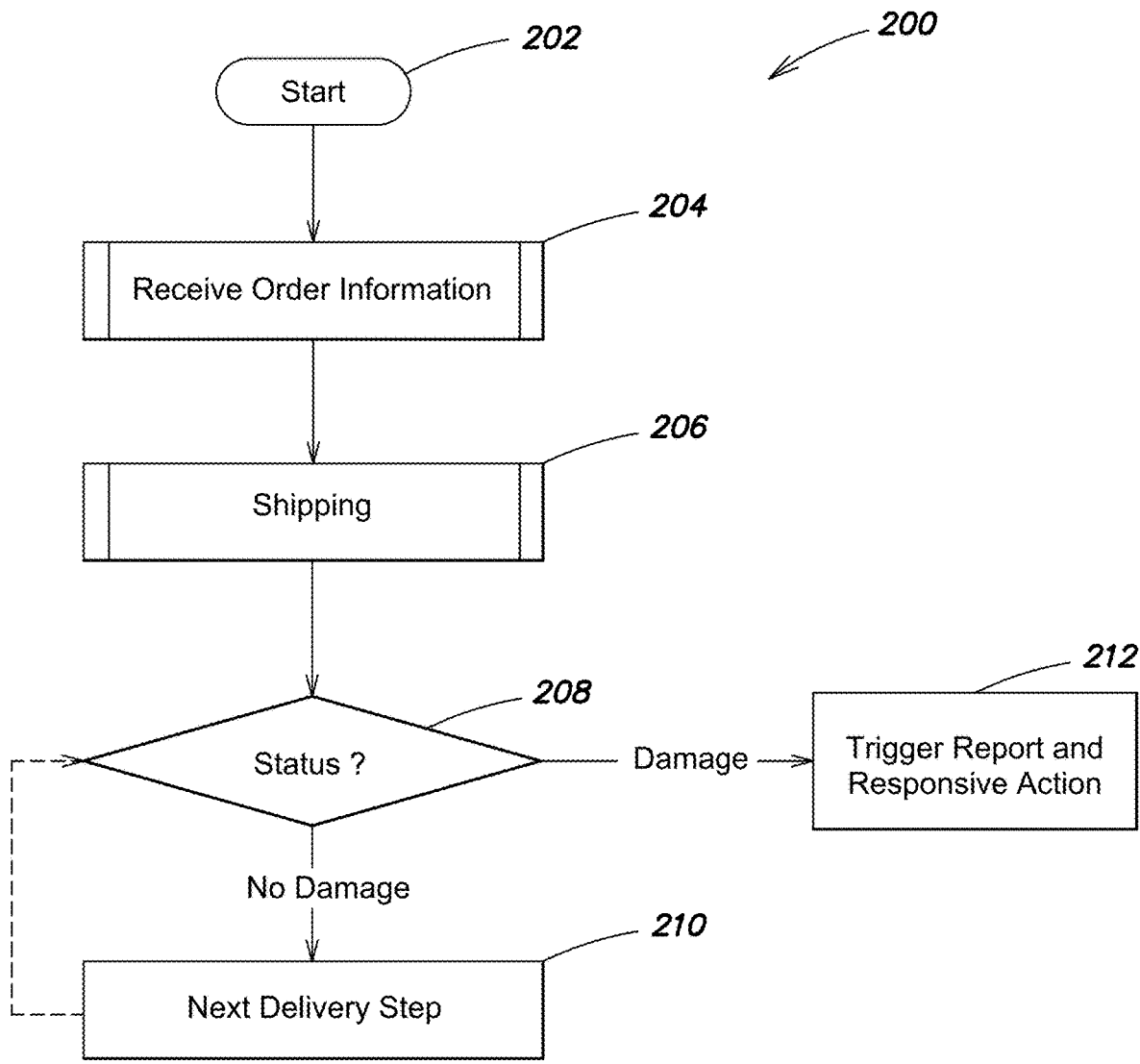
FIG. 2 is a flow diagram illustrating a process for delivery management operations, according to one embodiment.

FIG. 2 illustrates an example process flow 200 for delivery management. At block 202, process 200 begins. At block 204, order information is received from a customer. In some embodiments, the order information includes all of the items that a customer wishes to order. Order information from a plurality of customers can be aggregated and/organized based on one or more manufacturers who are slated to fulfill the orders. At block 206, shipping operation commence. In some embodiments, shipping operations include scheduling and managing pick-up of the requested items from a plurality of manufacturers associated with respective good. The shipping operations can include inspection and validation of the items to be shipped. The shipping operations can also include generation of shipping manifest organizing the goods into common delivery route. In some examples, the shipping operations include optimizing packing order of the items to be shipped to match and/or optimize delivery routes.

In some embodiments, once the shipping operations commence the items are checked for damages. Inspection or status checks (e.g., 208) can occurs at each transition in a delivery route. For example, inspection or status checks can occur at pick-up at the manufacturer, transit to a freight distribution center, at transitions within the freight distribution center, on delivery routes, transit to a delivery location, at a customer site, and in-place deliver, among other options.

In some embodiments, a manufacturer may have a dependability score. A dependability score is a score that can be generated on the system based on historical interactions with the manufacturer. The dependability score can reflect damage and/or defect rates expected for goods provided by the manufacturer. In one example, a dependability score is associated with a manufacturer based on all of the shipments previously sent. In some embodiments, requirements to pass an inspection may be different based on a manufacturer's dependability score. In some examples, if a manufacturer's dependability score is very low, the system may request a more thorough inspection of each item in an order to confirm that each item is in good condition to be shipped. If a manufacturer's dependability score is very high, indicating, for example, that the manufacturer has had multiple flawless shipments, the system may require a quick visual inspection and confirmation of intact packaging. In other cases, the system can require un-boxing of goods with photos and videos along with a thorough check indicating that the item is in a good condition, and all components are present.

In some embodiments, at block 208, during delivery events (e.g., delivery transitions) in a shipment, the system can require delivery personnel (e.g., carrier) input information relating to each item in the shipment manifest that indicates a status of each item. In these embodiments, the system may require the carrier to take individual photos or videos of each item, as well as confirm that the item is still undamaged. In other embodiments, cameras may be set up in a vehicle and the application may require a carrier to place an item in the vehicle to have photos taken. The cameras may be connected to the system, and the system may include image analysis components to detect any damages in items or differences between prior images. If the item has damage, process 200 continues at 212 with triggering of a report. The triggering of the report at 212 can occur, for example, via an inspection component 104E of a delivery management system. In further embodiments, step 212 can include both reporting and automatic execution of a responsive action. The responsive action can include ending the delivery of any damaged items and ordering replacement items, sending the damaged items back to the manufacturer to be fixed, canceling a shipment, and continuing the shipping to replace the damaged part later. Upon receipt of a damaged item, the system may notify any of the manufacturer, the customer, the delivery service desk, and the carrier. If the system receives photos or videos and information indicating that there is no damage to any of the items, then the system can continue tracking the items. In some embodiments, each delivery event triggers a status check cycle (at 208). If the shipped goods are intact and verified (i.e., not damaged) the process 200 continues with a next delivery step 210. The next delivery step will depend on where the goods are in a shipping cycle (e.g., pick-up, freight distribution, local delivery, etc.) until the goods reach their ultimate destination.

In some embodiments, once the goods being delivery reach their ultimate destination process 200 can trigger a final status check at 208 to ensure that no damage has occurred to the goods in transit and to verify that the goods match the customer's expectations. In some embodiments, part of the status check at the final destination can include in-place delivery status check. The in-place delivery status check operations can require images of the product in place at the customer location and any area immediately surrounding the delivered good. For example, delivery personnel can image floors, desks, garages, etc. to establish that no damage has occurred to the customer locations based on delivery. Once the final status check has occurred process 200 can conclude. In some embodiments, process 200 can be executed continuously for each item to be delivery and/or be executed concurrently for each item to be delivered. Process 200 is provided as illustration of steps and operations that can be performed during a delivery cycle. In other embodiments, different processes can be executed and/or different steps executed in different order. In some embodiments, process 200 can be executed by a delivery management system (e.g., system 100) and/or delivery engine (e.g., engine 104). In other embodiments, various ones of the steps of process 200 can be executed by components of a delivery management system. In further embodiments, a delivery management system can executed others process during, after, and/or in conjunction with process 200.

Figure 3:
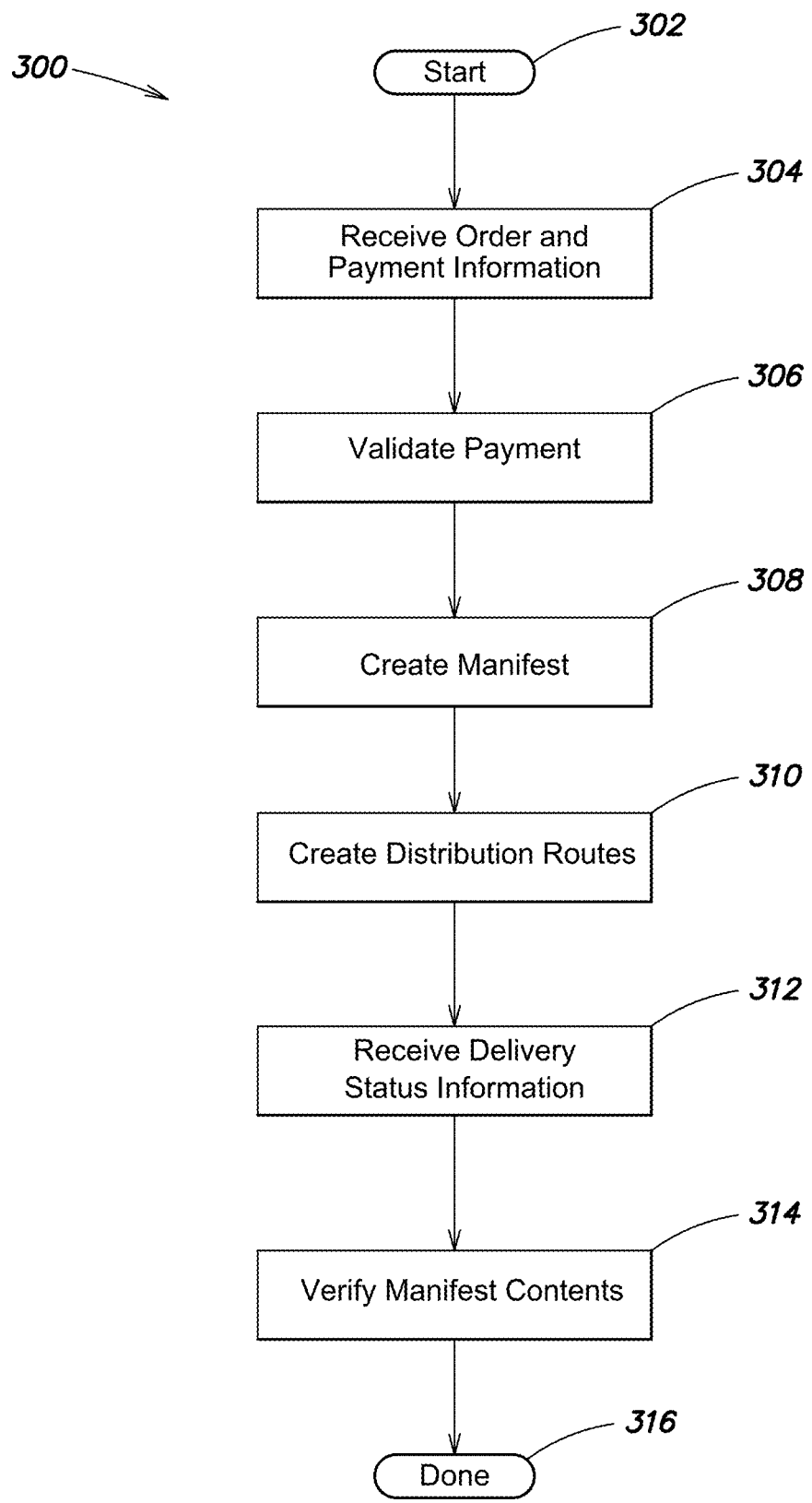
FIG. 3 is a flow diagram illustrating a process for receiving and processing order information, according to one embodiment.

For example, FIG. 3 illustrates an example process flow 300 for receiving and processing order information. At block 302, process 300 begins. At block 304, order and payment information is received for a plurality of items within a customer order. The order and payment information can be received from a user interface that can include a custom price and encoded information including an encoded price. An example of one embodiment of a user interface for receiving a good in an order is shown in FIG. 6. Referring back to FIG. 3, at block 306, the payment is validated. Once the payment is validated, at block 308, a manifest of all of the items in the order is generated. In some, examples the manifest can be generated by a manifest component (e.g., 104B). According to some embodiments, multiple orders may be combined in one shipment and may be sources from a plurality of manufacturers. Shipping manifests generated at 308 can include multiple orders including the location of each of the customers associated with each order. Generation of the manifest at 308 can be used to provide manifest information for display to delivery personnel and/or customers expected delivery, for example, via user interface display. In some embodiments, varied information can be provided to assist in ordering and/or creation of shipping manifests. In one example, information on ordered goods can include obfuscated or encoded information to facilitate pricing by a subscriber (e.g., a retailer) who provides the ordering information.

In some embodiments, at block 310, the manifest and destinations are used to create distribution routes for pickup of each item as well as delivery of each item. Distribution routing can include pick-up at a specific manufacturer, delivery to a distribution center, intermediate transit routes, and local delivery routes, among other options. In some embodiments, the creation of distribution routes at 310 can include analyzing information about what vehicles are available to transport the items. In these embodiments, based on available delivery vehicles, the distribution routes can be modified and/or optimized at 310 based on available vehicles. In some embodiments, creation of distribution lists at 310 can include displaying available vehicles to end users for selection of items to be placed in specific vehicles. In one example, drag and drop visualizations can be created by the system based on packing information of shipped goods (e.g., size, dimensions, weight, etc.), which can be manipulated in a user interface to create a packing list and updated manifest. In other embodiments, the manifest and associated information can be used to display which vehicles are needed and what a good orientation, order, etc., of the items is to make a delivery as efficient as possible. The visualizations in the user interface can include visualizations of the delivery vehicle being used to ship, and the visualizations of the packages fill the virtual vehicle as they are dragged and dropped onto empty space in the virtual delivery vehicle.

In some embodiments, the creation of a manifest and distribution route 308-310 can include cloud computing operations to calculate an optimal number of vehicles and delivery routes and display the routing information on a carrier's mobile device. Once distribution routes are created (e.g., at 310), the process 300 can continue with accessing information for each of the items as they are in transit. For example, at 312 delivery status can be received regarding a condition of the shipped goods (e.g., no damage, verified goods match order, etc.). In some embodiments, step 312 can be executed in response to a request for status information triggered during execution of the distribution routes (e.g., created at 310). At 312, information on status can be received, including, for example, information to confirm that all of the newly manufactured items are in good condition and ready to continue on to a next segment of a distribution route (e.g., ready to be shipped to a freight distribution center). In some embodiments, the status information received at 312 can include pictures or videos of each item and user input indicates that each item is in good condition with no noticeable defects. In some embodiments, an inspection component and/or delivery management system can execute process 300. In some embodiments, the inspection component (e.g., 104E) and/or system can be configured to require inspection/status information as part of the execution of process 300.

According to one embodiment, in addition to receiving delivery status information on the goods in transit, process 300 can include steps for verifying the manifest contents match the goods in transit, for example, at 314. In one example, an identifier component (e.g., 104C) of a delivery system (e.g., 100) can request/require information indicating that all of the items on the manifest are in the shipment. For example, a carrier must verify each of the items in transit manually to make sure that all of the items are in the correct boxes with the correct shipping labels.

According to some embodiments, execution of step 314 can include verifying manifest contents via RFID encoded information. For example, the tracking component (e.g., 104E) can be configured to use an RFID attached to each item to confirm that all of the items from the manifest are in the shipment. In other embodiments, where item packing information was used to optimize a packing order of a delivery vehicle, the optimized positioning of each good in transit can be displayed to delivery personnel. According to some embodiments, at each delivery transition steps 312 and 314 can be repeated until all items in transit are delivered or returned, for example, as a remedial action taken in response to identification of damage. Once all the items in transit are delivered or return, process 300 can end at 316.

In some embodiments, process 300 can be executed continuously for each item to be delivery and/or be executed concurrently for each item to be delivered. Process 300 is provided as illustration of steps and operations that can be performed during a delivery cycle. In other embodiments, different processes can be executed and/or different steps executed in different order. In some embodiments, process 300 can be executed by a delivery management system (e.g., 100) and/or delivery engine (e.g., 104). In other embodiments, various ones of the steps of process 300 can be executed by components of a delivery management system. In further embodiments, a delivery management system can executed others process during, after, and/or in conjunction with process 300.

Figure 4:
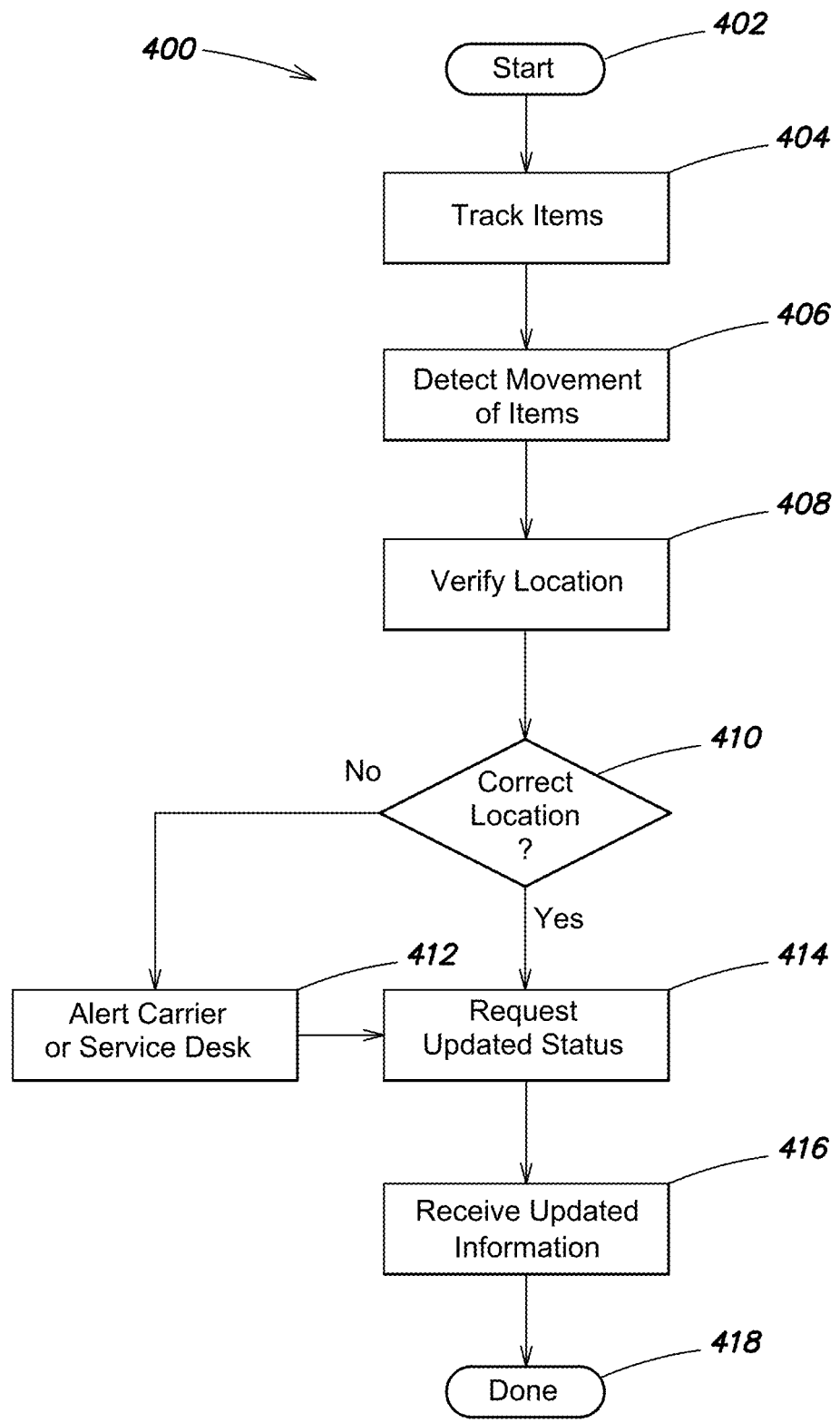
FIG. 4 is a flow diagram illustrating a process for shipping items in an order, according to one embodiment.

For example, FIG. 4 illustrates an example process flow 400 for shipping an item. At block 402, process 400 begins According to some examples, at block 404, tracking each of the items in the shipment is executed using, for example, an RFID or GPS technology. In some embodiments, the items are tracked in relation to a carrier or a transporting vehicle to detect theft or a misplaced item. In some examples, tracking of items at 404 can include tracking of position within a vehicle, and any unexpected movement of the item within the vehicle can trigger requests for inspection. At block 406, movement of at least one item is detected. In some examples, a tracking component 104D of a delivery management system (e.g., 100) can be configured to track movement of goods in transit (e.g., execute step 404). As discussed, the movement of an item can be the result of a delivery event and execution of 404-406 continues so long as the detected movement is part of an expected delivery route. In some embodiments, as part of executing 404-406, process 400 can include pre-defined tolerances for movement of goods on a delivery vehicle, for example. Permitting small movements within a pre-defined tolerance can enable reduction of false reporting and error alert generation (e.g., avoids mistaking a movement out of the truck for a movement of goods within the truck).

Once a movement of at least one item is detected, process 400 continues with verification of the location of at least one item at 408. In some embodiments, responsive to detected movement at 406, step 408 includes verifying the location of the plurality of other items in the shipment, the carrier's location (e.g., via the carrier's mobile device), and compares those locations with the expected location of the next delivery event. In one example, all of the locations are verified using, for example, GPS or Wi-Fi at 408. Based on the determined locations from 408, at block 410 a determination is made on whether the current location is a correct delivery location (410 YES) or not (410 NO). If the items are determined to be in the wrong location (410NO), an alert can be triggered at 412. In some examples, the alert at 412 is communicated to an administrative system or a service desk to resolve the problem. In other examples, various automated remedial measures can be identified based on the context of the alert generated at 412 and the remedial measures (e.g., alarm sent to delivery personnel, carrier contacted to resolve problem, and authorities contacted regarding potential theft, etc.) can be executed automatically (not shown). In some embodiments, process 400 continues at 414 from either 412 or 410 YES with a request for updated status.

According to some embodiments, at block 414, if item movement is detected without being in the location of a delivery event, process 400 can continue with a request for updated information relating to the misplaced item. In some examples, an alert, alarm and/or other message (e.g., automated cell phone call) can be communicated to delivery personnel communicating a request for updated item status. The request can be communicated to require images of goods, video, and/or text to explain what happened to the good identified as being improperly moved. In some embodiments, process 400 can trigger a variety of sub-routines to resolve and/or determine an appropriate action to take in response to an improper movement event. For example, if the location was a different delivery event location than the one expected, a new optimal pick-up time can be recalculated or a new delivery route for the goods in transit can be generated. If the location was different due to a suspected theft, the goods can be tracked using RFID or GPS technology, optionally accompanying an alert to the service desk, the customer, and local law enforcement. If an item fell out of a truck, the system can request images or videos as well as a confirmation of the event, including for examples, images of the goods in question to confirm no theft or other activity has occurred.

If the item is in the expected location associated with a respective delivery event (410YES), process 400 can continue at 414 with communicating a request for images and videos of each item as well as an inspection indicating that each item is in good condition. If any damage has occurred during shipping or as a result of any movements, process 400 can continue with receipt of a damage report indicating any damage to goods in transit. As discussed, various procedures and/or sub-processes can be executed in response to a damage report communicated, for example, at 416, and a variety of actions can be executed based on the sub-processes in response to the reporting at 416. In a typical example, updated images, videos, and/or text associated with the in-transit goods are communicated at 416 showing that the goods are undamaged and verified. Once the goods have reached their final destination process 400 can conclude at 418.

Processes 200, 300, and 400 depict embodiments of sequences of acts that can be performed as part of zero inventory distribution and management. In other embodiments, the acts specified in these processes may be performed in different orders, may be combined, or various steps can be omitted. In further embodiments, processes 200-400 can be executed by a delivery management system or various components of a delivery management system. According to some embodiments, some acts depicted are optional and, as such, may be omitted. Additionally, the order of acts can be altered, or other acts can be added, without departing from the scope of the embodiments described herein.

Example System Environment

According to some aspects of the present invention, a delivery system provides subscription based services to a plurality of sales companies (e.g., retailers or subscribers) who operate real world or online stores where customers can order goods. The sales companies can accept customer information as part of processing any order, accept payment, and schedule/manage delivery of items using the system. In some embodiments, the system is implemented in a zero-inventory environment, where the system provides an ordering interface for presentation at subscribers (e.g., retailer) locations which connects the subscriber directly to manufacturers who can produce goods for transit, for example, within one business day. The system manages the pick-up from the manufacturer and manages the transit of the goods to the customer without any burden falling on the subscriber (e.g., retailer, wholesaler, or other selling entity).

Figure 5:
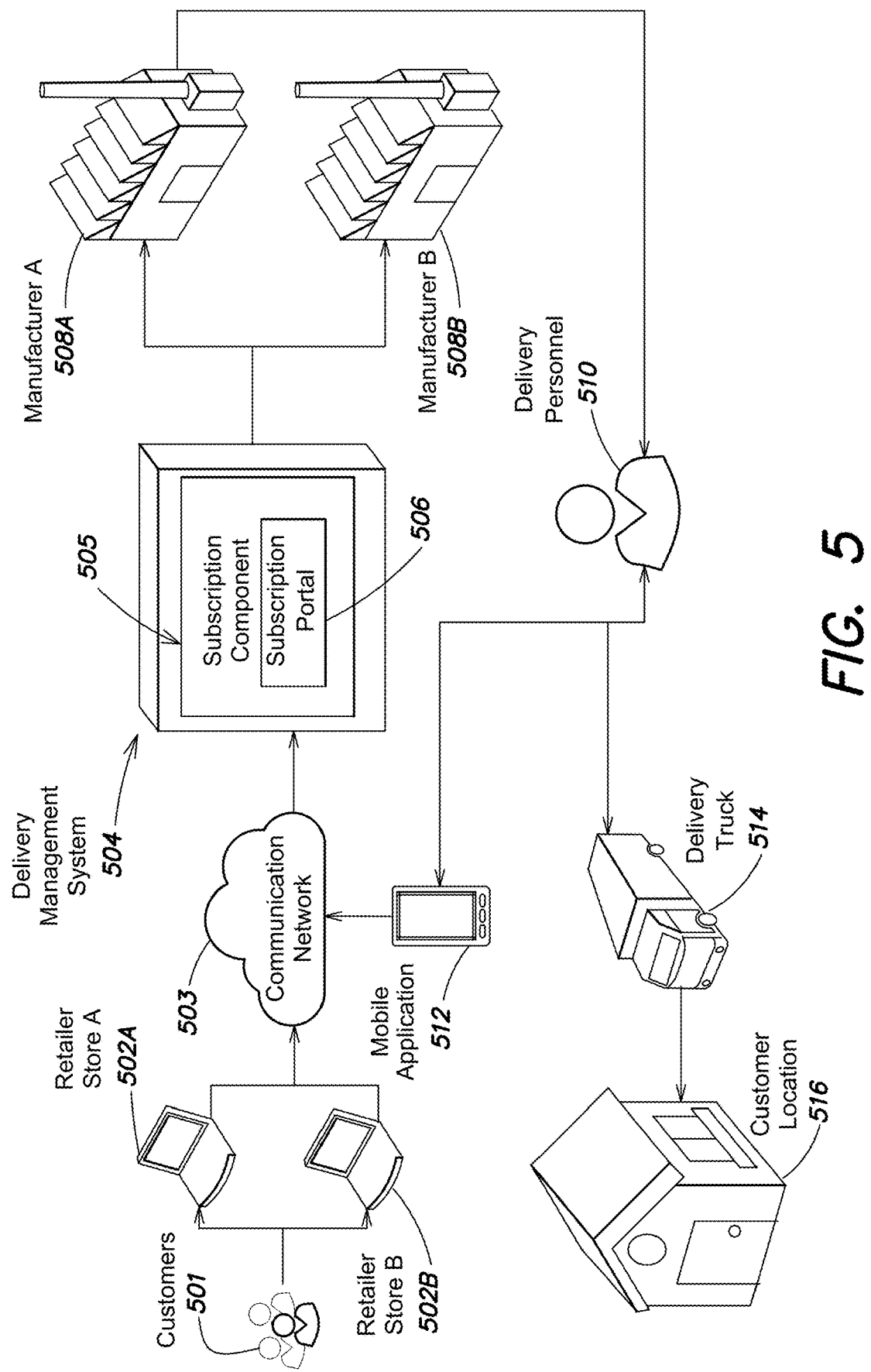
FIG. 5 is a block diagram of an example environment for a delivery management system, according to one embodiment.

FIG. 5 shows one example of a zero inventory distribution environment according to one embodiment. In this example system environment, customers 501 can create orders for goods via one or more retailer stores 502A and 502B. Retailer stores 502A and 502B can subscribed to a delivery management system 504 and immediately accept orders for any goods on the system. According to some embodiments, the retailers subscribing to the system are able to accept and guaranty order delivery without holding any actual inventory of goods being sold. In one example, the system manages the order, request, and payment to the manufacturer the same or next day, and the manufacturer fabricates the product for shipping by the next day. By reducing the clearing, ordering, and/or fabrication time to such a degree the system significantly improves over conventional methodologies.

Once order information is input, the order and payment information can be transferred from the retailer stores 502A and 502B to the delivery management system 504 via a communication network 503. In some examples, the communication network 503 includes the internet. In some embodiments, the delivery management system 504 includes a subscription component 505, which includes a subscriber portal 506. The subscription component 507 can be configured to accept new subscribers, create subscriber accounts, and provide access to administrative functions to tailor system behavior (e.g., customize user interfaces discussed below) for the specific retailer.

The subscription component can also be configured to enable a subscriber (e.g., a retailer) to view delivery information regarding an order via the subscriber portal 506. In some embodiments, the subscriber portal 506 uses an authentication service such as, for example, OAuth 2.0 to allow subscribers to login to an account to view order information and update their stores. In one example, subscription component and/or the subscriber portal 506 allows a subscriber (e.g., a retailer) to update the user interface of a store according to the subscriber's preferences and/or change the displayed pricing information that is displayed to customers 501. In some embodiments, the delivery management system can be configured to display the order to a subscriber to be approved in the subscriber portal 506 before the order is sent to manufacturers 508A and 508B. In one embodiment manufacturers 508A and 508B have access to the subscriber portal to receive orders. In some embodiments, the subscriber portal is implemented using, for example, AngularJS. The delivery management system 504 receives the order, creates the manifest, and delivers the order to manufacturers 508A and 508B to manufacture the goods.

According to one embodiment, the system manages the end-to-end delivery cycle. For example, the system is configured to receive input from delivery personnel 510 via a mobile application 512 indicating whether or not the goods are in good condition at each stage of a delivery route (e.g., at each delivery transition inspection information is provided by delivery personnel, sensor data, automated processes, or any combination of two or more of the preceding). In one embodiment the status of the goods can be posted on the subscriber portal 506. In some embodiments, the mobile application can be implemented on a mobile operating system such as, for example, Android, iOS, Windows Phone, and BlackBerry OS.

In one embodiment, the manifest created by the delivery management system 504 can be transferred between different delivery personnel using, for example, NFC, Bluetooth, or Wi-Fi. The mobile application can request inputs from the delivery personnel at each delivery event in the end-to-end delivery of the order. In some embodiments, to transfer the manifest between delivery personnel, the system must first receive inspection information with updated status information relating to the goods in the order. According to some embodiments, the system can prevent access to delivery information until the system confirms a valid inspection has occurred. In further embodiments, the system determines a valid inspection has occurred based on image analysis of inspection images submitted by delivery personnel. For example, the system can verify delivery personnel have not just submitted the same picture of goods repeatedly. Image analysis can also be executed to verify a valid inspection by counting objects in package, confirm shape and size of object in an image, and determine no damage has occurred, among other options.

In some examples multiple retailers and multiple manufacturers 508A and 508B can interact with the delivery management system 504 the subscriber portal 506 to create orders and receive instructions to manufacture items in a zero-inventory environment. According to one aspect, manufacturers can use the subscriber portal to access system and signup for participation in producing and zero inventory delivery to customers. In one embodiment, manufacturers can propose goods to be included in sales displays generated by the delivery management system. In some examples, manufacturers can submit candidate goods for inclusion on the system, provide guaranteed production times, volumes, images, descriptions, etc. The system can approve or not goods for inclusion. In other embodiments, the manufacturer can review goods being provided through the system and request to become a manufacturer of any or more goods in the system's catalog.

According to some embodiments, the subscriber portal can all be used by various support personnel for facilitating ordering, manufacture, and delivery operations. For example, customer service representatives, operations employees, and other members of the customer service teams can communicate with the delivery management system 504 via a web application using the communication network 503. Updated status information can be received by the customer service members via the communications network. In one embodiment, the web application is an administration dashboard implemented using, for example, HTML, Java, or AngularJS. The service members can be required to login through an authentication service such as, for example, OAuth 2.0.

In some embodiments, calculations, such as calculating efficient pickup and delivery routes, can be done on the delivery management system 504 and pushed back into the mobile application 512 via a mobile push service. In some embodiments, the delivery management system can use a data storage such as, for example, MongoDB and a file storage such as, for example, Amazon S3 to store data relating to the manifest, order information, payment information, communication information, and routing information. The data storage can store logs of alerts as well as all of the images and videos of each item in a shipment. In one embodiment the administration dashboard includes inputs for service members to view all of the information in the data storage and the file storage. Information from the data storage can be sent back to the mobile application, administration dashboard, and subscriber portal 506 to allow the delivery management system 504 to display information regarding every phase of the order to any of the users, including the retailer and service members.

Once the delivery truck 514 reaches the customer location 516, the system can be configured to require that the goods be placed in the customer location. The system can also require in-place inspection of the delivered goods. For example, the mobile application can be configured to require pictures of the goods, before allowing the customer to sign for the delivery indicating safe delivery of the goods.

Example User Interfaces

FIG. 6 illustrates an example display screen of one embodiment of a user interface. The user interface can be generated by a delivery management system (e.g., 100) for display on subscriber system. The user interface 600 is configured to accept customer orders of displayed goods. In some embodiments, the UI displays can include a product multimedia display at 602. The multimedia display can be generated and/or shown in a variety of formats which can include images or videos of at least one item that a customer may order through the subscriber. Show at 604 is a customization area which can be tailored to specific retailers. The user interface 600 is shown with a static customization area 604, however, in other embodiments, various look and feel options can be tailored to a given retailer (e.g., logos, color scheme, shape and size, placement of UI elements, among other options) and are not limited to a static customization window, as shown in the example. For example, a retailer can access the delivery management system (e.g., system 100) to tailor the user interface 600 to suit their needs by re-organizing the architecture of the display among other options.

Customizations can be configured to include any custom information about the retailer. For example, the customization area can include a retailer store banner, logo, color scheme, or an advertisement. The customization area 604 can also include a custom price 614 specifically configured for retailer input. In some embodiments, the system can be configured to generate a recommended custom price 614 by taking the encoded wholesale price within the encoded information 616 and adding it with the price of overhead and a subscriber-inputted profit margin. For example, if a subscriber wanted a 50% profit from a good, the system can be configured to take the encoded wholesale price along with an estimated shipping cost and generate a custom price that would give the subscriber a 50% profit from selling the good.

According to one embodiment, subscribers to a delivery management system are provided information on wholesale pricing of the available goods via the user interface 600. In some embodiments, the UI 600 includes encoded information 616 that provides a human readable but encoded view of the wholesale price. In some embodiments, the subscriber can use the encoded pricing information to set their own custom price for display at 614. In other embodiments, subscribers can set default values for pricing that specify a default profit margin, and fixed costs, etc., that can be used by the system to generate a suggested price for display in custom price display 614.

In some embodiments, the encoded information at 616 is configured for display only responsive to authentication and proper authorization. For example, the encoded information 616 can include the original wholesale price of any item shown in the display. In some embodiments, the encoded information 616 can be hidden from users who are not authorized with specific permissions by the system. In some embodiments, the encoded information can be replaced with other webpage elements. For example, if a user who is not authorized as a retailer, manufacturer, or member of the service goes onto the page, the product text can extend through the length of the page and the encoded information would not be visible to the user.

According to some embodiments the UI 600 can include tabs indicating different sections, such as, for example, specification 606, parts 608, and warranty information 610. The UI 600 can also include product text 612 that includes information within the specification 606, the parts 608, and the warranty information 610. Tabs and organization of UI 600 are illustrated for purposed of example. In other embodiments, different UIs can include different elements describing features of products for sale and direct delivery. For example, UIs for displaying and ordering goods can include commentary, ratings, etc., among other options.

Shipment Process Flow

Figure 7:
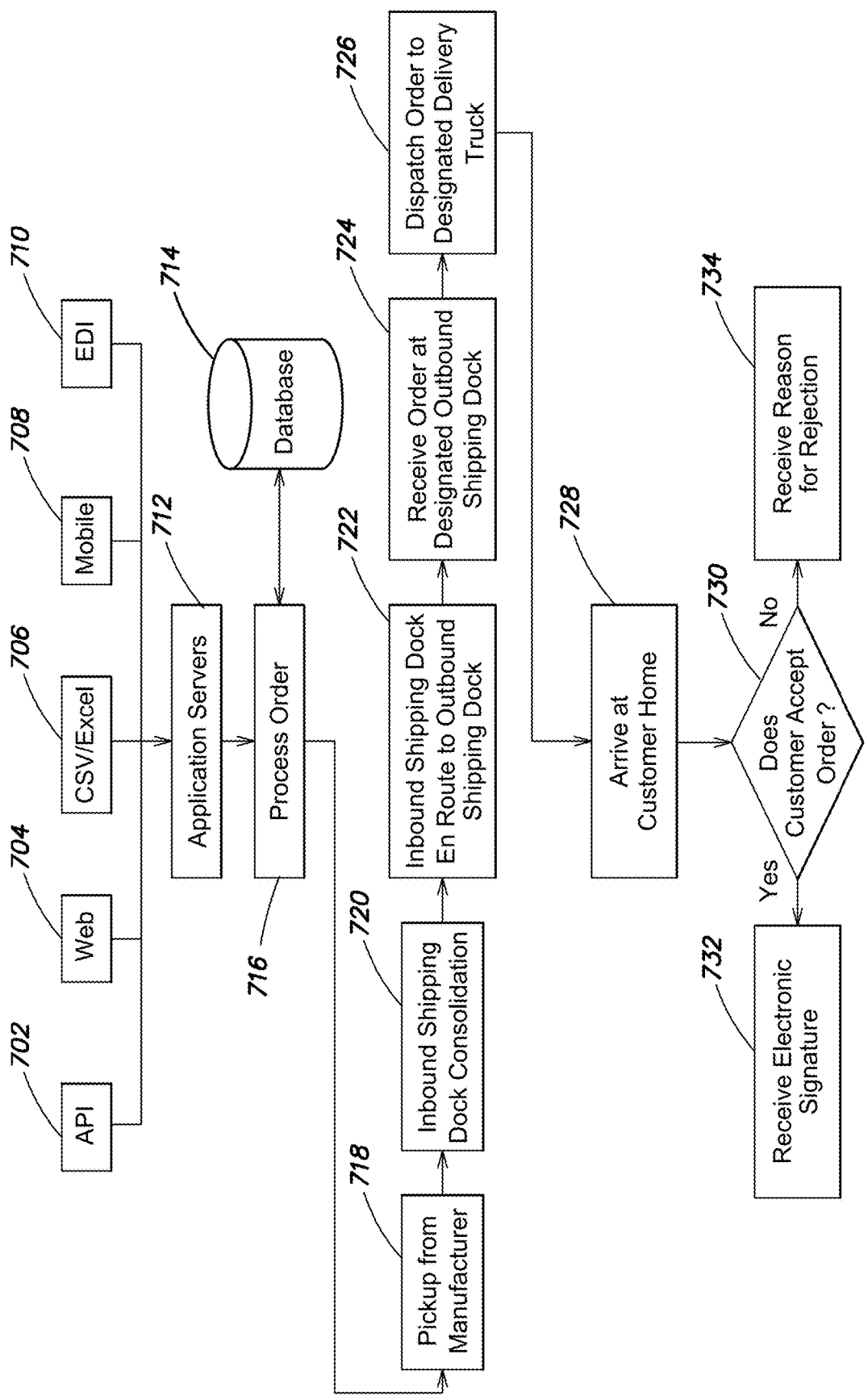
FIG. 7 is a flow diagram illustrating a process for processing and delivering an order, according to one embodiment.

FIG. 7 illustrates an example process flow and system components that handle an example order and delivery. According to some embodiments, the delivery management system can be implemented across a plurality of application servers 712 hosted in a cloud. According to one embodiment, the application servers 712 can receive information for an order via a plurality of sources, including an application programming interface (API) 702, a webpage 704, bulk transfers (e.g., a comma separated value (CSV) or Microsoft Excel file 706), a mobile device 708, and an EDI 710.

According to some embodiment, the application servers 712 can be elements of a delivery management system (e.g., 100) that accept orders and manage deliveries. In some embodiments, the application servers are configured to process information from any of the sources provided by subscribers (e.g., retailers) and store the information in a database 714. The servers can also access information about a customer's previous orders (e.g., from database 714) as well as other information maintained on the delivery management system (e.g., in database 714). Once the application servers receive the order, the order is processed at block 716 and sent to the corresponding manufacturer. The pickup and distribution routes are created and the system receives an input (e.g., a picture or video and confirmation that the item is in good condition) that the items from the order have been picked up from the at least one manufacturer 718. The system then tracks the items to an inbound receiving shipping dock, where the manifest can be transferred to a shipping dock worker or another carrier if a carrier change is necessary. The system requires updated pictures and videos throughout each movement, including from the freight truck to an inbound receiving shipping dock. In some embodiments, multiple trucks make pickups from multiple different manufacturers for one order, so all of the items are consolidated at the inbound shipping dock at block 720.

The items are then put on shipping lines based on which outbound shipping dock they belong to at block 722. Shipping lines can be organized based on a delivery region. At block 724, the items are received at an outbound shipping dock and the system may be configured to require pictures or a video to confirm that no damage has occurred during the transfer. At block 726, the items leave the outbound shipping dock and the system continues to track the items. At block 728, the items arrive at a customer's home or retail store. The items are brought inside and the system can be configured to require pictures or videos of each of the items and the surrounding locations to confirm that no damage has occurred to the delivery location as well as the items. At block 730, the customer accepts or rejects the items. If the customer accepts the order, a signature is taken indicating that the customer is satisfied 732. The system can send a feedback request after a time period of the signature to check if the user has any problems with the application service. If the customer rejects a part of the order, the reason for rejection is taken down and sent to the customer service desk as well as a supervisor and the manufacturer with photos of the item and a customer request on what to do next.

Figure 13:
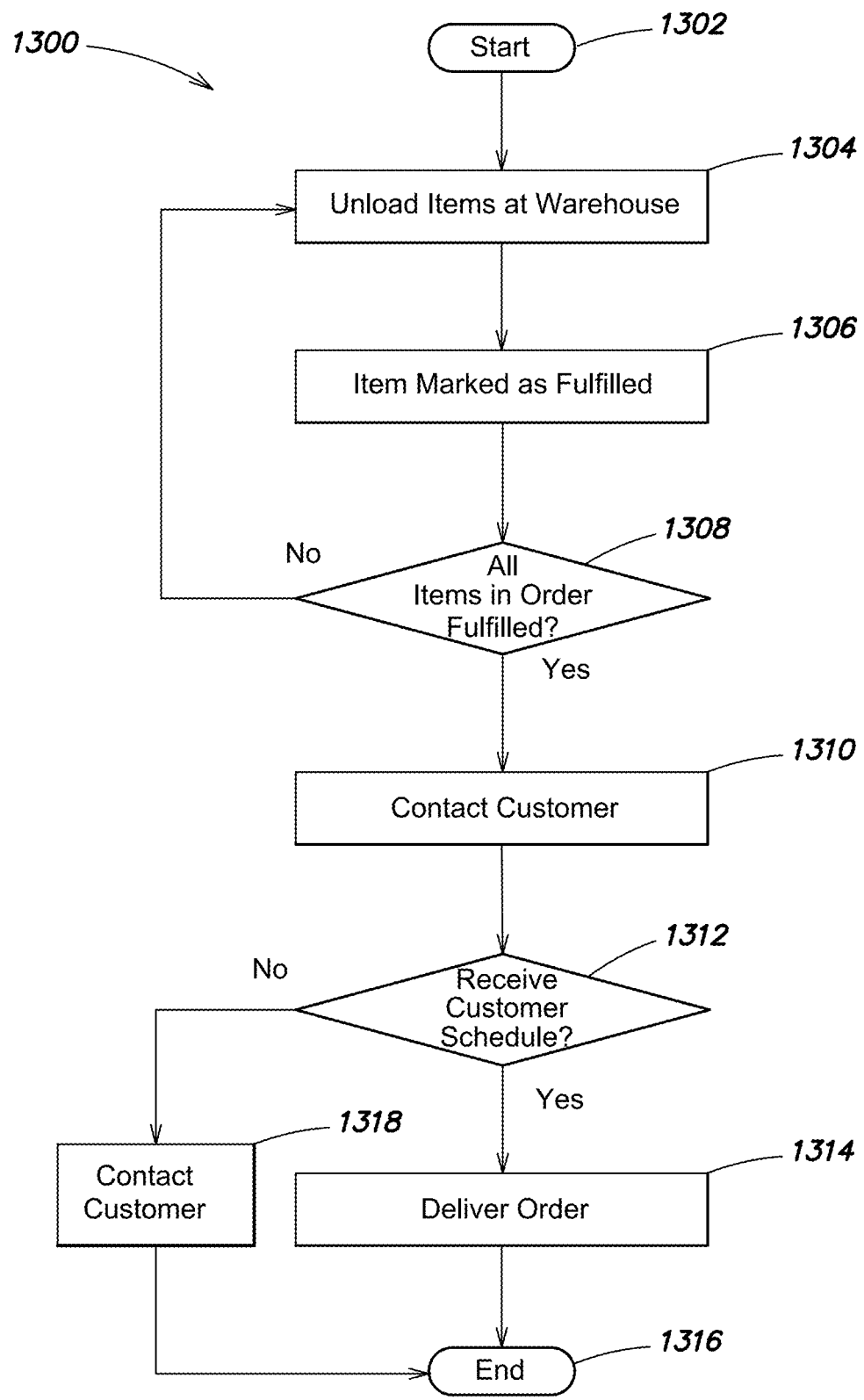
FIG. 13 is a flow diagram illustrating a process for scheduling a delivery schedule with a customer, according to one embodiment.

FIG. 13 illustrates an example process flow 1300 for scheduling and delivering an order to a customer. At step 1302, the process 1300 begins. In at least one embodiment, a delivery system executes the process 1300, while in other embodiments, the process 1300 is executed by a delivery system operating in conjunction with a mobile application. In yet other embodiments, process 1300 can be executed on a mobile device. In one example, the mobile application can be operated by an end user (e.g., delivery personnel, a customer receiving an order, etc.). In further embodiments, the mobile application can execute alone on a device operated by an end user.

At step 1304, an item or items are unloaded at a warehouse (e.g., by delivery personnel). At step 1306, the system and/or mobile application receives input indicating that an order arriving at the warehouse has been fulfilled. The order can include one or more items. In some examples, the input received can be generated automatically by the system, while in other examples, the input is generated manually. For example, delivery personnel can enter information into the mobile application associated with order fulfillment. In some examples, the item(s) in the order can be intended to be delivered to customers, and are collected at a warehouse prior to delivery to a customer.

At step 1308, the system and/or mobile application evaluates whether all of the item(s) in a customer's order have been received at the warehouse. If system, for example, determines that no customer orders have been fulfilled 1308NO, then the process returns to step 1304, whereby item(s) continue to be unloaded at a warehouse. If, however, the system and/or mobile application identifies that fulfillment of an item at step 1306 fulfills a customer's entire order in part or in whole 1308YES, then the process continues to step 1310.

At step 1310, the system and/or mobile application contacts (e.g., via email, text message, fax, postal service, prerecorded message, etc.) a customer whose order has been fulfilled and is ready for delivery. In some examples, the correspondence (e.g., via email) can contain scheduling information to deliver the order. For example, the system and/or mobile application can request (via, e.g., email) that the customer input (e.g., by following an embedded link in, for example, an email message) his or her availability to receive a delivery. In one embodiment, the system and/or mobile application can query the customer to provide a specific date(s) and time(s) that the customer is available to receive an order. For example, the mobile application and/or system can provide the customer with a list of potential date(s) and time(s), while in other examples, the mobile application and/or system can prompt the customer to provide any date(s) and time(s) using, for example, a text input box. It is appreciated, however, that any method of indicating availability (e.g., to schedule a delivery) can be utilized by the system and/or mobile application. In various embodiments, it is realized that prompting the customer to schedule the delivery improves operational performance of the delivery system. Acceptance rates of deliveries are significantly lower under conventional approaches where a customer is dictated a delivery time. In some embodiments, the system implements delivery notification, with embedded hyperlinks that bring the customer to user interfaces tailored to their delivery and delivery options.

At step 1312YES, the mobile application and/or system receives a completed schedule (e.g., including date(s) and/or time(s) that the customer is capable of receiving, e.g., a delivery) from the customer. At step 1314, the system and/or mobile application identifies a date and/or time (e.g., from the date(s) and time(s) indicated by the customer as eligible delivery times) to which a delivery is committed, and the order is delivered at that date and/or time. Else at 1312NO, the customer is contacted at 1318. The process ends at step 1316.

By establishing a mutually-scheduled delivery appointment, a more efficient delivery system can be realized. For example, it is appreciated that many currently available delivery systems do not account for customer availability. Such a system suffers from inefficiencies caused by, for example, customers missing deliveries due to not being available to receive a delivery. Missing deliveries causes delivery personnel to make additional, redundant deliveries of items that continue to tie up valuable computer resources to track the deliveries' status. A "naive" delivery system that fails to account for customer availability invites a host of unnecessary inefficiencies on computer and personnel resources. In some examples, multiple deliveries are executed to effect the delivery to the customer. By eliminating such inefficiencies, an improved delivery system results.

As discussed, various embodiments of the delivery system are configured to minimize missed deliveries and yield a more efficient computer system. In some embodiments, delivery efficiencies can be increased and missed deliveries can be reduced automatically using, for example, the user interface (e.g., as described in steps 1310-1316) wherein a system auto-generates a notification and links a customer computer system to a scheduling interface that requires a customer to schedule a delivery appointment in response to, for example, the notification.

FIG. 18 shows a user interface 1800, according to one embodiment, for planning deliveries. In at least one example, the user interface 1800 is executed by a mobile application, while in other embodiments, the user interface 1800 is executed by a delivery management system. In yet other embodiments, either or both of the mobile application and/or the delivery management system can display the user interface 1800.

The user interface 1800 includes an order ID column 1802 that, in some examples, associates a unique identifier (e.g., a number, a string, etc.) with an order. In some embodiments, the user interface 1800 includes a status column 1804 that identifies the status of an order. In some examples, the user operating the user interface 1800 can be a member of the delivery personnel responsible for delivering an order to a customer. For example, the user interface 1800 can enable a user (e.g., delivery personnel) to track the status of a delivery throughout the process 1300. As discussed above, for example, at step 1308 of process 1300 the mobile application and/or delivery management system evaluates whether all items in an order have been received for delivery. If so, then the entire order is fulfilled and the user interface 1800 can be updated (e.g., in real time) to reflect this change in the column 1804. If an entire order is not fulfilled, a number of alternative statuses can be applicable to an order (e.g., approved, pre-funded, approved/pre-funded, pending customer pickup, canceled, funded, etc.).

According to some embodiments, the user interface 1800 can include a column for the name of a customer 1806 (e.g., a customer receiving an order) associated with a specific order ID. The user interface 1800 can further include a line items column 1808 that specifies the number of items in an order (e.g., 1, 2, 5, 12, etc.), and in some examples, the user interface 1800 includes a column denoting the retailer 1810 for a specific order. If a delivery has been scheduled (e.g., by execution of the process 1300), then the scheduling column 1812 can indicate a scheduled time for a delivery to occur. In some examples, if no delivery has been scheduled, there can be an explicit indication of the lack of scheduling (e.g., a notification or a display of a visual indicator selectable to schedule a delivery). In other examples, an order can have a blank entry for the scheduling column 1812 if no delivery has been scheduled. In still other examples, the scheduling column 1812 can simply indicate if a delivery has been scheduled or not, without any specific details.

In some embodiments, the user interface 1800 includes a location column 1814 specifying, in some examples, the location that the order is scheduled to be delivered. According to at least one embodiment, the location can be a known region (e.g., a state, a town, the Northeast, the East Coast, etc.) or can be a region demarcated by a user (e.g., delivery personnel), the delivery management system, the mobile application, etc. In still other examples, the location can be a specific address to which to deliver an order.

According to one embodiment, the user interface 1800 can sort or filter the displayed orders according to input received by a user. For example, the user interface 1800 can filter display results according to various parameters (e.g., filter by order number, reference number, customer name, dates, times, flags, line item number, phone number, retailer, manufacturer, a region, an address, an internally-identified region, filter out orders with more than 5 line items, etc.) or can sort results responsive to a user input (e.g., in ascending or descending order of line item count, display fulfilled items first, etc.) in order to quickly and efficiently allow a user (e.g., delivery personnel) to navigate order information. In some embodiments, a filtering menu may be provided separated from, or incorporated with, the user interface 1800. Responsive to receiving indication from a user of a specific order ID, the user interface 1800 can display expanded order information as shown in FIG. 19.

As shown in FIG. 19, the user interface 1900 displays additional order information, in one example. For example, the user interface 1900 can include manifest information, including a manifest ID 1902. In some examples, a manifest ID 1902 can be used to uniquely identify a manifest (e.g., a list of deliveries to be delivered) for a user (e.g., delivery personnel). The user interface 1900 can further include a type of delivery 1904 identifier, which indicates the type of delivery (e.g., home delivery, corporate delivery, international delivery, etc.) associated with the manifest ID 1902. A delivery origin 1906 is included in some embodiments of the user interface 1900, which indicates, in some examples, a point of origin (e.g., a warehouse) for a delivery. According to some examples, the user interface 1900 can include a destination 1908, for example, a final destination (e.g., a home, a business, an intermediate delivery hub, etc.) for an item to be delivered to. The user interface 1900 can also include a scheduling time 1910 (e.g., a date and/or time that a good will be delivered, the date and/or time that a delivery was scheduled with the delivery management system and/or mobile application, etc.) in some embodiments.

Figure 21:
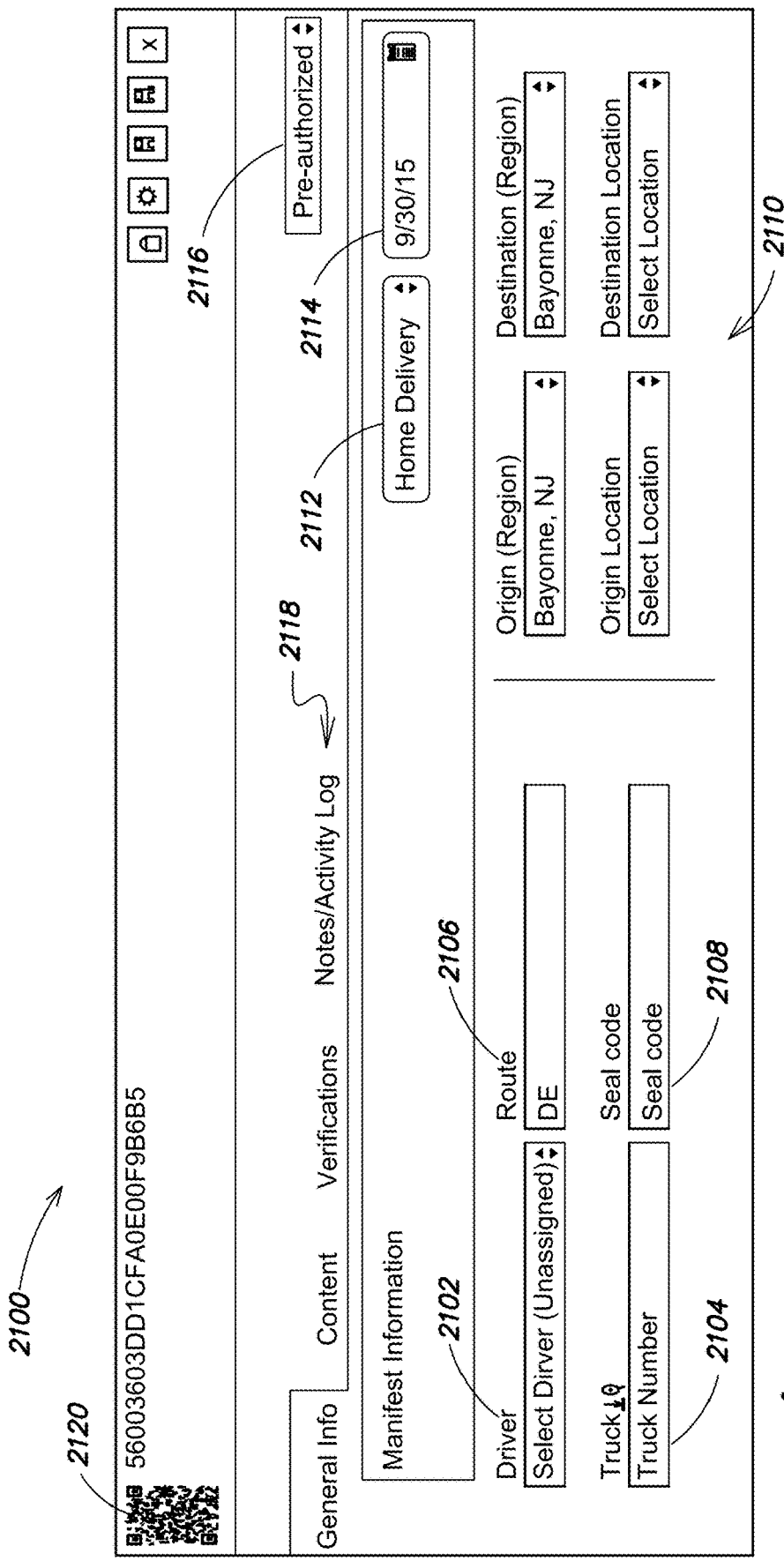
FIG. 21 is a user interface illustrating a general information page, according to one embodiment.

Furthermore, the user interface 1900 can include a plurality of tabs 1912 that can be switched between responsive to input from a user. For example, in the pictured embodiment, a manifests tab is open to show features 1902-1910. The list of tabs 1912 can further include a general information tab, which displays a broad overview of, for example, an order. This information can include, in some examples, the date an order was placed, the name of the person who ordered the item, a description of the item being delivered, the time that the order was placed, etc. FIG. 21 shows one embodiment of the user interface 2100 displayed by the general information tab. For example, responsive to selection of the general information tab in FIG. 19, the user interface is configured to transition to the general overview shown in FIG. 21.

FIG. 21 shows a general overview of a manifest. For example, the user interface 2100 can allow a user (e.g., delivery personnel) to view the driver assigned to a specific manifest, or can prompt the user (e.g., a manager of delivery personnel) to select a driver to assign to a manifest (e.g., from a drop-down list, check box, entry into a text box, etc.) responsive to selection of the driver feature 2102. In one embodiment, the user interface 2100 includes a truck feature 2104 operable to display (e.g., to delivery personnel) a truck number assigned to a specific manifest, seal code 2108, or can prompt a user (e.g., a manager of delivery personnel) to assign a truck number to a manifest. The truck feature 2104 can further allow a user to view the current location (e.g., using GPS technology) of a truck assigned to a manifest responsive to receiving the number of a truck.

According to some embodiments, a route feature 2106 displays (e.g., to delivery personnel) a route to a user (e.g., by showing a map, by listing a known route, etc.), while in other embodiments, the route feature 2106 can prompt a user (e.g., a manager of delivery personnel) to pick a route to assign to a specific manifest. In some embodiments, the user interface 2100 can include delivery information 2110 specifying the origin and destination for a manifest. For example, the delivery information 2110 can display (e.g., to delivery personnel on a mobile application) an origin region (e.g., a geographical region, an internally-known region, a state, a town, etc.), an origin location (e.g., an address, an internally-owned warehouse, etc.), a destination region (e.g., a geographical region, an internally-known region, a state, a town, etc.), and/or a destination location (e.g., an address, an intermediary warehouse, etc.) to a user. In other embodiments, the mobile application and/or delivery management system can prompt a user (e.g., a manager of delivery personnel) to set any of the above origin and/or destination information (e.g., using a dropdown box, a text box, etc.).

The user interface 2100 can further allow a user (e.g., delivery personnel, a manager of delivery personnel, etc.) to set or view the type of a delivery (e.g., home delivery, corporate delivery, etc.) using the delivery type feature 2112. In other examples, the user interface 2100 can include a date-setting feature 2114 operable to display, or prompt a user (e.g., delivery personnel, a manager of delivery personnel, etc.) to enter, the date and/or time a delivery is to be made. Further examples can include a status feature 2116 operable to display, or prompt a user (e.g., delivery personnel, a manager of delivery personnel, etc.) to enter, the status (e.g., pre-authorized, fulfilled, etc.) of an order.

In some embodiments, execution of delivery operations can trigger one or more information gateways and/or lock out mechanisms. The information gateways are configured to operate responsive to a determined status and specification of information required at a status point in the delivery. For example, when a delivery attempt is made, the delivery personnel must enter images of the item in place. The system can be configured to prevent access to additional information, further user interfaces, etc. that provide information, for example, on a next delivery location. In some embodiments, triggering of the information gateway cause the user interface to "gray out" currently visualized delivery information. To access the grayed out information, the end user must input required information. Responsive to receiving the required information in the user interface (e.g., 2100), the system and/or mobile application is configured to enable access to further delivery information or provide access to the previously shown delivery information.

Figure 22:
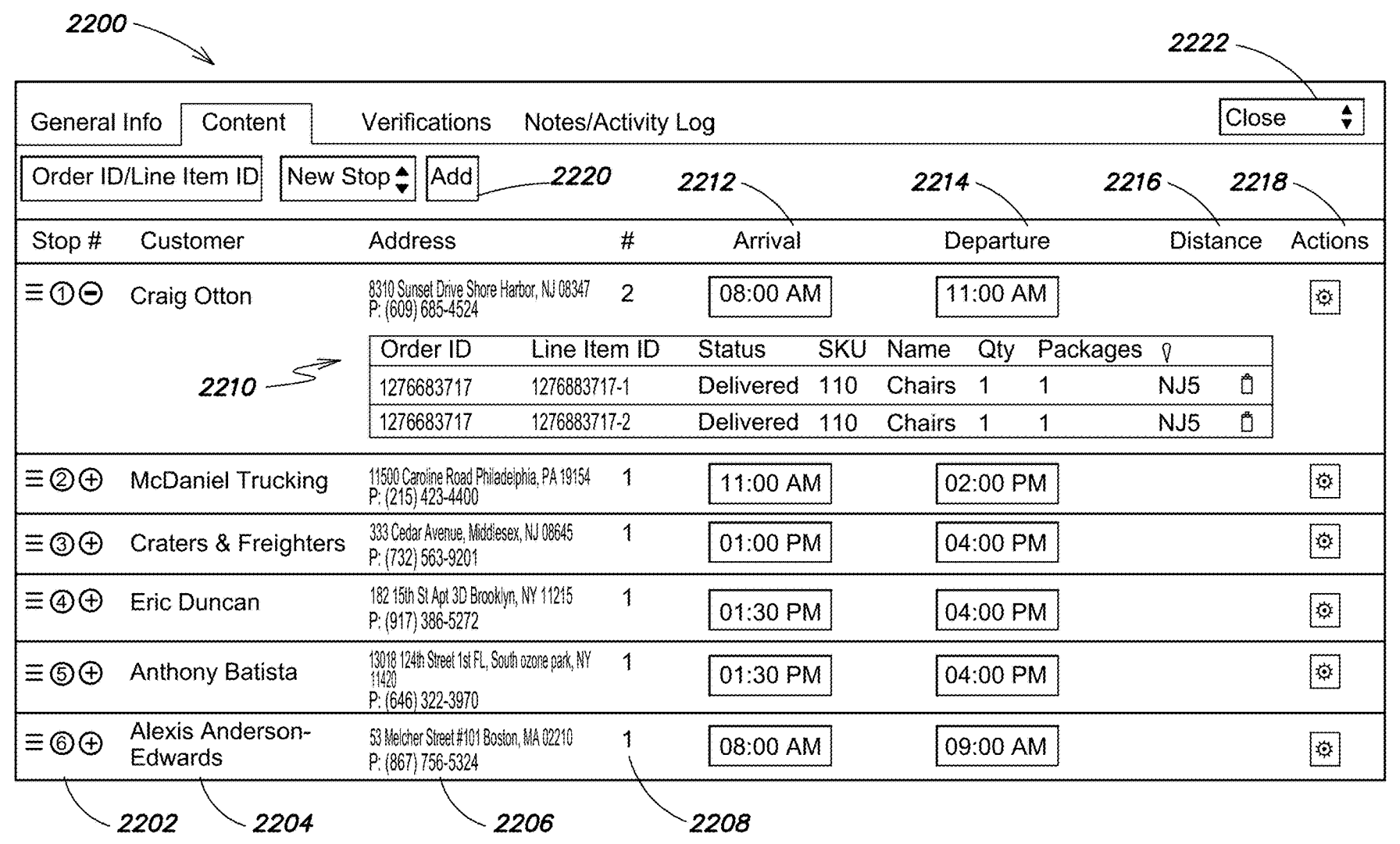

The user interface 2100 can also include a plurality of additional feature tabs 2118 including, for example, a content tab, a verifications tab, and/or a notes/activity log tab. For example, the content tab can display the contents and/or details of an identified order to a user, amongst a plurality of additional information expanded upon as shown by FIG. 22. The verifications tab can be operable to display verification information (e.g., verification that an order/manifest has been approved by, for example, a manager, verification that an order has been received, etc.) to a user. In some examples, a notes/activity log tab can be operable to display a list of actions taken with respect to an identified order, and/or notes made about an identified order. The notes/activity log tab can also prompt a user to enter a note or plurality of notes, or can prompt the user to record any pertinent actions taken in delivering or handling an order. The user interface 2100 can also interface with an external device (e.g., a mobile phone) via an identification code (e.g., a barcode, a QR code, etc.) displayed by the user interface 2100. Responsive to scanning the identification code, the external device can receive all or a portion of the general information displayed by the user interface 2100. Verification of a manifest can trigger an information gateway. For example, required information can be validated against the information received through user interface 2100 (e.g., validate manager approval). If not validated, the user interface can be locked to prevent access to additional delivery information.

FIG. 25 shows another example of a general information user interface 2500. In at least one embodiment, the general information user interface 2500 includes an order information section 2502. In at least one example, the order information section 2502 can include an order ID number, an order status (e.g., funded, pre-funded, unfunded, etc.), an order creation date (e.g., a time, a date, etc.), a payment status (e.g., successful, unsuccessful, etc.), and/or a total cost. In some examples, these and other parameters can be edited in response to input by a user (e.g., delivery personnel). For example, a region parameter (e.g., a region in which a delivery is to be delivered) can be edited in response to selection by a user (e.g., delivery personnel), wherein the region parameter can be a geographical region, a state, a town, an internally-defined region, or any other applicable region. Some examples of the order information section 2502 can also include a reference number section that can query a user for input of a reference number to associate with a particular order. At least one embodiment of the order information section 2502 can also include an order cost section, operable to receive an order cost from a user (e.g., delivery personnel) to assign to a particular order.

Certain embodiments of the general information user interface 2500 can also include a retailer information section 2504. The retailer information section 2504 can query the user (e.g., delivery personnel) to provide information such as, for example, a company name, a contact name, a phone number, an email address, and/or a delivery address. The mobile application and/or delivery management system can prompt the user to input information using text boxes in some examples. In other examples, such as for prompting the user to input a delivery location, the delivery management system and/or mobile application can display a map and prompt the user to, for example, click a location on a map to receive a delivery location.

According to some aspects, the general information user interface 2500 can also include a customer information section 2506. The customer information section 2506 can prompt the user to input, for example, a customer name, email, phone number, and/or address. Certain embodiments of the present invention can also include a delivery schedule section 2508. The delivery schedule section 2508 can include information such as a destination location, an origin location, a delivery time and date, a date that a delivery was requested on, a completed delivery date, and/or delivery notes. The delivery management system and/or mobile application can prompt certain users (e.g., delivery personnel) for any of the foregoing information, which can be displayed to other users (e.g., delivery personnel, customers, etc.) for viewing purposes.

Figure 26:
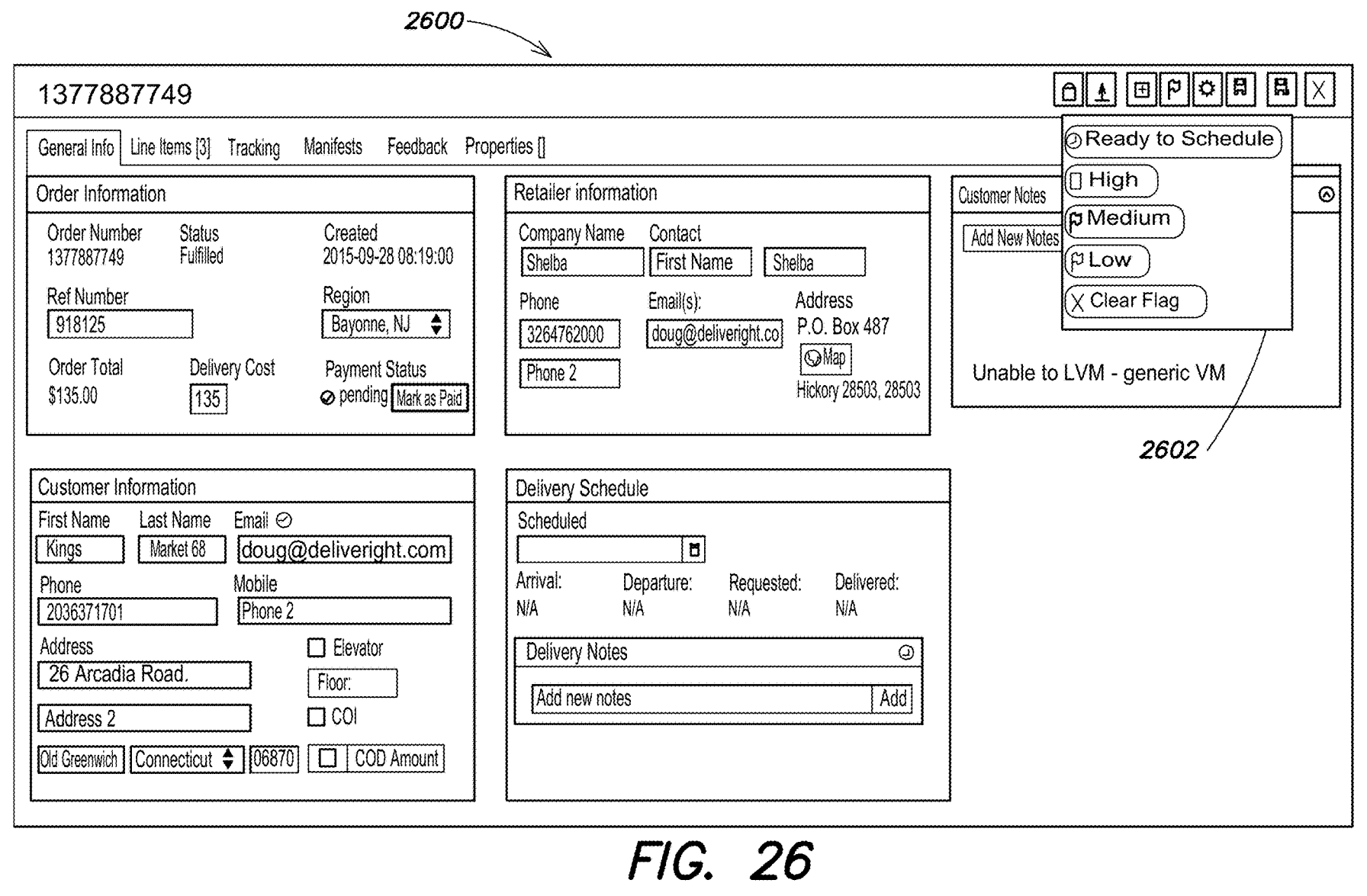

According to some embodiments, the general information user interface 2500 can also include a plurality of buttons 2510. FIG. 26 shows another example of a general information user interface 2600. A warning flags button 2602 can be displayed by the mobile application and/or delivery management system that, in some examples, denote the importance of a delivery. For example, the warning flags can indicate a high delivery importance, a medium delivery importance, a low delivery importance, or a ready-to-schedule status. The mobile application and/or delivery management system can prioritize the scheduling of deliveries according to their flag importance level, or can prompt a user to schedule deliveries according to their flag importance level, in some embodiments.

FIG. 27 shows another example of a general information user interface 2700, displayed in response to the delivery management system and/or mobile application receiving a user selection of an order options button 2702. For example, additional order options can include options to accept or reject an order. Responsive to user selection of the reject order option, for example, the delivery management system and/or mobile application can remove an order from a manifest to which the order belongs. Other options can include a delivery failed option, indicating that a delivery was not successful, and an order picked up option, indicating that an order was successfully picked up. Certain embodiments of the order options button 2702 can provide options to return an order to a manufacturer if an item is not to be delivered to a customer, while other options can indicate that a delivery or order has been confirmed. If a selection for "not to be delivered" is triggered, the delivery system can trigger automated remediation operations, where a new order is placed and scheduled for delivery responsive to selection. In other examples, automated remediation includes generating notification to the customer of a damage order and options for accepting a partial order, accepting a new order and delivery date, etc.

If the order is confirmed, the delivery management system and/or mobile application can receive input from a user (e.g., delivery personnel) indicating that a delivery has been successfully completed and confirmed. Some examples of the general information user interface 2700 can also include options for printing labels, such as for example, PDF-format labels, marked-up labels, etc. In the case of an order being ready for pickup, the general information user interface 2700 includes an option to mark an order for pickup in response to selection by a user.

According to some embodiments of the general information user interface 2700, options are provided to cancel an order. For example, the mobile application and/or delivery management system can remove an order from record in response to receiving input from a user selecting the cancel order option. Some examples of the general information user interface 2700 can also include a download delivery confirmation option that is operable to download confirmation of an order delivery responsive to user selection. Another option provided by the general information user interface 2700 can be an order tracking option. When selected, the system operates to display an order tracking display.

FIG. 28 shows one example of an order tracking user interface 2800. The order tracking user interface 2800 can include an item ID column 2802, a date column 2804 (e.g., a date, time, etc.), a user column 2806 (e.g., a visitor, an employee name, etc.), a description column 2808 (e.g., funded, pre-funded, etc.), and/or a location column 2810 (e.g., current delivery location, delivery origin location, delivery destination location, etc.). Although the order tracking user interface 2800 can be displayed by the mobile application and/or delivery management system in response to selection of a tracking option as displayed in FIG. 27, the order tracking user interface 2800 can also be displayed responsive to selection of the tracking tab 2812 from other tabs' user interfaces, such as the user interface of FIG. 29 shown below.

FIG. 22 shows one embodiment of a content user interface 2200. The content user interface 2200 can display, for example, a stop number 2202 associated with each item in a manifest. The content user interface 2200 can prompt a user (e.g., delivery personnel, a manager of delivery personnel, etc.) to view or alter the stop number associated with an item. For example, the content user interface 2200 can allow a user to change the first stop in a manifest to the fifth stop in a manifest. Some examples of the content user interface 2200 also include a customer tab 2204 which can list the customer (e.g., the intended recipient of a delivery) associated with a specific item in a manifest. An address feature 2206 included in some examples of the content user interface 2200 can be operable to display the address to which an item is being delivered. In some examples, the content user interface 2200 can prompt a user to alter the listed address.

According to some embodiments, the content user interface 2200 can be configured to display the number of a particular item included in an order in a number of items column 2208. Operable to receiving input from a user selecting the number of items in an order, the content user interface 2200 can display additional information 2210 about the items in an order (e.g., the order ID, line item ID, status, SKU, item name, quantity of each item, number of packages, location, etc.). Furthermore, an arrival feature 2212 of the content user interface 2200 can, in some examples, display the intended arrival time for an item to be delivered. In alternate embodiments, the content user interface 2200 can prompt a user to alter the arrival time using the arrival feature 2212. Similarly, a departure feature 2214 can, in some embodiments, allow users (e.g., delivery personnel, managers of delivery personnel, etc.) to view or set the departure time from, for example, a delivery location.

In at least one embodiment, a distance feature 2216 can display the distance (e.g., in miles, meters, feet, etc.) to a delivery location from, for example, a current location. Some examples of the content user interface 2200 also include an actions feature 2218 operable to prompt the user to take additional action with respect to an item (e.g., move stop, reschedule stop, set location, drop-off/pickup, etc.). At least one embodiment of the content user interface 2200 includes an add item feature 2220 operable to receive order information (e.g., order ID, line item ID, etc.) from a user (e.g., delivery personnel) and add the specified order to a selected manifest. Some examples of the content user interface 2200 can also include a filtering feature 2222 operable to, in some embodiments, filter the displayed items by type (e.g., close, pre-authorized, etc.).

FIG. 23 shows one embodiment of a verifications user interface 2300 displayed responsive to selection of the verifications tab from, for example, user interface 2100 or user interface 2200. For example, some embodiments of the verifications user interface 2300 display includes a date feature 2302. The date feature 2302 displays the date and/or time associated with an order. A type feature 2304 included in some examples of the verifications user interface 2300 displays a type associated with an order, for example, a home delivery, a preload home delivery, and so forth. According to some embodiments, a user feature 2306 can display, or in some embodiments, allow a user to alter, the user assigned to delivering an item to a customer. A comments feature 2308 can, in some embodiments, display any comments pertaining to an item, or can prompt the user to enter a new comment. A location feature 2310 of some embodiments can be operable to locate a delivery driver or delivery destination on, for example, a map responsive to user selection. According to some embodiments, a filtering feature 2312 can filter the types (e.g., close, pre-authorized, etc.) of deliveries displayed by the verifications user interface 2300.

Returning to FIG. 19, some embodiments of the user interface 1900 can include a line items tab in the list of tabs 1912, which can display information about the items in a delivery. For example, FIG. 29 shows one embodiment of a line items user interface.

FIG. 29 shows one example of a line item user interface 2900. The line item user interface 2900 can include an item ID column 2902, a status column 2904 (e.g., funded, pre-funded, unfunded, etc.), a stock keeping unit (SKU) column 2906 (e.g., base delivery, additional delivery, etc.), a delivery type column 2908, a delivery service column 2910, an item quantity column 2912, a package quantity column 2914, a delivery location column 2916 (e.g., delivery origin, delivery destination, current location, etc.), and/or a manufacturer column 2918. Some embodiments of the present invention can include an add line item button 2920, operable to prompt a user (e.g., delivery personnel, etc.) to enter new line item information to add to an order responsive to selection by the user. As previously mentioned, the line item user interface 2900 includes a plurality of tabs 2922 in at least one embodiment, operable to transition between various user interfaces responsive to selection by a user. For example, selection of the tracking tab 2924 can, in one embodiment, display the order tracking user interface 2800. In this fashion, the mobile application and/or delivery management system can transition between various user interfaces in a plurality of ways in response to input from a user.

According to some embodiments of the present invention, the user interface 1900 can include a tracking tab. The tracking tab can allow a user (e.g., a customer, delivery personnel, etc.) to follow the progress of a delivery. The delivery management system and/or mobile application can automatically update the progress of the delivery (e.g., using GPS technology, inferring from checkpoints through which a delivery passes, etc.), or the progress of the item can be manually input a user (e.g., delivery personnel). Some other embodiments can include a feedback tab, which users (e.g., customers) can use to report on aspects of the delivery. For example, a user (e.g., a customer) can use the feedback tab to report on the courtesy of delivery personnel, the state of the delivered package, etc. The user interface 1900 can also include a properties tab, which can be operable to list properties of a delivery. For example, responsive to a user selecting the properties tab, the delivery management system and/or mobile application can prompt the user to rename an order ID, add notes or alerts to the order ID, and so forth.

Figure 20:
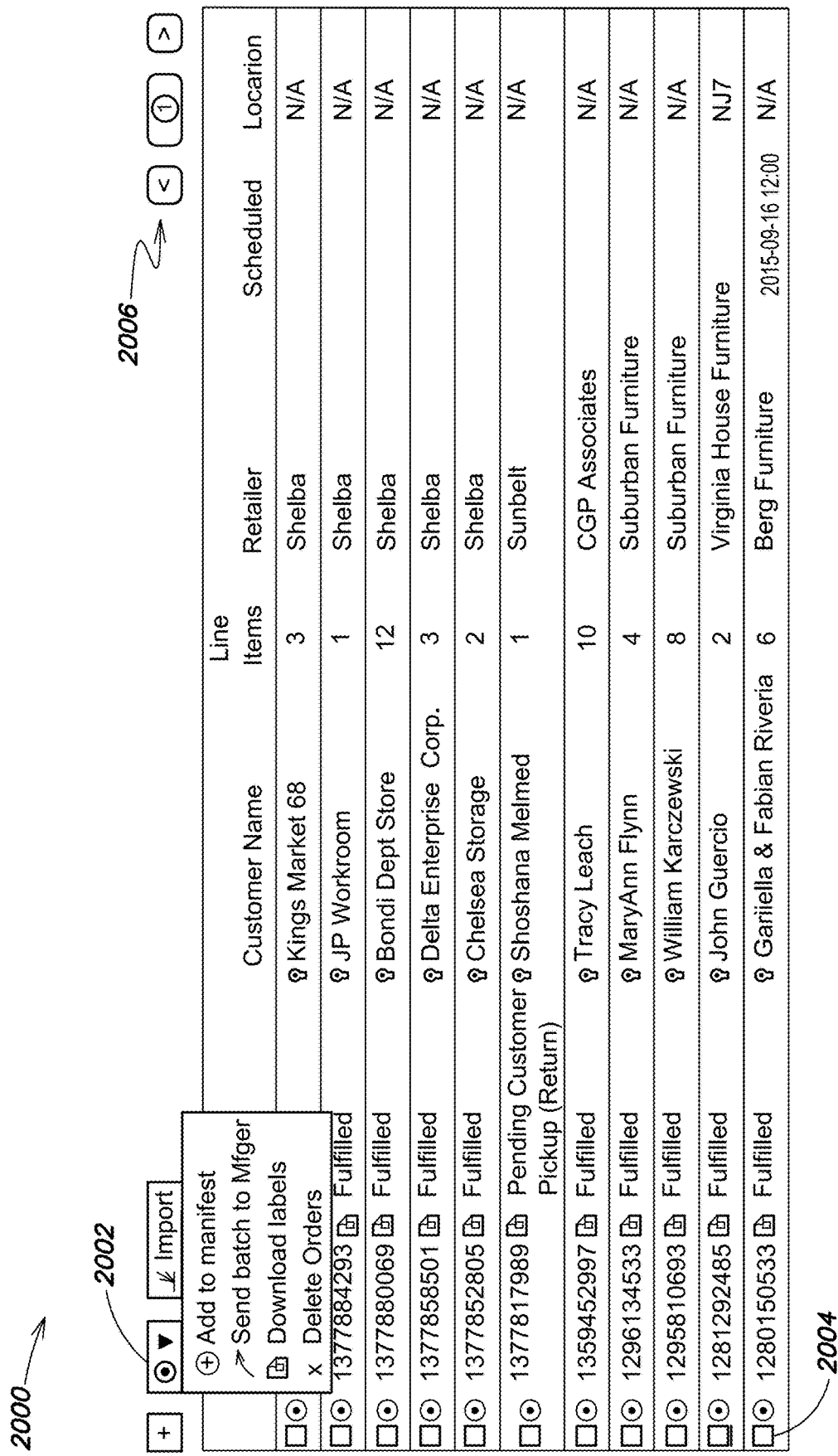
FIG. 20 is a user interface illustrating an order overview page, according to one embodiment.

Turning to FIG. 20, an additional options user interface 2000 can be displayed by the mobile application and/or delivery management system responsive to user selection. For example, additional order options can be displayed by the mobile application and/or delivery management system responsive to user selection of a more options button 2002. In one example, additional options can include adding one or multiple orders to a manifest. The mobile application and/or delivery management system can allow a user (e.g., delivery personnel) to select any number of orders to add to a manifest by, for example, checking boxes like checkbox 2004. Responsive to receiving user selection of the "Add to manifest" option, the delivery management system and/or mobile application can add all checked orders to a manifest, in one embodiment. In other embodiments, the mobile application and/or delivery management system can allow a user to, for example, right-click on an order to add it to a manifest. If an order is already in a manifest, any of the above methods for adding an order to a manifest can be used to remove an order from a manifest.

In some embodiments, the more options button 2002 can include an option to return an order to the manufacturer of that order. Selection of the orders to return to a manufacturer can be accomplished by activating a checkbox (e.g., checkbox 2004), or can be accomplished by right-clicking on an order. Once an order, or multiple orders, is selected, the mobile application and/or delivery management system can initiate procedures to return the orders to their manufacturer responsive to the "Send batch to manufacturer" option being selected. Further embodiments of the more options button 2002 can include a "Download labels" option operable to, for example, download order labels for a specific order or set of orders. The labels can, for example, be physical (e.g., printable) labels that can be affixed to an order for shipping. Another example of an option from the more options button 2002 can be a "Delete orders" option, operable to delete any selected orders. For example, responsive to the mobile application and/or delivery management system receiving an input to delete any selected orders, the delivery management system and/or mobile application can delete any selected (e.g., orders that have a corresponding checkbox checked) orders from the user interface 2000. Some embodiments of the user interface 2000 can include a page navigation feature 2006. In some examples, the page navigation feature 2006 comprises a forward arrow and a back arrow, operable to navigate between various pages of orders, including orders that have been added to manifests and/or orders that have not been added to manifests, in some embodiments.

FIG. 24 shows one embodiment of a manifest overview page 2400. For example, a manifest summary 2402 can be included to provide a summary of a manifest's details over one or multiple days. For example, a user (e.g., delivery personnel) can be able to set the time frame over which a manifest is summarized. The manifest summary 2402 can include buttons 2404 which, responsive to user selection, changes the manifest summary 2402 display to provide manifest information over the time frame (e.g., a day, a week, a month, a year, etc.) specified by the button selected. If, for example, the day button is selected, then the manifest summary 2402 can display a daily summary of a manifest. The mobile application and/or the delivery management system can prompt the user to specify the day over which the summary 2402 is desired.

In alternate embodiments, a weekly summary can be displayed. The mobile application and/or delivery management system can provide various options to customize the manifest overview page 2400. For example, the mobile application and/or delivery management system can prompt the user to specify the times to display (e.g., 12 AM to 12 AM, 6 AM to 1 PM, 9 AM to 5 PM, etc.), the amount of days to display (e.g., Sunday-Sunday, Monday-Friday, Monday-Sunday, etc.) and the specific day, week and/or month to display (e.g., 2 weeks in the future, the current week, etc.). The mobile application and/or delivery management system is operable to switch between display granularities (e.g., daily, weekly, monthly, yearly, etc.) responsive to user selection, and can navigate through days, weeks, months, years, etc. using the navigate buttons 2406.

In some embodiments, a manifest summary 2402 can display multiple days 2408 with planned manifests. Responsive to user selection, the mobile application and/or delivery management system can expand on the details of any day's manifest once that manifest is selected. The expanded information can display, for example, the time of all orders assigned to a manifest, the items in the manifest, a list of addresses to deliver to, anticipated delivery times, etc.). According to some embodiments, a daily manifest overview 2410 is displayed by the manifest overview page 2400 to provide a summary of a day's manifest details. For example, a daily manifest over can include information including a manifest ID, a manifest type, a schedule time, a truck ID, a route ID, a delivery origin, a destination, a number of stops, etc.

Certain embodiments of the manifest overview page 2400 include manifest adjustment buttons 2412 operable to, for example, refresh the displayed manifest summary 2402, create a new manifest, import manifest data into the manifest summary 2402, and/or export manifest data to an external device or other application. Furthermore, a manifest search feature 2414 can be included in some embodiments, operable to filter displayed manifests by, for example, date, type, status, driver, location, seal code, route, truck, and/or line item ID. In further embodiments, navigation buttons 2416 can be provided to, for example, display a subsequent or preceding manifest summary 2402.

Figure 10:
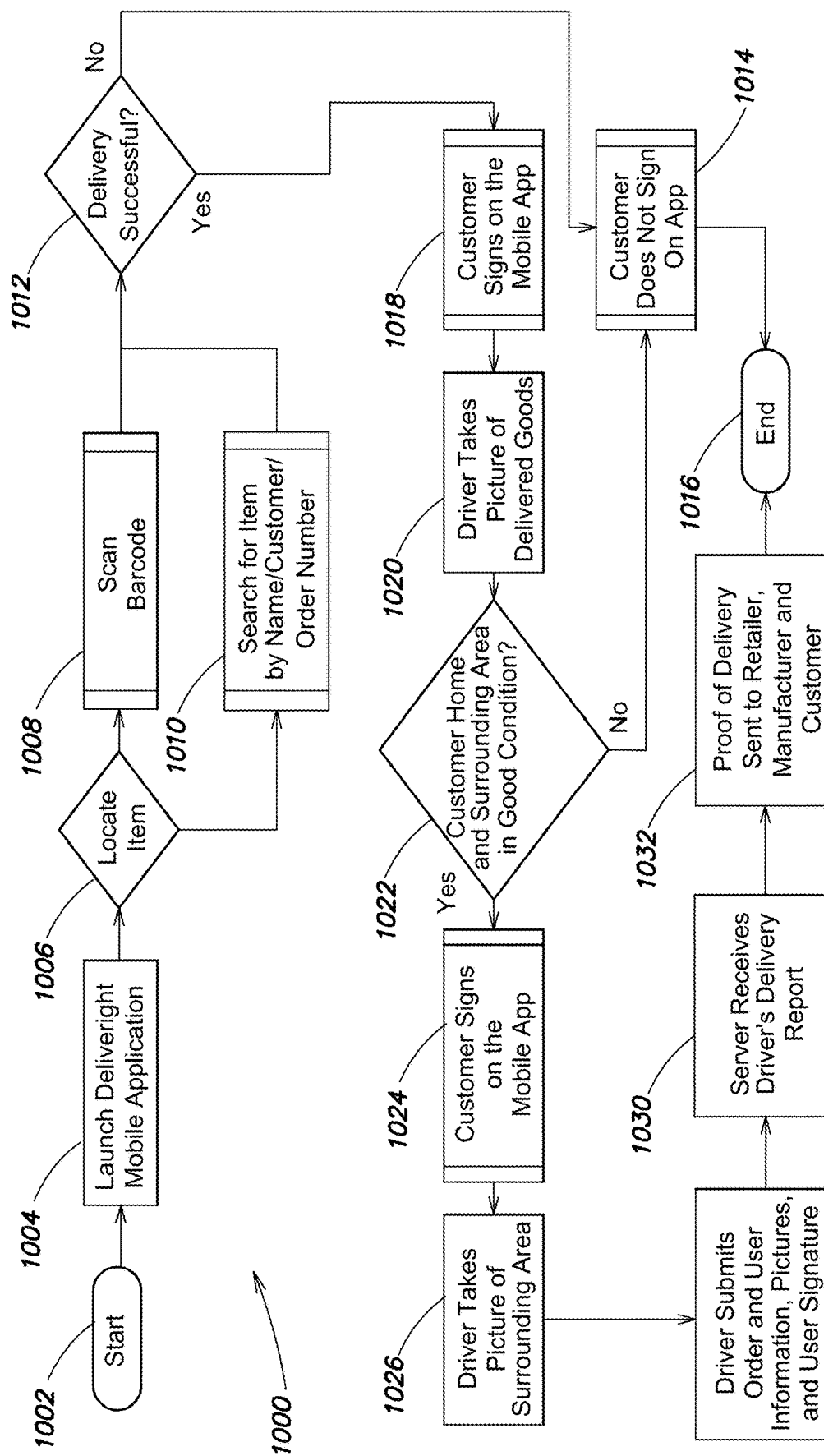
FIG. 10 is a flow diagram illustrating a process for delivery and acceptance by a customer, according to one embodiment.

FIG. 10 illustrates an example process flow 1000 for delivery of an item and acceptance by a customer. At step 1002, the process 1000 begins. In some embodiments, the process can be executed by a delivery system. In other embodiments, the process can be executed by a delivery system operating in conjunction with a mobile application executed on a mobile device, for example, operated by an end user (e.g., delivery personnel, a customer receiving the order, etc.). In yet other embodiments, the mobile application can execute alone on a device operated by an end user. In one example, a mobile application is executed, for example by a user (e.g., delivery personnel, a customer receiving the order, etc.), which can be triggered automatically by a delivery system, or triggered automatically by a monitoring process executing on the mobile device at step 1004. The monitoring process, in some examples, can be internal to the mobile application or can be external from the mobile application itself. The monitoring process can be configured to periodically, frequently, aperiodically, and/or continuously monitor delivery progress and automatically trigger delivery processes (e.g., delivery acceptance, rejection of goods, etc.) responsive to a determination of progress. For example, as the delivery nears the end delivery point, the system, process, and/or device can trigger delivery acceptance functions and require execution of delivery processes by gating access to a subsequent delivery and associated information or by gating access to subsequent routing information until completion of the delivery processes. In another example, the monitoring process can be configured to set an expected delivery time and trigger monitoring functions responsive to nearing the expected delivery time (e.g., using a 5, 10, 15, 20, 25, 30 minute, or other length . . . etc., time window).

In some embodiments, the mobile application can display a screen to request that the user confirm that a delivery is being executed. In other embodiments, the system, mobile application, and/or monitor processes can validate a delivery is taking place based on analysis of current location (e.g., via GPS), expected delivery time (e.g., based on estimated travel time and/or analysis of traffic conditions), and analysis of both location and time information. In further embodiments, the mobile application can be triggered manually by the end user (e.g., where GPS data is unavailable, for early arrival, late arrival, etc.).

According to one embodiment, at step 1006, the mobile application prompts the user to input information indicating the identity of the item that is being delivered. In one example, the system and/or the mobile application displays item information from the programmed delivery, and requests that the user verify the item identity. The application can accept various forms of identifying information to locate an item. In some embodiments, the mobile application relays the identifying information to the delivery system containing a database of items being managed by the delivery management system. For example, the system can identify an item based on barcode information received at step 1008, while in other examples, the system can identify the item based on an input of an item name, a customer name, or the order number, at step 1010. In another example, the user can image the item being delivered, and the system and/or mobile application can analyze the image to identify the item (e.g., via bar code scan or image, or based on image analysis of the item and characteristic matching, among other options). In some examples, the mobile application can also prompt the user with text boxes to enter any identifying parameters as input to the mobile application. In other embodiments, the system can find items based on any other form of identifying information or any combination thereof to quickly and efficiently relay information to a user via the mobile application.

In yet other embodiments, the mobile application can maintain a local database of items to deliver, and locate information on the delivery item stored locally. For example, upon scheduling deliveries for a route, the end user's (e.g., delivery personnel) device can be loaded with delivery information on all the delivery items. In other examples, the mobile application can query delivery information on all the delivery items from the delivery system. In one embodiment, the delivery system can make a cloud based resource or storage location available to specific mobile applications and instantiate a cloud based resource or storage location in proximity to a delivery route to facilitate data exchange.

Once the system identifies an item and relays identifying information to the application, the application prompts the user for input indicating that the delivery has been accepted (e.g., at step 1012). In one embodiment, the application accepts a signature from the customer as an input to confirm that the customer has accepted the delivery, although other forms of acceptance (e.g., a PIN, a passphrase, etc.) are possible. In some embodiments, the customer is required to accept each item being delivered. For example, the mobile application can present an accept all function, and responsive to receiving a customer signature, all of the items are accepted. In some examples, the mobile application relays the signature to the delivery system.

If the application does not receive a customer's signature 1012NO because the delivery was rejected or not completed, then the process continues to step 1014. The process then terminates at step 1016. If the application does receive the customer's signature 1012YES, however, then the application is configured to, in some embodiments, prompt the driver to take pictures of the delivered goods at step 1020. In some embodiments, the mobile application is configured to require pictures of the delivered items unboxed and in place at the customer location. In one embodiment, the mobile application validates the submitted images of the items to verify that an image has been captured from each angle of a respective delivered item (e.g., front, back, left side, right side, above, below (if possible)).

These pictures can be sent to the delivery system in one example, and can streamline any damage evaluation proceedings by keeping a record of the delivered item's condition at various points, should damage be discovered at a later time. The delivery system can be configured to perform validation of the pictures in real time, and signal the mobile application that a proper inspection has been executed. Conversely, the system (or the mobile application) can determine that the pictures taken do not correspond to the respective item, have not captured each angle, have not captured the surrounding area sufficiently, etc. If the system or mobile application cannot validate the inspection, the system and/or mobile application can limit access to delivery functionality and/or subsequent delivery information (e.g., as discussed further herein).

According to one embodiment, the mobile application and/or delivery system is configured to require completion of the delivery process. If delivery processing is not executed according to the prompts displayed by the user interface (e.g., requires customer input (e.g., signature), requires one or more images of delivered item, requires multiple images of each delivered item, requires images of installed location(s), requires multiple images of installed location(s), etc.) the mobile application and/or delivery system can prevent access to further delivery locations, routing, etc. If the system detects that an end user has left a delivery location without completing the delivery processing, the system can lock the end user device, for example, with a message to call administration to unlock. In further embodiments, the mobile application is configured to display an imaging interface (e.g., can be part of an inspection component) which displays a view of the image the delivery personnel are required to capture of a respective item. The displays shown in the mobile application can also be configured to illustrate an area of the surrounding location abutting the delivered item that is required to be captured in each angle image. In some examples, the mobile application is configured to analyze a current field of view for the mobile device and provide a visual indication to the end user responsive to the field of view sufficiently capturing the appropriate angle, the respective item, and area surrounding the item. The mobile application can guide image capture for each angle and validate the collected images. Alternatively the delivery system can validate the images once communicated from the mobile application. In yet other embodiments, a video capture session may be used and the video stream validated to ensure complete capture of the respective item and the surrounding area.

Returning to process 1000, in some examples, the application requires that the customer report the state of their home and the area surrounding the delivered goods at step 1022. For example, if the customer may sign their name to indicate that the delivered item(s) and surrounding area is in good condition. The customer may, however, input other forms of acknowledgement in lieu of a signature, such as by entering a PIN, or any other form of consent. If the application does not receive a customer's signature 1022NO, the process continues to step 1014, and this information is relayed to the delivery system in one example, which notes that the area has been damaged.

The process terminates at step 1016, and the application may prompt the customer with options for recourse, in some examples, to address any damage caused. These options are relayed to the application via the delivery system or are stored locally by the application, and the application or system evaluates what options for recourse are applicable to an individual customer based at least in part on the degree of damage recorded in the delivery system. The end user may view and select options for recourse via, for example, drop-down lists, check boxes, etc., and may submit any comments via, for example, a text box. If, however, the application receives a customer signature 1022YES at step 1024 indicating that the customer's home and the surrounding area were not damaged during the delivery process, then the application prompts the driver to take a picture of the home and surrounding area at step 1026 to document the state of the area in one example. This information can be relayed to, and stored in, the delivery system, or may be stored locally by the mobile application. As previously mentioned, this information streamlines any damage issue resolution process that may arise, as it creates a running record of the state of the delivered item.

In some embodiments, responsive to receiving a picture from the driver, the application or delivery system prompts the driver to submit a delivery report at step 1028. In some examples, the delivery report can contain any combination of the order information, user information, the pictures received from the driver, and the signatures received from the customer. In some embodiments, at step 1028, the application submits the delivery report, which is received, in one example, by the delivery system at step 1030. Responsive to the delivery report being submitted, the delivery system can, in at least one example, send a proof of delivery (POD) report to the customer that received the delivered goods, a manufacturer that manufactured the delivered goods, and a retailer that sold the delivered goods at step 1032. In some examples, the POD report contains order information, customer information, retailer information, images, and signatures, and in at least one embodiment, the POD report can be sent by email, text message, EDI, or any other known communication medium. At step 1016, the process ends.

Figure 17:
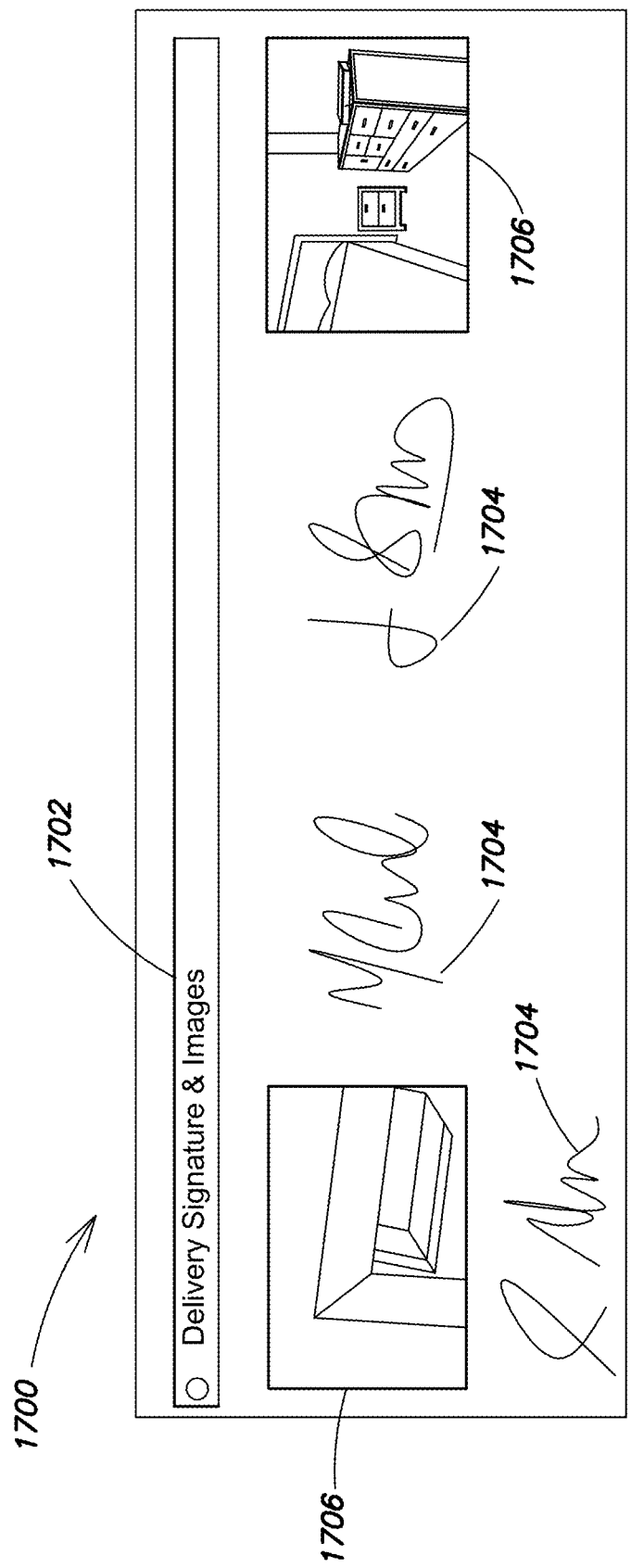
FIG. 17 is a user interface illustrating a completed signature and image section, according to one embodiment.

FIG. 17 shows one embodiment of a user interface 1700 displaying at least some of the information collected by the process 1000. In some embodiments, the user interface 1700 interacts directly with the delivery management system, while in others, the user interface 1700 interacts with the mobile application in lieu of the delivery management system. In still other embodiments, the user interface 1700 can interact with the delivery management system and the mobile application in parallel.

According to some embodiments, the process 1000 includes a step 1018 of receiving a signature from a user (e.g., a customer). The user interface 1700 includes a delivery signature and images section 1702 in at least one embodiment which, in one example, includes one or more signatures 1704 received by a user (e.g., a customer). Furthermore, the process 1000 includes steps 1020 and 1026 whereby a user (e.g., delivery personnel) submits pictures of delivered goods, the area surrounding the delivered goods, etc. In some examples, the delivery signature and images section 1702 can also include the images 1706 of the delivered goods, the area surrounding the delivered goods, and so forth.

Figure 11:
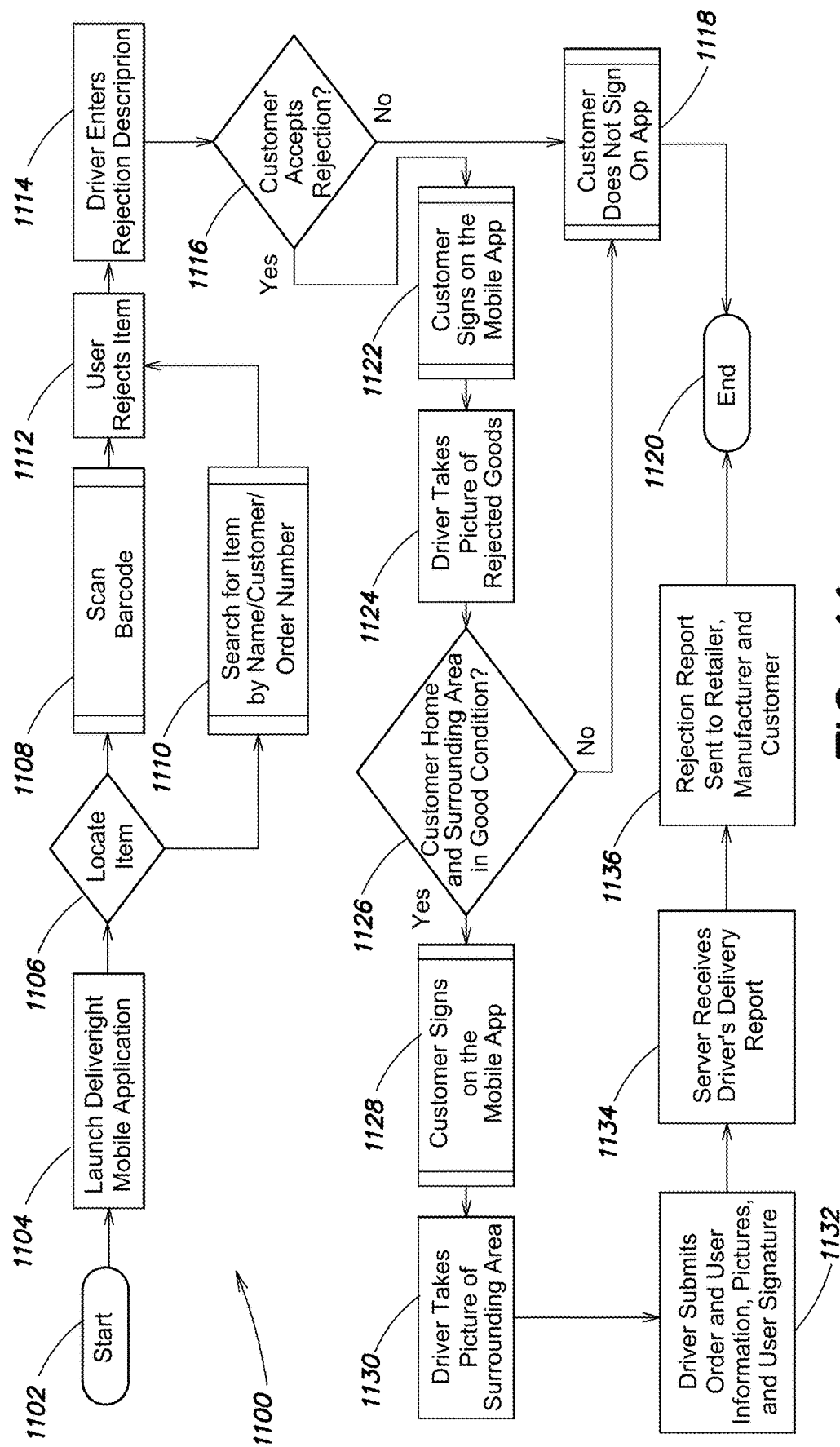
FIG. 11 is a flow diagram illustrating a process for delivery and rejection by a customer, according to one embodiment.

FIG. 11 illustrates an example process flow 1100 of the operation of the mobile application as it solicits and receives input from users during an unsuccessful delivery interaction resulting in rejection of the delivered goods. In some embodiments, the process can be executed by a delivery system. In other embodiments, the process can be executed by a delivery system operating in conjunction with a mobile application, for example, executed at a mobile device operated by an end user (e.g., delivery personnel, a customer receiving the order, etc.). In yet other embodiments, the mobile application can execute alone on a mobile device operated by an end user. At step 1102, the process 1100 begins. In one example, a user (e.g., a driver delivering an order to a customer, a customer receiving an order, etc.) launches the mobile application at step 1104. In other examples, the mobile application is triggered automatically by the delivery system, while in still other examples, a monitoring process launches the mobile application in anticipation of an impending interaction between the driver and the customer. The monitoring process can be a part of the mobile application in some examples, or can be external from the application in others.

At step 1106, the application receives identifying information (e.g., scan information, image information, etc.) from a user identifying the item that is being delivered, and in one embodiment, relays this information to the delivery system. The system can accept various forms of identification information from the application to locate an item in a database, according to one embodiment. For example, the system can identify an item based on barcode information received from the user via the application at step 1108, while in other examples, the system can identify the item based on an input of an item name, a customer name, or the order number, at step 1110. This information can be input into the mobile application by any means known in the art, such as, for example, by providing the user with a text box to enter the information.

In yet other embodiments, the mobile application can maintain a local database of items to deliver, and locate information on the delivery item stored locally. For example, upon scheduling deliveries for a route, the end user's (e.g., delivery personnel) device can be loaded with delivery information on all the delivery items. In other examples, the mobile application can query delivery information on all the delivery items from the delivery system. In one embodiment, the delivery system can make a cloud based storage location available to specific mobile applications and instantiate a cloud based storage location in proximity to a delivery route to facilitate data exchange.

In one embodiment, the system identifies an item and relays the information to the application, and the application prompts the user for input indicating that the delivery has been accepted or rejected. At step 1112, the application receives an indication from the user that the delivery has been rejected. The rejection can be indicated via a text box, selection from a drop-down list, by checking a box, etc. At step 1114, the application receives an input from the delivery driver describing the reason for the rejection and relays this information to the delivery system for entry into memory. The application displays the driver's rejection description to a customer user via, for example, a textual format and prompts the customer to approve or deny the rejection description at step 1116.

In one example, the application prompts the user to indicate approval (e.g., by entering a signature, clicking an "Approve" button, checking an "Approve" box, etc.) of the rejection description. In some examples, the system and/or mobile application can receive the indication of approval directly from the user, while in other embodiments, the user can input the indication of approval into a separate application operating in parallel that transmits the indication to the mobile application and/or system. In still other embodiments, any known method of indicating approval can be used to approve the rejection description. If the application does not receive approval (e.g., by receiving a signature) from the customer 1116NO, then the process continues to step 1118 and terminates at step 1120. In other examples, the customer must explicitly indicate that the rejection description is not satisfactory (e.g., by checking a "Reject" box, clicking a "Reject" button, etc.). However, if the application does receive approval (e.g., by receiving a signature) from the customer 1116YES, the process continues to 1122, and the application prompts the driver for a picture or set of pictures of the rejected goods at step 1124. In one example, an image is required from each angle to approximate a complete 3-D view of the item. In other embodiments, the driver can take a 360-degree video of the rejected goods to create a complete record of the state of the goods.

According to one embodiment, the mobile application and/or delivery system is configured to require completion of the delivery rejection process. If delivery processing is not executed according to the displayed prompts from the user interface (e.g., requires customer input (e.g., signature), requires one or more images of delivered item, requires multiple images of each delivered item, requires images of installed location(s), requires multiple images of installed location(s), etc.) the mobile application and/or delivery system can prevent access to further delivery locations, routing etc. If the system detects that an end user has left a delivery location without completing the delivery processing, the system can lock the end user device, for example, with a message to call administration to unlock.

Returning to process 1100, in some examples, the application and/or system requires that the customer confirm a report on the state of their home, the delivered goods, and the area surrounding the delivered goods at step 1126 by supplying information entered into a user interface. For example, if the application does not receive a customer's signature 1126NO, then the process continues to step 1118 and the application notes that a signature has not been received. In some examples, the system and/or mobile application can lock the user (e.g., delivery personnel, a customer, etc.) out if no signature is received. In other embodiments, the customer must explicitly indicate that the goods and/or the surrounding area are not in an acceptable condition to the mobile application or the delivery system. The application, in one example, then sends this information to the delivery system for storage in memory, and the process terminates at step 1120. In other examples, the application can store this information in a local memory, or may make use of cloud-based storage capabilities.

The application can, in some examples, prompt the customer with options for recourse supplied by the delivery system to address any damage caused. The options made available to the customer are at least partially based, in one example, on the degree of damage caused to the delivered item. In some examples, however, the application receives a customer signature 1126YES indicating that the customer's home and the surrounding area have not been damaged at step 1128. In some embodiments, responsive to receiving the customer signature 1126TYES, then the system and/or mobile application prompts the driver to take a picture or set of pictures of the home and surrounding area at step 1128 to document the state of the area. These pictures are, in at least one example, relayed to the delivery system for storage.

In some embodiments, responsive to receiving a picture from the driver, the application prompts the driver to submit a delivery report at step 1132. In at least one example, the delivery report can contain order information, user information, the picture(s) received from the driver, and the signatures received from the customer, or any combination thereof. In some examples, the application sends the delivery report to the delivery system at step 1134. In some examples, responsive to the delivery report being sent, the delivery system sends a rejection report to the customer that rejected the goods, a manufacturer that manufactured the rejected goods, and a retailer that sold the rejected goods at step 1136, or any combination thereof. The rejection report contains, for example, order information, customer information, retailer information, images, and signatures, and in at least one embodiment, the rejection report can be sent by email, text message, EDI, or any other known communication medium. At step 1120, the process ends.

Figure 14:
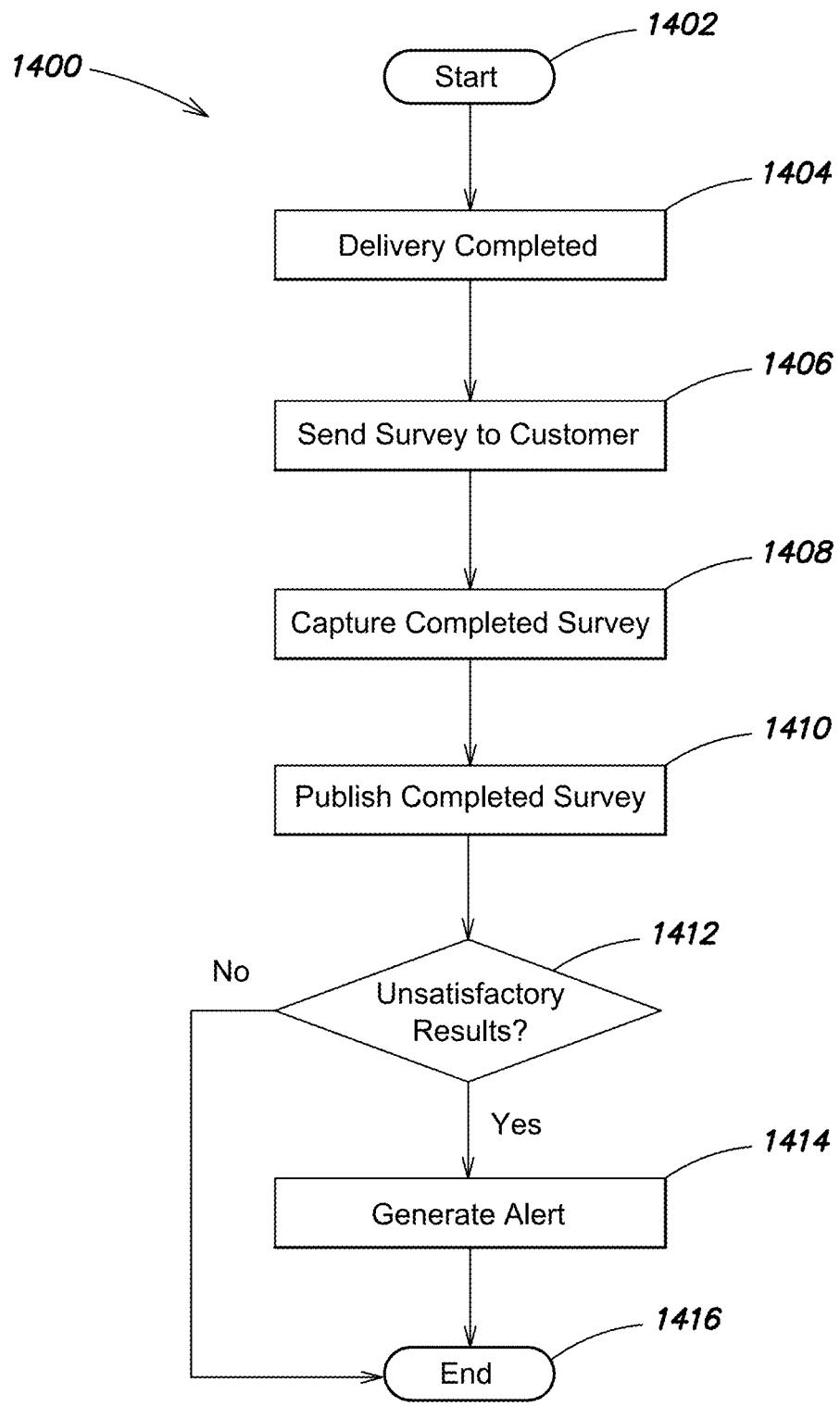
FIG. 14 is a flow diagram illustrating a process for soliciting feedback from a customer, according to one embodiment.

FIG. 14 illustrates an example process flow 1400 for receiving post-delivery feedback. According to at least some embodiments, the process can be executed by a delivery system, while in others, the process can be executed by a mobile application acting in conjunction with the delivery system executed at a device operated by an end user (e.g., a customer receiving an order, delivery personnel, etc.). In still other examples, the process can be executed by the mobile application alone. At step 1402, the process begins.

At step 1404, a delivery (e.g., a successful delivery, an unsuccessful delivery, etc.) is completed. In some examples, the system and/or mobile application may recognize the completion of a delivery in response to, for example, the receipt of a delivery report, in response to manual input from delivery personnel, in response to successful execution of process 1300, etc. At step 1406, the system and/or mobile application queries the customer to provide feedback via, for example, a survey. In some examples, the survey can include a free response section, a list of pointed questions, or any combination thereof. A list of questions can prompt the user to provide a written response of a restricted or unrestricted length, while some or all of the questions can prompt the user to select a response from a list. For example, the question (e.g., "Was your delivery experience positive?") can prompt the user to select a response from a list of descriptions (e.g., "Yes," "No," "Undecided," etc.), while in some examples the question (e.g., "Rate your experience 1-5") can prompt the user to select a response from a set scale (e.g., "1," "3.5," "5," etc.). In still other embodiments, the system/mobile application can solicit the customer for feedback without an explicit question (e.g., "Please describe your experience in 500 words or less," "Please provide additional feedback (no character limit)," etc.).

In some examples, natural language processing can be employed by the mobile application and/or system to automatically evaluate responses for, in some embodiments, important delivery parameters. For example, survey responses can be scanned for customers reporting delivery errors, damage to deliveries, personal conduct of delivery personnel, delivery timeliness, etc. Some or all of these delivery parameters, in addition to yet others in some cases, can be used to dictate interactions with certain delivery personnel. For example, if a certain group of delivery personnel consistently receive feedback indicating that goods were delivered with damages, then the system and/or mobile application can automatically indicate that that group of delivery personnel should have their goods inspected more frequently and/or more thoroughly. In other embodiments, the system and/or mobile application can automatically curtail the volume of deliveries entrusted to a certain group of delivery personnel if a certain threshold of negative responses is identified from processed feedback.

In one embodiment, the survey can include questions for which the answers are either "yes" or "no," or questions for which the answer falls on a numerical scale (e.g., 1-5). Various questions can be posed to the customer (e.g., "Did the team introduce themselves upon arrival at your home?" "Based upon your over-all experience, how would you rate your experience between 1 (low) and 5 (high)?"), and the survey can allow some or all of the questions to be skipped in some examples, although in others, all questions can be mandatory.

At step 1408, the system and/or mobile application receives a completed survey form from, for example, a customer. In one embodiment, the completed survey can be captured on the system and/or the mobile application. At step 1410, the system and/or mobile application can publish the completed survey for access by any or all of several interested parties. For example, the completed survey can be published to a retailer that sold all or some of a delivery, a product tracking page that monitors the status of a delivery, the customer that completed the survey, the delivery personnel that delivered the delivery, and/or any other party that the system and/or mobile application elects to publish the completed survey to.

At step 1412, the system and/or mobile application evaluates whether the survey results indicate an unsatisfactory experience. For example, in one example, an unsatisfactory result can be an answer of "no" to a "yes/no" question, a numerical answer below a certain threshold (e.g., a rating of 3 on a scale of 1-5 wherein a threshold is 4), etc. In other examples, natural language processing can be implemented to automatically identify unsatisfactory feedback from customers. For example, the system and/or mobile application can employ natural language processing to search for keywords or phrases that indicate a negative review (e.g., "damage," "rude," "late," etc.). If an unsatisfactory answer is detected by the system and/or mobile application 1412YES, then the process continues to step 1414, whereby the system and/or mobile application generates an alert. The alert can, for example, be sent to the system and/or mobile application's customer service department and/or another designated party. The system and/or mobile application can connect the customer service department with the unsatisfied customer, for example, to resolve the situation. At step 1416, the process ends. In an alternate embodiment, if no unsatisfactory results are detected by the system and/or mobile application 1412NO, then the process ends at 1416.

Figure 15:
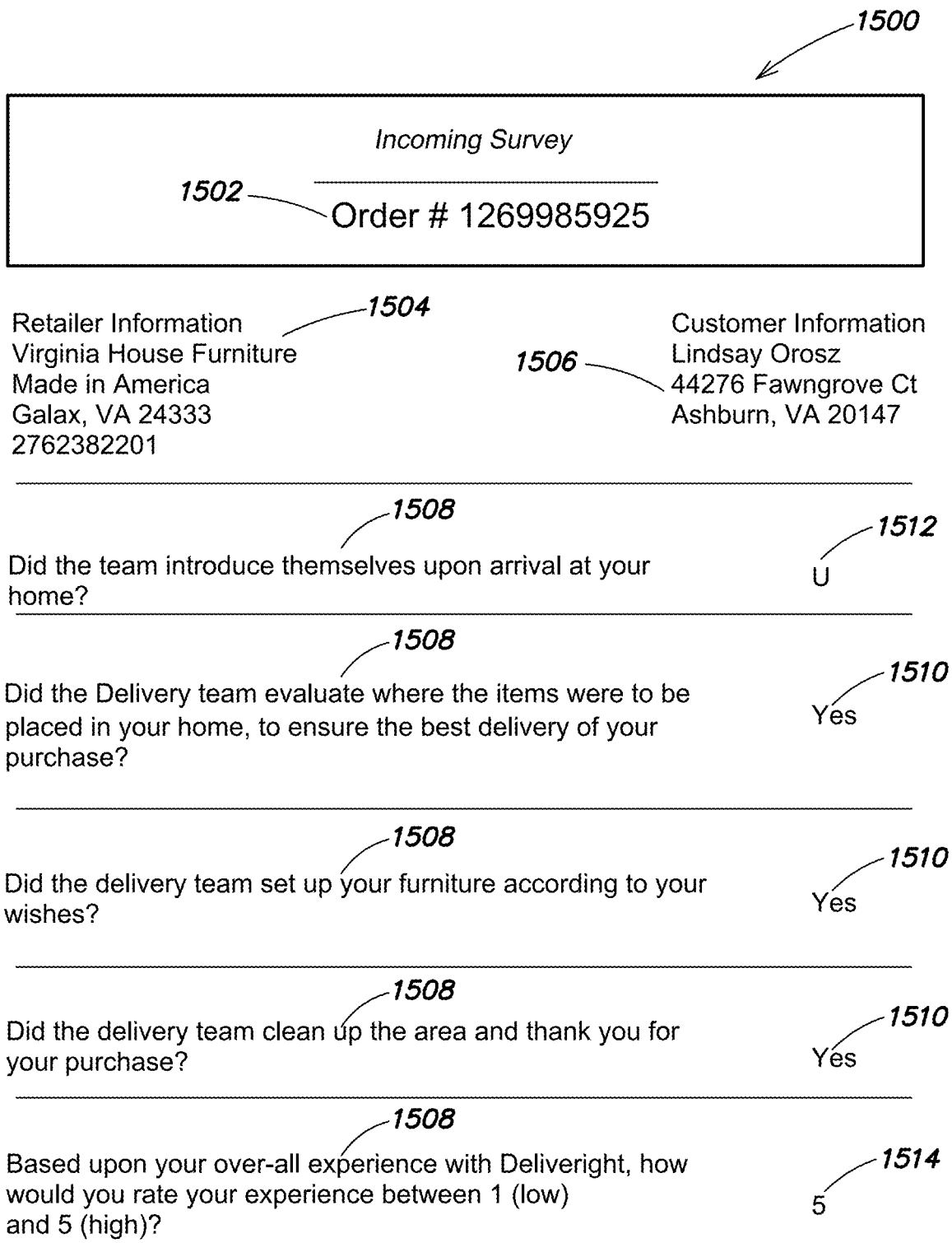
FIG. 15 is a user interface illustrating a completed customer survey according to one embodiment.

FIG. 15 shows one embodiment of a user interface 1500 for the delivery management system and/or mobile application. In some embodiments, the user interface 1500 directly interacts with the delivery management system, while in other embodiments, the user interface 1500 interacts directly with the mobile application. In still other embodiments, the user interface 1500 interacts with both the mobile application and the delivery management system in tandem.

In one embodiment of the user interface 1500, a survey is displayed to a user (e.g., a customer having received an order). For example, the survey can query the user to answer questions (e.g., open-ended questions, free response questions, yes/no questions, pointed questions, etc.) about their delivery experience. Some embodiments include an order identifier 1502 (e.g., an order number, a bar code, etc.) that uniquely identifies a specific order. The user (e.g., a customer) can be granted knowledge of the order identifier 1502 to identify that order, in some embodiments. The user can submit the order identifier 1502, for example, to the mobile application and/or system to gain access to the survey shown by the user interface 1500.

According to one embodiment, the user interface 1500 includes retailer information 1504 (e.g., name of the retailer, address of the retailer, retailer phone number, retailer e-mail address, retailer hours of operation, etc.) and can also include customer information 1506 (e.g., name of the customer, address of the customer, phone number of the customer, etc.). The user interface 1500 can further include a plurality of questions 1508. In some embodiments, all of the questions are mandatory, while in others, all of the questions are optional. In still other embodiments, some of the questions can be mandatory while others are optional.

In at least one embodiment, the questions can be yes or no questions, which can optionally include an "unsure" or "undecided" response in some examples. For example, a first set of answers can be "yes" responses 1510, while one of the answers can be "undecided," or simply "U" 1512. In yet other embodiments, answers can be on a numeric scale (e.g., 1-5, 1-10, 5-10, etc.) and the answer received by the user can be a single number 1514. Other embodiments feature an even greater range of questions and/or answers (e.g., free response questions, open-ended questions, etc.), as previously mentioned.

FIG. 16 shows another embodiment of a user interface 1600 for the mobile application and/or delivery management system. In some embodiments, the user interface 1600 can interact directly with the mobile application, while in others, the user interface 1600 can instead interact with the delivery management system. In still other examples, the user interface 1600 can interact with both the mobile application and the delivery management system simultaneously.

The user interface 1600 shows one example of a completed, returned survey. The completed survey 1602 can be displayed to, for example, delivery personnel, a retailer, a user responsible for filling the survey out, etc. The completed survey 1602 can include a summary of the questions and the answers submitted for each question, and each question can have an indicator 1606 denoting a satisfactory or unsatisfactory response. For example, a satisfactory response (e.g., a 5 on a scale of 1-5, a response of "Yes" to a question asking if the customer was satisfied, a response of "Excellent" on a scale of "Poor" to "Excellent," etc.) can be indicated by a check mark, a green light, etc., while an unsatisfactory response (e.g., anything less than a 5 on a scale of 1-5, a response of "Unsatisfied," etc.) can be indicated by an "X," a red light, an exclamation mark, etc. In at least one embodiment, the user interface 1600 can prompt the user to supply criteria for displaying either a satisfactory or unsatisfactory indicator, while in other embodiments, the criteria can be automatically assigned by the user interface 1600 acting in tandem with the mobile application and/or delivery management system.

Figure 12:
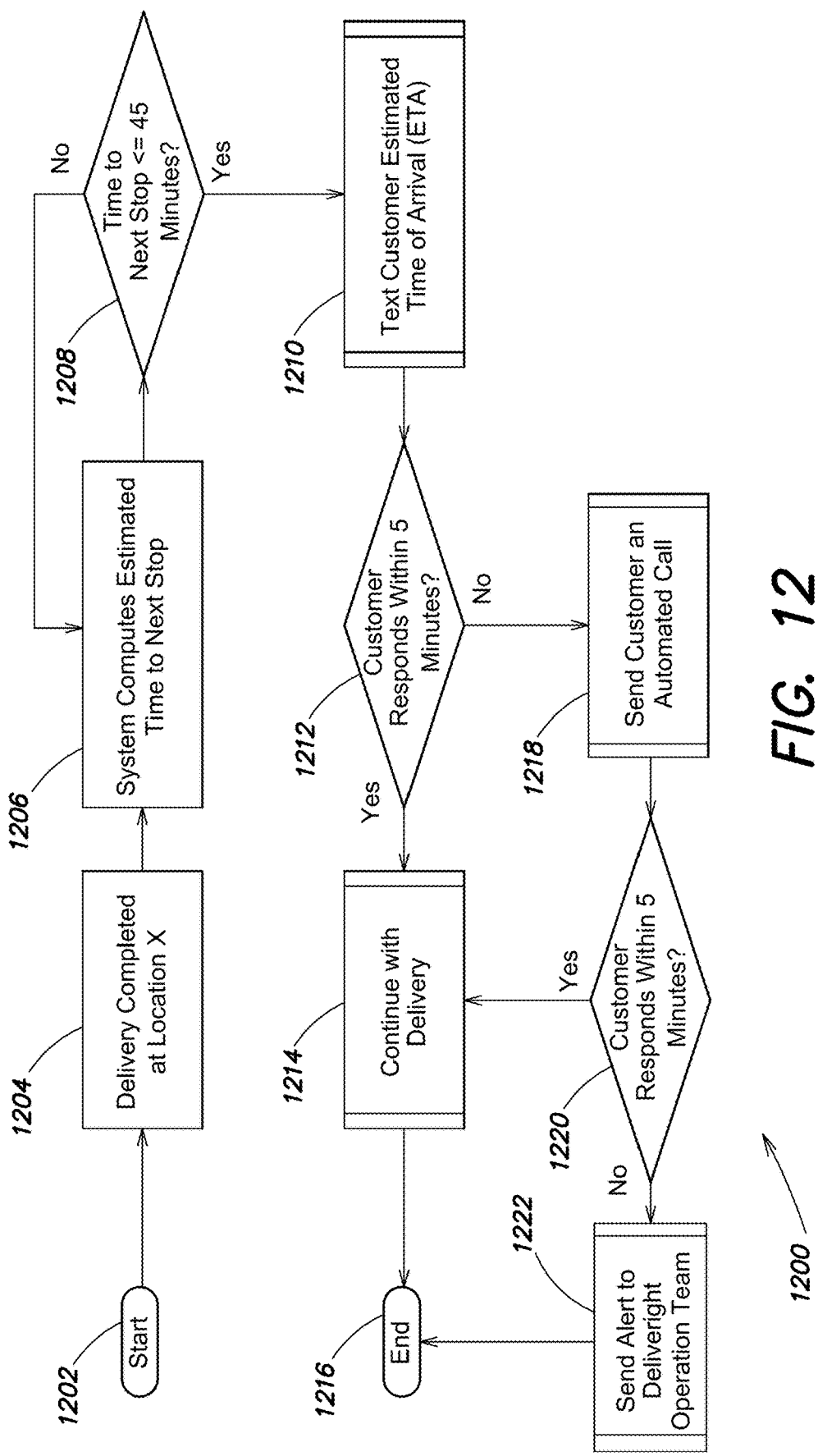
FIG. 12 is a flow diagram illustrating a process for notifying a customer of an impending delivery, according to one embodiment.

FIG. 12 is a process flow 1200 describing one example of a delivery alert feature of the mobile application that notifies a customer of an impending delivery. The process begins at step 1202. In one example, at step 1204, a delivery team completes a delivery at a location. At step 1206, the system and/or the mobile application calculates the estimated time until the next delivery location is reached based, in one example, on GPS calculations. The GPS can be external to the mobile application and/or the system, or can be internal to one or both. At step 1208, the system identifies whether the estimated time to the next stop is equal or less than a first predetermined time. In one example, this time can be 45 minutes, although any time is possible (e.g., 5, 10, 15, 20, 25, 30 minutes, . . . etc.). In some examples, the first predetermined time can be set by a user, or can be automatically set by the system or mobile application based on the anticipated delivery time. Continuing with this example, if the time to the next stop is greater than 45 minutes 1208NO, then the time to the next stop will be continuously calculated until the first predetermined time has been reached. In one example, when the time to the next stop is equal to or less than the first predetermined time (for example, 45 minutes) 1208YES, then the system or mobile application automatically generates and sends a text message to the customer receiving the delivery at step 1210. In other examples, the system or mobile application can notify the customer of the impending delivery via email, phone call, etc., in lieu of or in addition to a text message.

At step 1212, the system waits a second predetermined amount of time (for example, 5 minutes) for input from the customer that received the text message. The second predetermined time can be set by a user, or can be automatically set by the system or mobile application based on the anticipated delivery time. In one example, if the customer responds 1212YES, the delivery is confirmed and the delivery personnel continue with the delivery at step 1214. In some examples, any response from the customer is taken as confirmation of readiness for the delivery, while in others, there must be an affirmative response to receive the delivery. The process ends at step 1216 when the delivery is made.

However, in one example, the user can not respond to the text message in the predetermined time period 1212NO. Responsive to this predetermined time being reached, the system sends an automated, pre-recorded call 1218 to the customer in one example, and waits a predetermined time for the customer to respond at step 1220. In other examples, in lieu of a pre-recorded call, another text message, an email, etc. can be sent to the customer. The customer can respond by, for example, entering a certain number on the phone (e.g., 1, 2, 3, etc.), entering a PIN pre-set by the customer, speaking a certain word or phrase, etc. In some examples, the customer can have preselected the means for confirming a delivery.

If the system receives a response from the user indicating consent to receive the delivery within the predetermined time frame 1220YES, then the delivery personnel can continue with the delivery at step 1214. Responsive to the predetermined time being reached 1220NO without any response from the customer, however, the system can, in some examples, send an alert (e.g., a text message, email, phone call, etc.) to an operation team overseeing the efficacy of the delivery process at step 1222 notifying the team that the customer has not responded. The team can interpret this information as they see fit, and can respond to the customer's lack of response in a suitable manner (e.g., notifying the delivery team, rescheduling the delivery with the customer, etc.). Alternatively, delivery personnel can proceed with the delivery. The process ends at step 1216.

Mobile Device User Interface

Figure 8:
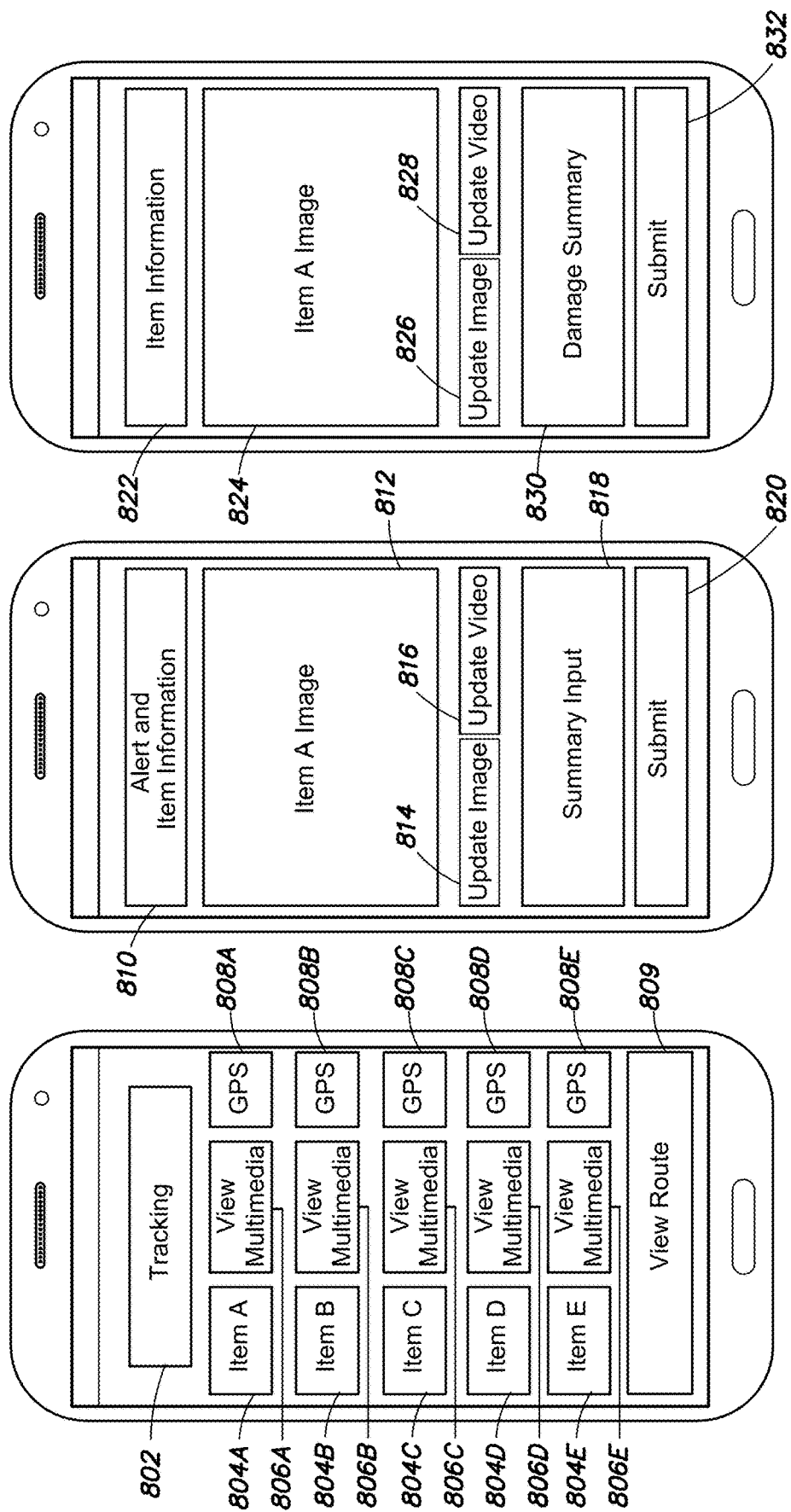
FIGS. 8A-8C are example user interfaces on a mobile device for tracking an item, alerting a user of a delivery event error, and receiving damage report information, according to one embodiment.

FIGS. 8A and 8B illustrate example displays of user interfaces on a mobile device. FIG. 8A shows an example tracking view where at least one item is in delivery and being tracked. The system can be configured to display, for example, information about each item such as the name and descriptive information about the item 804A-E, multimedia elements displaying updated photos or videos of each item 806A-E, location of the item on the route 808A-E, as well as other information relating to the tracking of the item, such as a geolocation of the item. The system can also display the whole route of the item as well as GPS directions to the destination based on a calculated delivery route via a control 809. In some examples, when an item in an order is at a delivery location or when an item is moved without being at a delivery event location, the system can be configured to alert the delivery personnel to update item information and not make delivery information available for a next delivery segment until an inspection has been passed. According to one embodiment, the system can gray out the inputs and display an alert message and disable access to delivery information until updated item information is received. In other embodiments, the system may gray out parts of the delivery information such as the view route control 809 until updated information is received.

FIG. 8B illustrates an example user interface of an alert to a carrier and a status reporting form. The alert can indicate which item has been moved either due to a delivery event or an unexpected movement, using varied information 810 about the item to identify the item. The alert can also include a timer to respond to the alert before the system makes requests that the customer service desk calls the carrier to alleviate the moved or misplaced item. The system can also display an image of the item to indicate what the item looks like. The system can display controls to update an image 814 of the item or create an updated video 816 of the item to show that the item is still en route and in good condition. The system can also ask the carrier to input a summary 818 indicating what happened to the item. Once the carrier fills in the updated information, a control 820 can be displayed to submit the information.

In some examples, the user interface can be configured to require inspection at each delivery event. For example, the UI may lockup or gray out delivery information (e.g., routing information) shown in FIG. 8A and alert delivery personnel that an inspection is required. In these examples, the UI can be configured to display the alert along with the timer in alert and item information 810 for the delivery personnel to respond with updated information for the goods. The inspection UI can have different inspection requirements based on the route, the manufacturer (e.g., the manufacturer dependency score), the retailer, and the delivery personnel. The requirements can include images and videos having to be taken in real time to confirm item safety. In some embodiments, the inspection UI can require that delivery personnel open an item's container and take images to confirm valid inspection. Once the system receives multimedia and a description of the condition of each item, the UI can be refreshed to continue to display normal delivery information processes.

In some embodiments, the system can receive an input indicating that an item is damaged. In response to the input indicating damage, for example, received from the tracking UI by clicking on a control in the item information 804A-E or the status reporting UI by a control in the summary input 818, the system can display the example damage reporting UI shown in FIG. 8C. The damage reporting UI displays the damaged item along with, for example, the location, time, item number, date, and delivery personnel in charge of the item in display areas 822 and 824. The damage reporting UI can take information from the status reporting UI as well as additional multimedia and information via the update image control 826, the update video control 828, and the damage summary input 830. Once the system receives updated information indicating damage to the item, the system can receive a submission of the information via a submit control 832. In some embodiments, the system can be configured to send the data to a customer, a subscriber, and service members to await an action to be taken. In other embodiments, the system can be configured to automatically display an action and update the delivery route accordingly.

According to some embodiments, a delivery mobile application can coordinate functions for managing delivery with a delivery system or central server. The delivery system can provide delivery information (e.g., routes, delivery locations, estimated delivery times, item information, etc.) to the mobile application for an entire route. In some embodiments, the system can provide all the information for the entire route in an initial download, and the mobile application can be used to display the information to delivery personnel. In some embodiments, the delivery system can monitor execution of the route. In one example, the system monitors execution based on information communicated from the mobile application, and in others from information communicated by sensors on the items and/or delivery vehicle. In some implementations, the system receives information from various combinations of mobile device information and/or sensors on items, and delivery vehicles.

In other embodiments, the mobile application monitors and manages a delivery route once begun. For example, the mobile application can detect delivery events (e.g., nearing delivery location) and trigger respective inspection functions, delivery operations, etc. In one example, the mobile application is configured to require information inputs from delivery personnel. In one example, the mobile application can grey out or render unreadable in a respective UI further delivery information until required information is input and validated (e.g., inspection images of delivered goods, among other options discussed herein). In another example, the mobile application communication required information to the delivery system (e.g., a server system), which validates the input. In response to failed validation or no input the system can communicate a lock out instruction to the mobile device. Responsive to the lock out signal the mobile device/application is configured to prevent access from further delivery information, and/or only display information input screens for the required information. Validated submission can be required to unlock further delivery information. In one example, an administrative signal can be required from the delivery system where the opportunity to validly submit information has been missed.

Example Computer System

Figure 9:
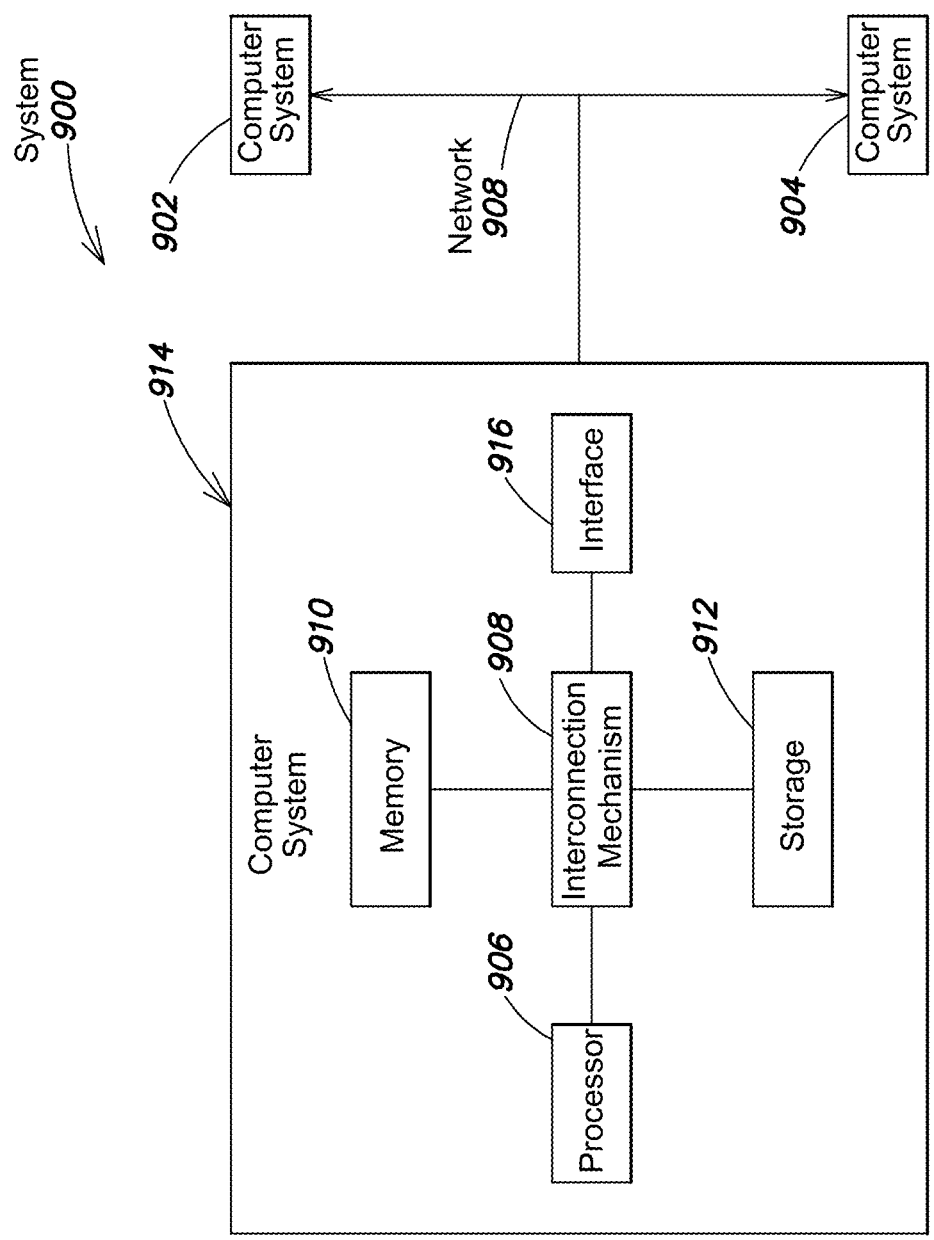
FIG. 9 is a schematic diagram of a general purpose computer system that may be specially configured to perform processes and functions disclosed herein.

FIG. 9 illustrates an example a block diagram of a special purpose computer system which can be specially configured to execute the functions, operations, code and/or processes disclosed herein. For example, the system 900 can be communicatively coupled to a database with customer information, (e.g., payment information), retailer information, manufacturer information, and other information for managing ordering, manufacturing, and delivery of goods. The system 900 can be configured to display information regarding goods for sale to a customer and receive input from customers for ordering the goods. In some embodiments, delivery systems can be implemented to include subscription services whereby subscriber can offer goods for sale with specific guaranteed delivery times and the system is configured to manage delivery of the goods without any inventory or management needed by the subscribers. In some embodiments, the system can manage delivery via multiple mobile devices and one or more mobile applications. The system 900 can be implemented on or configured to connect with cloud computing resources such as, for example, Amazon Elastic Cloud 2 (EC2).

The system 900 can include one or more a computer systems 914, 902, and 904. The computer system 914 can include for example a special purpose computing platform that includes processors such as those based on Intel PENTIUM-type processor, Motorola PowerPC, Sun UltraSPARC, Texas Instruments-DSP, Hewlett-Packard PA-RISC processors, or any other type of processor. System 900 can include special-purpose hardware, for example, an application specific integrated circuit (ASIC) for executing the operations, functions, and/or processes discussed herein. Various aspects of the present disclosure can be implemented as specialized software executing on the system 900. For example, the system can be configured to manage the order and sales of goods, manage zero inventory distribution for subscribers, and manage en route tracking and inspection of goods. In further examples, the system can be configured to create user interfaces, process payment information, aggregate a plurality of goods into a manifest, calculate a delivery route, require an inspection of goods at one or more delivery events, disable access to information pending the required inspection of goods, report status updates of goods, transfer a manifest between mobile devices, and automate a call to a mobile device due to an outstanding required inspection.

The system 900 can include a processor/ASIC 906 connected to one or more memory devices 910, such as a disk drive, memory, flash memory or other device for storing data. Memory 910 can be used for storing programs and data during operation of the system 900. Components of the computer system 900 can be coupled by an interconnection mechanism 908, which can include one or more buses (e.g., between components that are integrated within a same machine) or a network (e.g., between components that reside on separate machines). The interconnection mechanism 908 enables communications (e.g., data, instructions) to be exchanged between components of the system 900.can In some embodiments, the system 900 can also include one or more computer systems 902 and 904, which can include for example, a keyboard, a display, or a touch screen. In addition, the computer system 900 can contain one or more interfaces 916 that can connect the computer system 900 to a communication network, in addition or as an alternative to the interconnection mechanism 908.

The system 900 can include a storage system 912, which can include a computer readable and/or writeable nonvolatile medium in which signals can be stored to provide a program to be executed by the processor or to provide information stored on or in the medium to be processed by the program. The medium can, for example, be a disk or flash memory and in some examples can include RAM or other non-volatile memory such as EEPROM. In some embodiments, the processor/ASIC 906 can cause data to be read from the nonvolatile medium into another memory 910 that allows for faster access to the information by the processor/ASIC 906 than does the medium. This memory 910 can be a volatile, random access memory such as a dynamic random access memory (DRAM) or static memory (SRAM). It can be located in storage system 912 or in memory system 910. The processor/ASIC 906 can manipulate the data within the integrated circuit memory 910 and then copy the data to the storage 912 after processing is completed. A variety of mechanisms are known for managing data movement between storage 912 and the integrated circuit memory element 910, and the disclosure is not limited thereto. The disclosure is not limited to a particular memory system 910 or a storage system 912.

The system 900 can include a special purpose computer platform that is programmable using a high-level computer programming language. The system 900 can be also implemented using specially programmed, special purpose hardware (e.g., an ASIC) and can include a specially configured mobile device (e.g., a smart phone). The system 900 can include a processor/ASIC 906, which can be a commercially available processor such as the well-known Pentium class processor available from the Intel Corporation. Many other processors are available. The processor/ASIC 906 can execute an operating system which can be, for example, a Windows operating system available from the Microsoft Corporation, MAC OS System X available from Apple Computer, the Solaris Operating System available from Sun Microsystems, or UNIX and/or LINUX available from various sources. The system can also execute a mobile operating system which can be, for example, Android, iOS, Windows Phone, and BlackBerry OS. Many other operating systems can be used.

The processor and operating system together form a computer platform for which application programs in high-level programming languages can be written. It should be understood that the disclosure is not limited to a particular computer system platform, processor, operating system, or network. Also, it should be apparent to those skilled in the art that the present disclosure is not limited to a specific programming language or computer system. Further, it should be appreciated that other appropriate programming languages and other appropriate computer systems could also be used.

Having thus described several aspects of at least one example, it is to be appreciated that various alterations, modifications, and improvements will readily occur to those skilled in the art. For instance, examples disclosed herein can also be used in other contexts. Such alterations, modifications, and improvements are intended to be part of this disclosure, and are intended to be within the scope of the examples discussed herein. Accordingly, the foregoing description and drawings are by way of example only.

The invention claimed is:

1. A system for delivery management, the system comprising:
    at least one processor operatively connected to a memory, the at least one processor configured to manage a plurality of system components, wherein
    the at least one processor is configured to grant access to a plurality of route delivery points responsive to user authentication; and wherein
    the system further comprises:
        a tracking component, executed by the at least one processor, configured to identify delivery events, wherein the tracking component is further configured to identify a customer delivery;
        an identification component, executed by the at least one processor, configured to receive identifying information associated with one or more items for the customer delivery;
        an inspection component, executed by the at least one processor, configured to require inspection of the one or more items and, after access to in-route delivery functions or subsequent in-route delivery information has been enabled by authentication of the user, in response to determining that required information has not been submitted or is not valid, revoke access to the in-route delivery functions or the subsequent in-route delivery information based on requiring images of the one or more inspected items, wherein:
            revoking access to the in-route delivery functions or the subsequent in-route delivery information comprises triggering a lockout view configured to prevent access to, in subsequent visualizations, the in-route delivery functions or the subsequent in-route delivery information;
            the inspection component is further configured to, via a user interface, communicate a lockout status and provide an indication of information required to resolve the lockout status; and
            the inspection component is further configured to trigger an imaging component responsive to a customer rejection of any one of the one or more items; and
        an imaging component, executed by the at least one processor, configured to prompt delivery personnel to image each of the one or more items in place within a customer delivery location, including images of any rejected item.

2. The system according to claim 1, wherein the inspection component is further configured to require:
    inspection of the one or more items responsive to identifying the customer delivery; and
    require an initial customer acceptance or rejection of the one or more items.

3. The system according to claim 1, wherein the imaging component is further configured to require images of a plurality of visualizable angles of each respective one of the one or more items identified as rejected.

4. The system according to claim 3, wherein the imaging component is further configured to identify possible angles for imaging the respective one of the one or more items.

5. The system according to claim 3, wherein the imaging component is further configured require one or more images of an area surrounding an unboxed and in place respective one of the one or more items identified as rejected.

6. The system according to claim 3, wherein the imaging component is further configured to generate imaging interface displays, wherein the imaging interface displays are associated with a simulated perspective view of each angle to be captured of the respective one of the one or more items identified as rejected.

7. The system according to claim 6, wherein the imaging component is further configured to analyze a field of view of a camera and provide a visual indication responsive to determining the field of view matches a required one of the visualizable angles.

8. The system according to claim 1, wherein the imaging component is further configured to accept and validate video capture of the respective one of the one or more items identified as rejected.

9. The system according to claim 8, wherein validation of the video capture includes determining the respective one of the one or more items identified as rejected is unpackaged, and the video capture includes a surrounding area abutting the respective one of the one or more items identified as rejected.

10. The system according to claim 1, wherein the inspection component is further configured to validate a plurality of images of the respective one of the one or more items identified as rejected, and responsive to validation, require customer certification of an undamaged delivery area.

11. The system according to claim 10, wherein the inspection component is further configured to require images of the delivery area, and manage capture of multiple angles of the delivery area.

12. The system according to claim 10, wherein the inspection component is further configured to require images of the delivery area, and manage capture of multiple angles of the delivery area or validate that images of the respective one of the one or more items include images of the delivery area.

13. The system according to claim 1, wherein the identification component is further configured to validate the one or more items for the customer delivery responsive to receiving the identifying information.

14. The system of claim 1, wherein the inspection component is further configured to obscure or render inaccessible the subsequent in-route delivery information in the user interface.

15. A system for delivery management, the system comprising:
at least one processor operatively connected to a memory, the at least one processor configured to manage a plurality of system components, wherein
the at least one processor is configured to grant access to a plurality of route delivery points responsive to user authentication; and wherein
the system further comprises:
a tracking component, executed by the at least one processor, configured to identify delivery events, wherein the tracking component is further configured to identify a customer delivery;
an identification component, executed by the at least one processor, configured to receive identifying information associated with one or more items for the customer delivery;
means for requiring inspection of the one or more items and,
means for, after access to in-route delivery functions or subsequent in-route delivery information has been enabled by authentication of the user, in response to determining that required information has not been submitted or is not valid, revoking access to the in-route delivery functions or the subsequent in-route delivery information based on requiring images of the one or more inspected items, wherein revoking access to the in-route delivery functions or the subsequent in-route delivery information comprises triggering a lockout view configured to prevent access to, in subsequent visualizations, the in-route delivery functions or the subsequent in-route delivery information,
means for, via a user interface, communicating a lockout status and provide an indication of information required to resolve the lockout status, and
means for triggering image capture of the one or more items responsive to a customer rejection; and
an imaging component, executed by the at least one processor, configured to prompt delivery personnel to image each of the one or more items in place within a customer delivery location, including images of any rejected item.

16. The system according to claim 15, wherein the means for requiring inspection of the one or more items:
requires inspection of the one or more items responsive to identifying the customer delivery; and
requires an initial customer acceptance or rejection of the one or more items.

17. The system according to claim 15, wherein the system further comprises means for requiring images of a plurality of visualizable angles of each respective one of the one or more items identified as rejected.

18. The system according to claim 17, wherein the system further comprises means for identifying possible angles for imaging the respective one of the one or more items.

19. The system according to claim 17, wherein the system further comprises means for requiring one or more images of an area surrounding an unboxed and in place respective one of the one or more items identified as rejected.

20. The system according to claim 17, wherein the system further comprises means for generating imaging interface displays, wherein the imaging interface displays are associated with a simulated perspective view of each angle to be captured of the respective one of the one or more items identified as rejected.

21. The system according to claim 20, wherein the means for generating imaging interface displays:
analyzes a field of view of a camera; and
provides a visual indication responsive to determining the field of view matches a required one of the visualizable angles.

22. The system according to claim 15, wherein the system further comprises means for accepting and validating video capture of the respective one of the one or more items identified as rejected.

23. The system according to claim 22, wherein the means for validating the video capture includes a means for determining the respective one of the one or more items identified as rejected is unpackaged, and the video capture includes a surrounding area abutting the respective one of the one or more items identified as rejected.

24. The system according to claim 15, wherein the system further comprises means for validating a plurality of images of the respective one of the one or more items identified as rejected, and responsive to validation, requiring customer certification of an undamaged delivery area.

25. The system according to claim 24, wherein the system further comprises means for requiring images of the delivery area, and for managing capture of multiple angles of the delivery area.

26. The system according to claim 24, wherein the means for requiring inspection of the one or more items:
   requires images of the delivery area; and
   manages capture of multiple angles of the delivery area or validates that images of the respective one of the one or more items include images of the delivery area.

27. The system according to claim 15, wherein the system further comprises means for validating the one or more items for the customer delivery responsive to receiving the identifying information.

\* \* \* \* \*